(12) United States Patent
Yumoto

(10) Patent No.: US 7,756,994 B2
(45) Date of Patent: Jul. 13, 2010

(54) CONSISTENT INFORMATION MANAGEMENT AMONG SERVER DEVICES

(75) Inventor: Katsuyuki Yumoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/549,139

(22) PCT Filed: Mar. 10, 2005

(86) PCT No.: PCT/JP2005/004196

§ 371 (c)(1),
(2), (4) Date: Sep. 15, 2005

(87) PCT Pub. No.: WO2006/095427

PCT Pub. Date: Sep. 14, 2006

(65) Prior Publication Data

US 2008/0222275 A1 Sep. 11, 2008

(51) Int. Cl.
*G06F 13/00* (2006.01)
(52) U.S. Cl. ...................................... 709/233
(58) Field of Classification Search ................ 709/201, 709/223
See application file for complete search history.

(56) References Cited

U.S. PATENT DOCUMENTS 6,032,267 A * 2/2000 Fishler et al. ................. 714/11
6,665,675 B1 12/2003 Mitaru
2003/0041227 A1 2/2003 Nakamatsu
2005/0050173 A1 * 3/2005 Kikuchi ....................... 709/219
2006/0031122 A1 * 2/2006 Lane et al. ..................... 705/16

FOREIGN PATENT DOCUMENTS

JP 08-186569 A 7/1996
JP 2004-356920 A 12/2004

* cited by examiner

*Primary Examiner*—Robert B Harrell

(57) ABSTRACT

The present invention has an object of managing information without generating any inconsistency between a plurality of servers. A server system according to the present invention includes a plurality of server devices that perform processing using a plurality of processing data without duplication. Each of the server devices relays a signal initially transmitted by any of the server devices so that the signal passes through all the server devices to be finally received by the server device initially transmitting the signal, transmits a first signal indicating use of processing data to another server device when any of the processing data is to be used, receives the first signal from the another server device and relays it to a further another server device, and permits use of the processing data to be used when transmission means transmits the first signal and the first signal is relayed from one of the other server devices.

20 Claims, 35 Drawing Sheets

| INDEX #1 | ADDRESS #1 |
|---|---|
| INDEX #2 | ADDRESS #2 |
| INDEX #3 | ADDRESS #3 |
| ... | ... |
| INDEX #n | ADDRESS #n |

(B)

| | ADDRESS / MAC ADDRESS | NODE TO BE ASSIGNED | ASSIGNING/ UNASSIGNED | SYNCHRONIZED/ UNSYNCHRONIZED | ASSIGNMENT TIME LIMIT | ORDER OF DIVISION |
|---|---|---|---|---|---|---|
| INDEX #1 | ADDRESS #1/ MAC ADDRESS #1 | NODE TO BE ASSIGNED | ASSIGNING/ UNASSIGNED | SYNCHRONIZED/ UNSYNCHRONIZED | ASSIGNMENT TIME LIMIT | ORDER OF DIVISION |
| INDEX #2 | ADDRESS #2/ MAC ADDRESS #2 | NODE TO BE ASSIGNED | ASSIGNING/ UNASSIGNED | SYNCHRONIZED/ UNSYNCHRONIZED | ASSIGNMENT TIME LIMIT | ORDER OF DIVISION |
| INDEX #3 | ADDRESS #3/ MAC ADDRESS #3 | NODE TO BE ASSIGNED | ASSIGNING/ UNASSIGNED | SYNCHRONIZED/ UNSYNCHRONIZED | ASSIGNMENT TIME LIMIT | ORDER OF DIVISION |
| ... | ... | ... | ... | ... | ... | ... |
| INDEX #(S-1) | ADDRESS #(S-1)/ MAC ADDRESS #(S-1) | NODE TO BE ASSIGNED | ASSIGNING/ UNASSIGNED | SYNCHRONIZED/ UNSYNCHRONIZED | ASSIGNMENT TIME LIMIT | ORDER OF DIVISION |

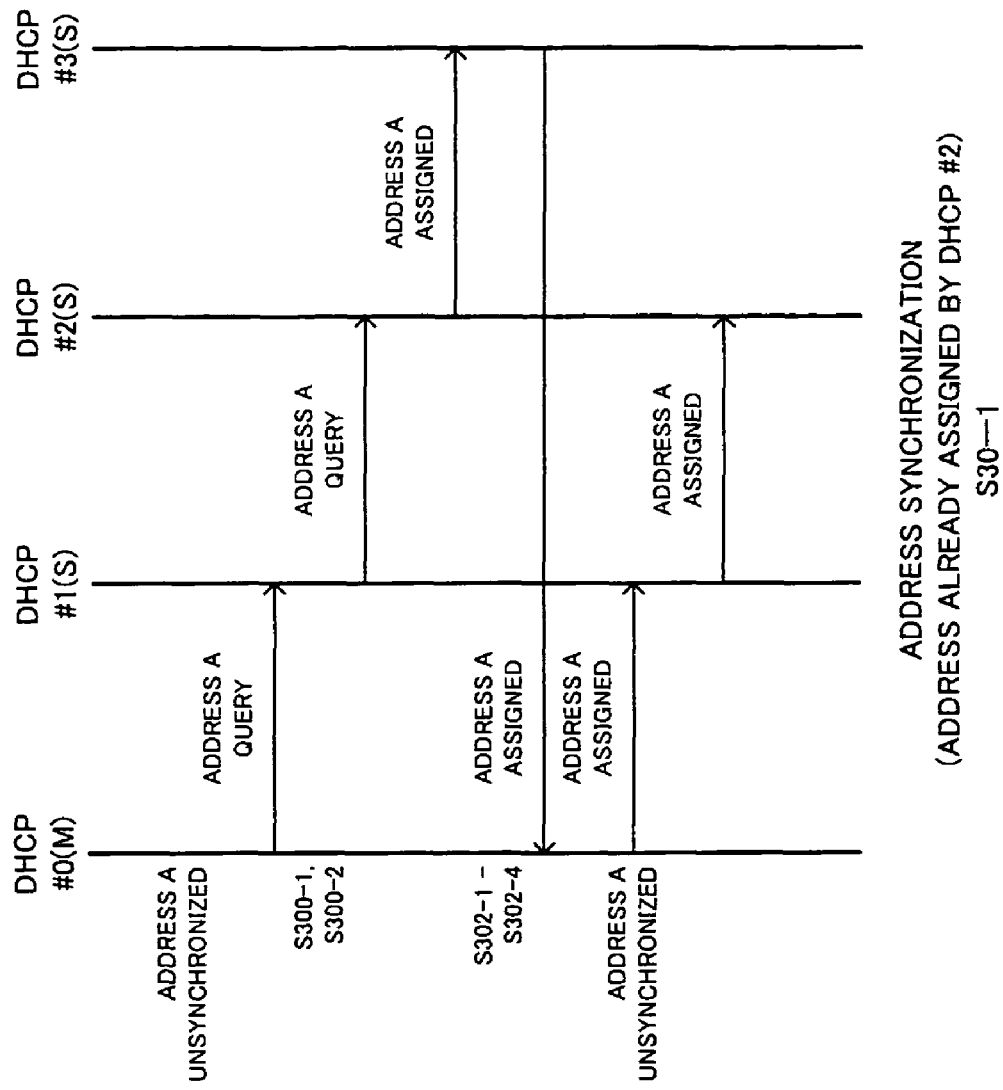

ADDRESS SYNCHRONIZATION
(ADDRESS NOT ASSIGNED BY DHCP #2)
S30—1

Fig. 23

| INDEX | IP ADDRESS | ASSIGNED NODE | ASSIGNING | SYNCHRONIZED | ASSIGNMENT TIME LIMIT | ORDER OF DIVISION (n) |
|---|---|---|---|---|---|---|
| INDEX #A | IP ADDRESS #A | ASSIGNED NODE (#2) | ASSIGNING | SYNCHRONIZED | ASSIGNMENT TIME LIMIT | |
| INDEX #(A+1) | IP ADDRESS #(A+1) | ASSIGNED NODE (#3) | UNASSIGNED | SYNCHRONIZED | ASSIGNMENT TIME LIMIT | Don't Care |

Fig. 27

| RING ID | IP ADDRESS/ NODE ID | FLAG GROUP |
|---------|---------------------|------------|

CONSISTENT INFORMATION MANAGEMENT AMONG SERVER DEVICES

TECHNICAL FIELD

The present invention relates to a server system of a redundant configuration with improved reliability, a server device used in the system, and a method therefor.

BACKGROUND ART

JP 2000-59387 A and JP 2001-203806 A disclose a method of assigning an IP address to a node such as a computer in accordance with a DHCP (Dynamic Host Configuration Protocol).

There are provided a plurality of servers, each being provided with a specific function, such as a DHCP server for assigning an IP address to each node in a network in accordance with the DHCP, are installed in a single network so as to provide redundancy, thereby improving reliability of the servers.

However, for example, in providing redundancy for the DHCP servers, information indicating the correlation between an address and a node and the like is required to be managed so as not to generate any inconsistency among a plurality of servers.

However, it is not always easy to manage information so as not to generate any inconsistency among a plurality of servers.

DISCLOSURE OF THE INVENTION

Problems to be Solved by the Invention

The present invention is made in view of the above-described background, and has an object of providing a server system that is improved to enable information management without generating any inconsistency among a plurality of servers, a server device used in such a system, and a method therefor.

More specifically, the present invention has an object of providing a server system that is improved to be capable of managing addresses to be assigned to nodes so as not to generate any inconsistency among a plurality of redundant DHCP servers, and of assigning the IP addresses in accordance with a DHCP with high reliability, a server device and a method therefor.

Means for Solving the Problem

In order to achieve the above object, according to the present invention, there is provided a server system including a plurality of server devices, the plurality of server devices performing processing using a plurality of processing data without duplication, each of the plurality of server devices relaying a signal initially transmitted by any of the server devices or a signal corresponding to the initially transmitted signal to any of the other server devices so that the signal passes through all the server devices to be finally received by the server device initially transmitting the signal, wherein each of the plurality of server devices includes: transmission means for transmitting a first signal indicating that any of the processing data is in use to another one of the server devices when the processing data is to be used; relay means for receiving the first signal from the another server device and relaying the first signal thus received to the other server devices; and use permit means for permitting use of the processing data to be used when the first signal is transmitted from the transmission means to be relayed from the other server devices.

Further, according to the present invention, there is provided a server device, which may be used in plural, a plurality of the server devices performing processing using a plurality of processing data without duplication between a plurality of servers when used in plural, each of the plurality of server devices relaying a signal initially transmitted from any of the server devices or a signal corresponding to the initially transmitted signal to any of the other server devices so that the signal passes through all the server devices to be finally received by the server device initially transmitting the signal, wherein each of the plurality of server devices includes: transmission means for transmitting a first signal indicating that any of the processing data is in use to another one of the server devices when the processing data is to be used; relay means for receiving the first signal from the another server device and relaying the first signal thus received to the other server devices; and use permit means for permitting use of the processing data to be used upon reception of the first signal that is transmitted from the transmission means and relayed from the other server devices.

Preferably, the server device further includes processing means for performing predetermined processing by using the processing data permitted for use.

Preferably, each of the server devices further includes processing data aggregate creating means corresponding to any of the server devices, the processing data aggregate creating means being for creating a processing data aggregate containing at least one piece of processing data without duplication, any of the processing data aggregate creating means of the plurality of server devices creates the processing data aggregate, each of the processing means of the server devices uses the processing data contained in the processing data aggregate associated with the server device to perform processing, each of the transmission means of the server devices transmits the first signal indicating the use of the processing data to be used by the processing means for processing to any of the other server devices, and each of the use permit means of the server devices permits the processing means to use the processing data to be used when the use permit means receives the first signal that is transmitted from the transmission means and relayed from the other server devices.

Preferably, a first identifier indicating at least a relay order of the first signal is uniquely assigned to each of the server devices, and the relay means relays the first signal thus received to the server device that is to receive the first signal next, in accordance with the assigned first identifier.

Preferably, the first identifier indicating at least the relay order of the first signal is uniquely assigned to each of the server devices, and the aggregate creating means of the server device with a predetermined first identifier creates the processing data aggregate.

Preferably, the first identifier further indicates the order of priority of each of the server devices, and the aggregate creating means of the server device with the first identifier indicating the highest order of priority creates the processing data aggregate.

Preferably, each of the server devices further includes server group creating means for creating a server group containing all the server device capable of transmitting data to the server device itself, and in any of the server devices contained in the server group, the processing data aggregate creating means corresponds to any of all the server devices contained in the server group and creates the processing data aggregate containing at least one processing data without duplication, and in each of the server devices, the processing means uses the processing data contained in the processing data aggregate associated with the server device to perform processing, the transmission means transmits the first signal indicating the processing data to be used by the processing means for processing is in use to any of the other server devices, and the use permit means permits the processing means to use the processing data to be used when the use permit means receives the first signal that is transmitted from the transmission means and relayed from the other server devices.

Preferably, an identifier indicating an order of priority of the server device is uniquely assigned to each of the server devices; and the server group creating means of the server device having the identifier indicating the highest order of priority in the server group creates the processing data aggregate.

Preferably, the server group creating means of the server device creates the processing data aggregate by aggregating the processing data corresponding to all the server devices contained in the server group and distributing the aggregated processing data to all the server device contained in the server group.

Preferably, each of the server devices further includes: use status management means for managing a status of use indicating whether each of the processing data contained in the corresponding processing data aggregate is in use or not; and synchronizing means for synchronizing the status of use managed by the use status management means of any of the server devices and a status of use managed by the use status management means of each of the servers contained in the created server group, in any one of the server devices when the server group is created.

Preferably, the synchronizing means of any of the server devices transmits a second signal for inquiring a status of use of each of the processing data and determines the processing data corresponding to the second signal is in use when the second signal is relayed to be returned, and otherwise determines that the processing data corresponding to the second signal is not in use, to synchronize the statuses of use, and the relay means of each of the server devices relays the second signal to the other server devices only when the relay means receives the second signal from another server device and the processing data corresponding to the received second signal is in use.

Preferably, the predetermined process is for dynamically assigning an IP address to a communication node in accordance with a DHCP (Dynamic Host Configuration Protocol), and each of the plurality of processing data indicates the IP address that can be assigned to the communication node.

Further, according to the present invention, there is provided a data processing method implemented by a server device that may be used in plural, in which a plurality of processing data are used without duplication between a plurality of the server devices when the server device is used in plural to perform processing, the method including the steps of: relaying a signal initially transmitted from any of the server devices or a signal corresponding to the first transmitted signal to any of the other server devices and is the signal passes through all the server devices and is finally received by the server device initially transmitting the signal; transmitting a first signal indicating use of processing data to another server device when any of the processing data is to be used; receiving the first signal from the another server device and relaying the received first signal to any of the other server devices; and permitting use of the processing data to be used upon reception of the first signal relayed from the other server devices that is transmitted by the transmission means.

Further, according to the present invention, there is provided a program of a server device, which may be used in plural, including a computer, the server devices performing processing using a plurality of processing data without duplication between a plurality of servers when used in plural, each of the server devices relaying a signal initially transmitted from any of the server devices or a signal corresponding to the initially transmitted signal to any of the other server devices so that the signal passes through all the server devices to be finally received by the server device initially transmitting the signal, the program causing the computer of each of the server device to execute the steps of: transmitting a first signal indicating use of processing data to another server device when any of the processing data is to be used; receiving the first signal from the another server device and relaying the received first signal to any of the other server devices; and permitting use of the processing data to be used upon reception of the first signal relayed from the other server devices that is transmitted by the transmission means.

EFFECT OF THE INVENTION

According to the server system, the server device, and the method therefor in the present invention, information can be managed so as not to generate any inconsistency among a plurality of servers.

Further, according to the server system, the server device, and the method therefor, addresses assigned to nodes can be managed so as not to generate any inconsistency among a plurality of redundant DHCP servers, thereby assigning the IP address in accordance with the DHCP with high reliability.

BRIEF DESCRIPTION OF THE DRAWINGS

FIG. 9) shown in FIGS. 8 and 10.

FIG. 12 A view illustrating a VS (Virtual Scope) that is shared and set for each of the DHCP servers shown in FIG. 1 and the like, and a VS table used for managing the VS, where part (A) shows VSSs (Virtual sub-scope) defined in a form of table and part (B) shows a table of the VS in the first logical ring shown in FIG. 3.

FIG. 13 A first view showing a communication sequence showing an address synchronization process in the DHCP servers (the logical ring; FIG. 9) shown in FIGS. 8 and 10.

FIG. 9) shown in FIGS. 8 and 10.

FIG. 23 A diagram showing data setting to the order of division in the VS table in the proxy process shown in FIG. 22.

FIG. 27 A diagram showing a ring message transmitted between the DHCP servers for a process of a ring management section and a ring update section shown in FIG. 26.

BEST MODE FOR CARRYING OUT THE INVENTION

Network System 1

Hereinafter, an embodiment of the present invention will be described.

Figure 1:
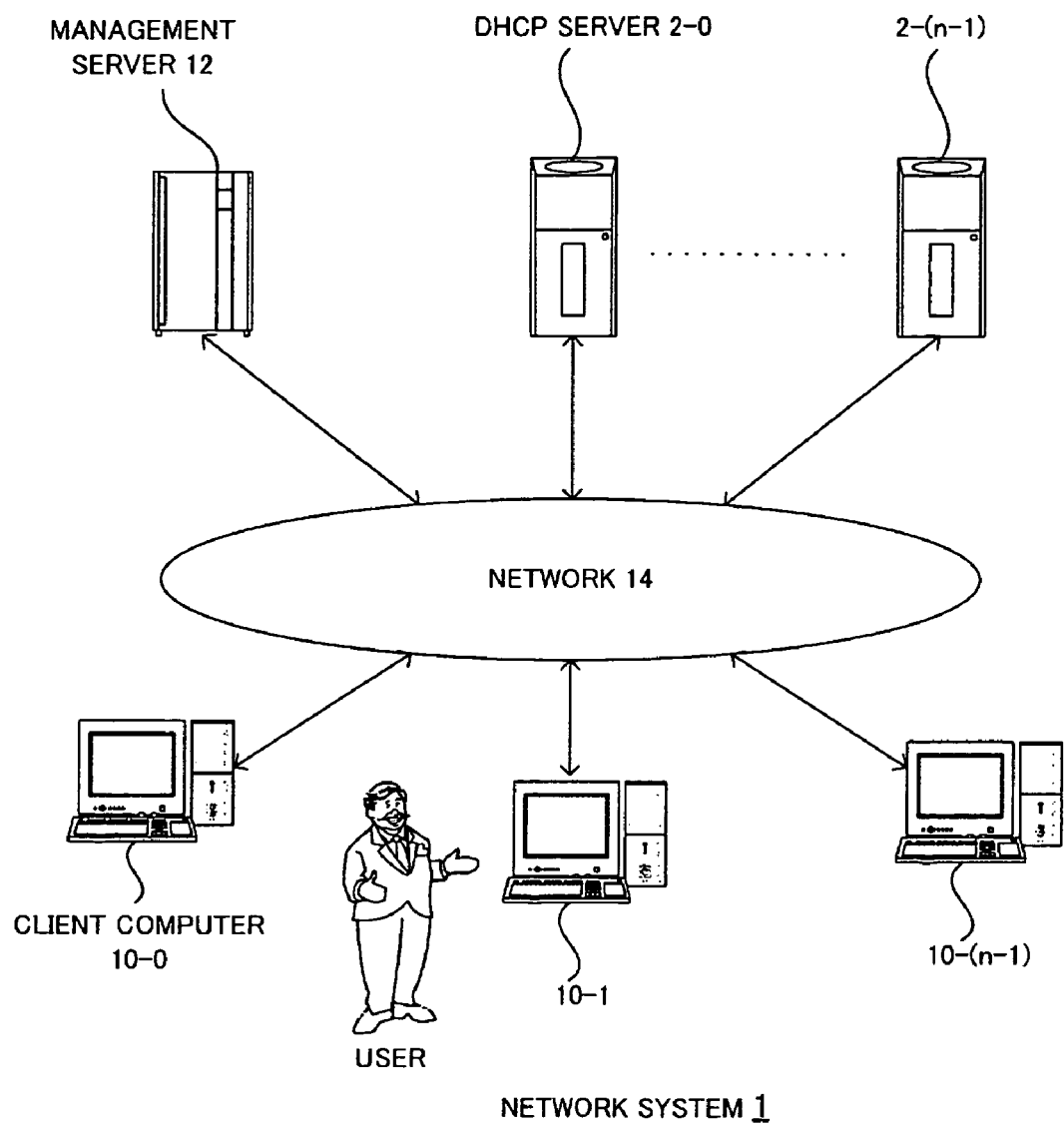
FIG. 1 A diagram illustrating a configuration of a network system to which a data processing method according to the present invention is applied.

FIG. 1 is a diagram illustrating a configuration of a network system 1 to which a data processing method according to the present invention is applied.

As shown in FIG. 1, the network system 1 is configured by n client computers 10-0 to 10-($n-1$), a management server 12 and DHCP servers 2-0 to 2-($n-1$), which are interconnected through a network 14 such as a LAN, a WAN or the Internet so as to be communicable with each other.

In each of the drawings, n indicates an integer equal to or larger than 2. Moreover, n does not necessarily always indicate the same number.

If any of components or processing, which may possibly be present in plural, such as the DHCP servers 2-0 to 2-($n-1$), is described without being specified, they are sometimes abbreviated simply as the DHCP servers 2. Substantially the same component and processing are denoted by the same reference numerals.

All components, which may serve as the center of data processing or communication in the network system 1 such as the DHCP servers 2, the client computers 10, or the management server 12 for managing data setting for the DHCP servers 2, are collectively referred to as nodes in some cases.

In the network system 1, the plurality of DHCP servers 2 have a redundant configuration. An IP address is dynamically assigned to the client computer 10 from the DHCP servers 2 in accordance with a DHCP (Dynamic Host Configuration Protocol) so that the client computer 10 communicates with the other nodes.

Hereinafter, the description will be given appropriately with specific examples. The specific examples are given to embody and clarify the description, but not to limit the technical scope of the present invention.

[Hardware]

Figure 2:
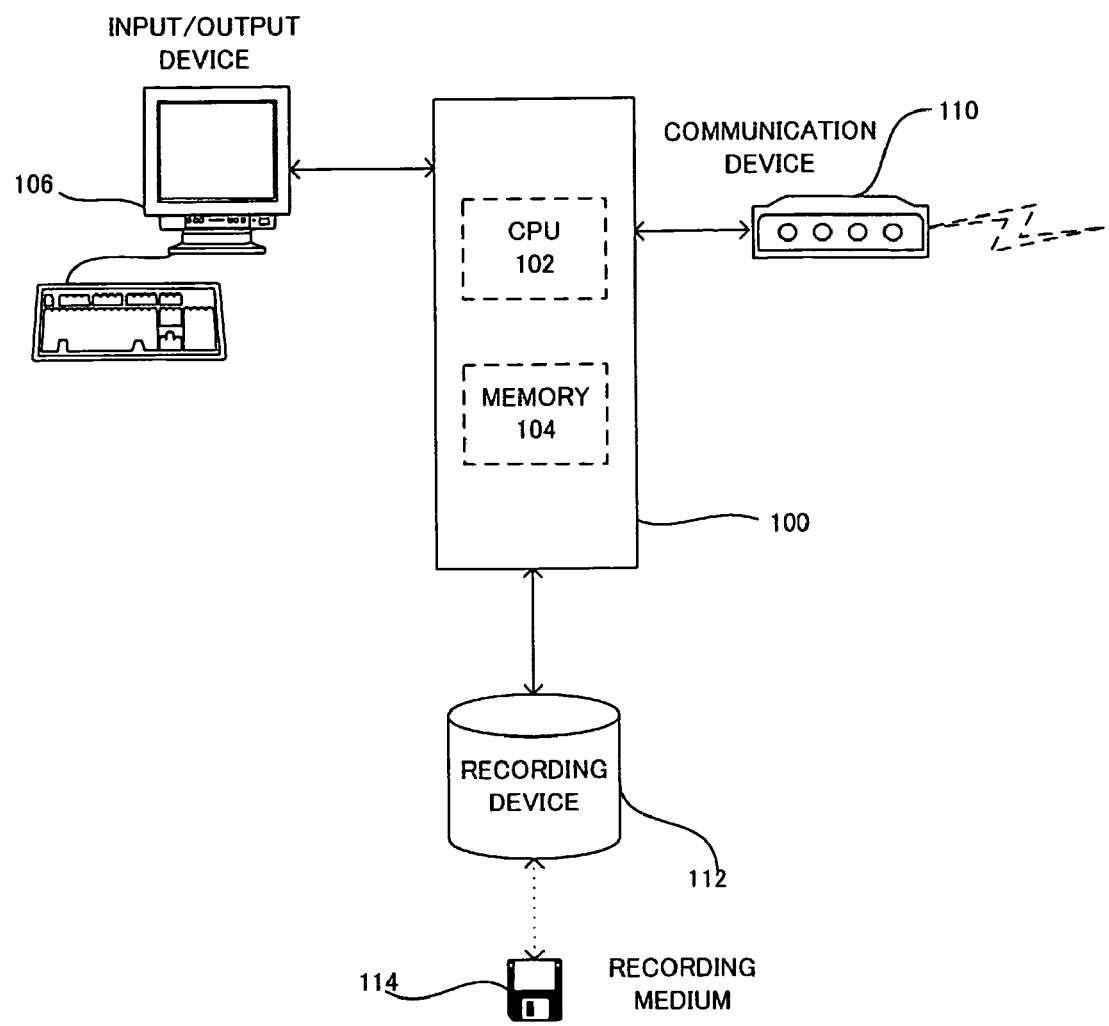
FIG. 2 A view illustrating hardware of client computers, a management server, and DHCP servers shown in FIG. 1.

FIG. 2 is a view illustrating a hardware of the client computers 10, the management server 12 and the DHCP servers 2 shown in FIG. 1.

As shown in FIG. 2, each of the above-mentioned nodes includes: a main body 100 including a CPU 102, a memory 104 and the like; an input/output device 106 including a display device, a keyboard and the like; a communication device 110 for communicating with the other nodes; and a recording device 112 such as a CD device, an FD device and an HDD device.

Specifically, the above-mentioned nodes include a component as a computer communicable with the other nodes through the network 14 (FIG. 1).

[Redundant Configuration of the DHCP Servers 2]

A redundant configuration of the DHCP servers 2 in the network system 1 will now be described.

Figure 3:
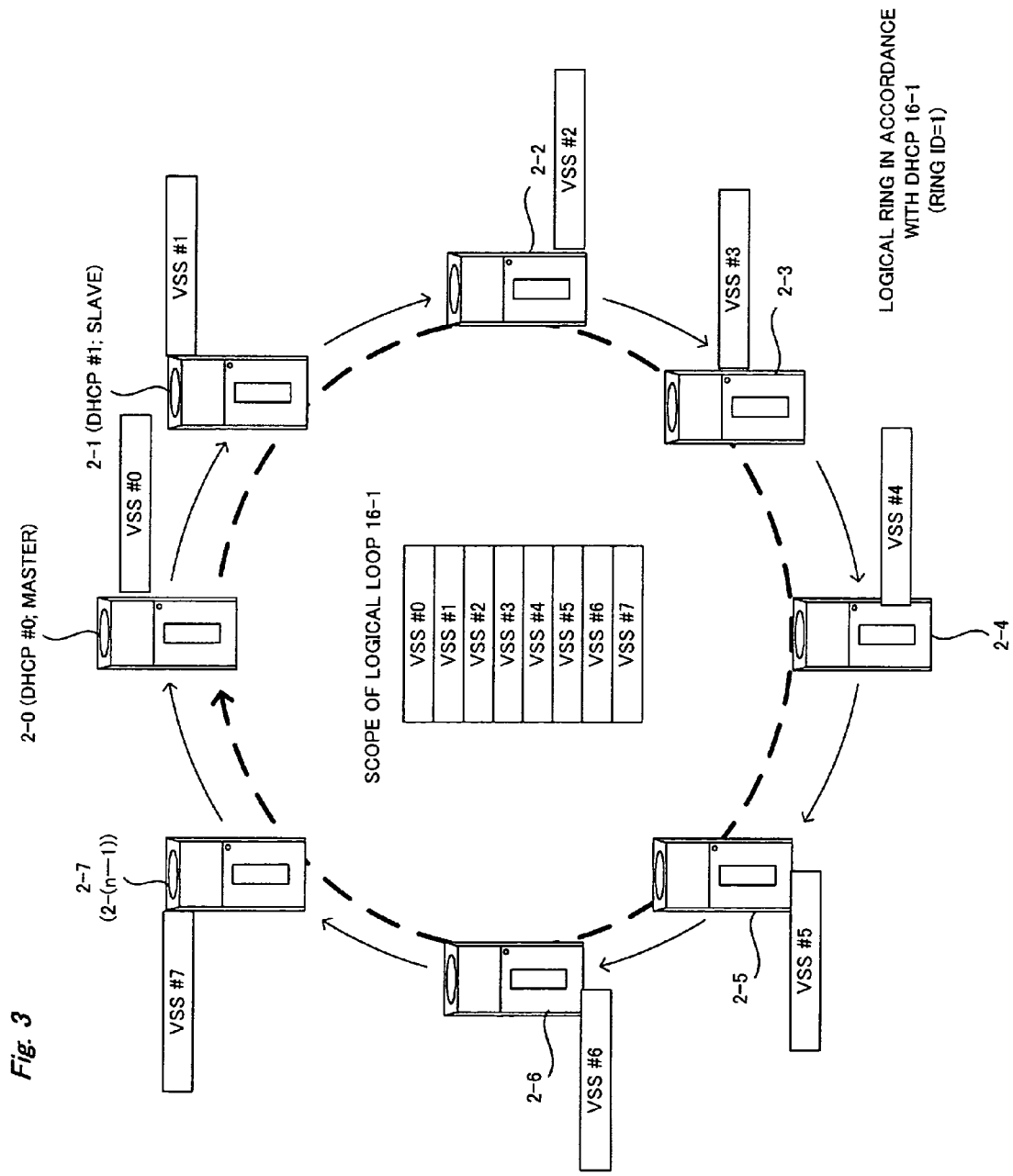
FIG. 3 A diagram showing a redundant configuration of the DHCP servers shown in FIGS. 1 and 2, illustrating a case where all the DHCP servers included in the network system form one logical ring (a first logical ring).

FIG. 3 is a diagram showing a redundant configuration of the DHCP servers 2 shown in FIGS. 1 and 2, illustrating the case where all the DHCP servers 2 included in the network system 1 form one logical ring (a first logical ring) 16-1 (FIG. 3 illustrates the case where n=8).

As shown in FIG. 3, for example, all the DHCP serves 2-1 to 2-(n−1) included in the network system 1 logically form one loop-like redundant configuration (the first logical ring 16-1). Any one of #0 to #(n−1) is assigned to each of the DHCP servers 2 as a unique identifier (a server ID) with an ID of the logical ring 16-1 (the ring ID=1).

The server ID indicates the order of priority of the DHCP servers 2-0 to 2-(n−1) in the logical ring 16-1 in addition to the transmission order of signals used for the IP address assignment. For example, as a value of a server ID becomes smaller, the order of priority of the DHCP server 2 having the server ID becomes higher.

A plurality of logical rings 16 may be included in the network system 1. Hereinafter, for embodying and clarifying the illustration and the description thereof, the case where only one logical ring 16-1 is included in the network system 1 is given as a specific example.

Moreover, in the logical ring 16-1, a signal transmitted from the DHCP server 2-i (i=0 to (n−1)) is returned to the initial DHCP server 2-i through all the DHCP servers 2 forming the logical ring 16-1 in the order of the server IDs #0 to #(n−1) (where 0 comes after n−1) so as to assign the IP address to the client computer 10 in accordance with the DHCP.

Specifically, for example, a signal transmitted from the DHCP server 2-0 to the DHCP server 2-1 is sequentially relayed in the order of the DHCP serves 2-2, 2-3 to 2-7 (n−1) to be finally returned to the DHCP server 2-0.

In the logical ring 16-1, an aggregate of all the IP addresses that can be assigned to the client computers 10 (a scope; a VS in a logical ring 16-2 shown in FIG. 9 or the like) by the DHCP servers 2 included in the logical ring 16-1 as a whole are divided into virtual sub scopes (VSS) #0 to #7 (n−1) respectively corresponding to the DHCP serves 2-0 to 2-(n−1) so as to includes at least one IP address without duplication.

In the logical ring 16-1, for example, the DHCP server 2 having the smallest value of the server ID operates as a master DHCP server 2, whereas the other DHCP serves 2 operate as slave DHCP servers 2.

In the logical ring 16-1, the VSSs #0 to #7 (n−1) are created respectively by the corresponding DHCP servers 2-0 to 2-7 (n−1) so as to be set to themselves.

Each of the DHCP servers 2-0 to 2-(n−1) can assign an IP address contained in any one of the thus set VSSs #0 to #7 (n−1) to the client computer 10 making a request for IP address assignment.

A method of creating the VSSs will be described below with reference to FIGS. 18 and 20, Formulae 1 to 3 and the like.

[IP Address Assignment by the Logical Ring 16-1]

Hereinafter, the IP address assignment to the client computer 10 by the logical ring 16-1 will be described.

Figure 4:
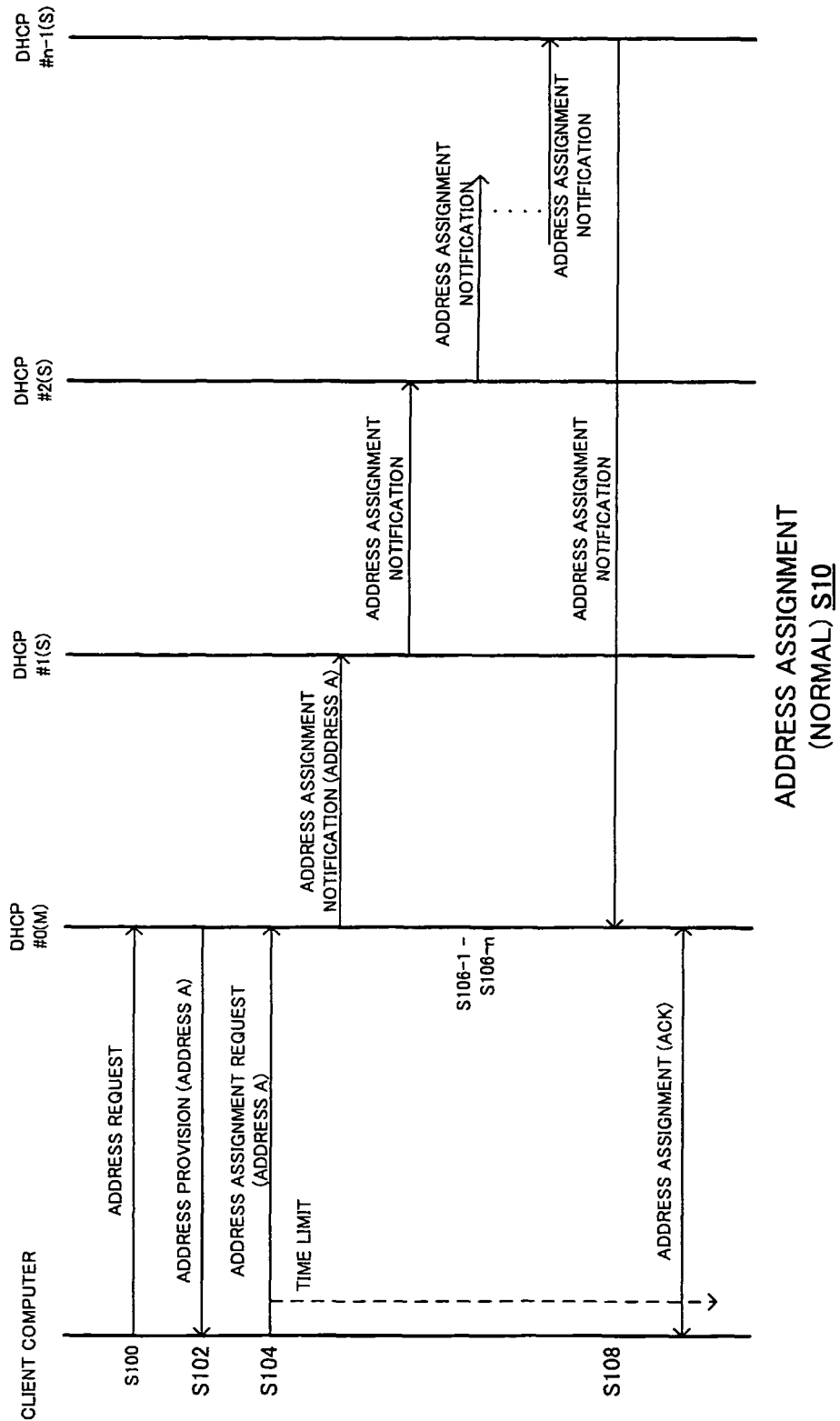
FIG. 4 A communication sequence diagram showing an assignment process of an IP address to a client computer by the logical ring shown in FIG. 3, illustrating a case where the IP address is assigned normally.

FIG. 4 is a communication sequence diagram showing an assignment process (S10) of an IP address to the client computer 10 by the logical ring 16-1 shown in FIG. 3, illustrating the case where the IP address is assigned normally.

In each of the following communication sequence diagrams, the symbol (M) submitted to the DHCP server 2-0 and the like designates that the DHCP server 2-0 or the like is the master DHCP server 2, whereas the symbol (S) submitted to the DHCP server 2-1 designates that the DHCP server 2-1 or the like is the slave DHCP server 2.

As shown in FIG. 4, the client computer 10 makes a request to the DHCP server 2-0 for IP address assignment in step 100 (S100).

In step 102 (S102), any of the DHCP servers 2-0 to 2-(n−1) (in FIG. 4, the DHCP server 2-0) returns a signal (Offer) indicating that an IP address A contained in the VSS #0 is provided to the client computer 10 making a request for IP address assignment.

The client computer 10 makes a request to the DHCP server 2-0 for IP address assignment in step 104 (S104).

At steps 106-1 to 106-n (S106-1 to S106-n), the DHCP server 2-0 offering the provision of the IP address to the client computer 10 transmits a signal indicating that an IP address A is provided (an address assignment notification signal) to the DHCP server 2-1 in accordance with the server ID.

The address assignment notification signal is relayed through all the DHCP servers 2 contained in the logical ring 16-1 so as to be returned to the DHCP server 2-0.

In step 108 (S108), the DHCP server 2-0 performs a process for assigning the IP address A (ACK transmission) to the client computer 10 making the request for IP address assignment.

As described below with reference to FIG. 5, step 106 (S106) involves a signal (Request) for making a request for the assignment of the IP address A from the client computer 10 to the DHCP server 2-0 and a signal (ACK) indicating the acceptance of the request from the DHCP server 2-0 to the client computer 10.

In the logical ring 16-1, in accordance with IP address assignment requests from the plurality of client computers 10, a plurality of DHCP servers 2 sometimes provide the same IP address or different IP addresses to the client computers 10.

Next, a process in the case where the collision of IP address provision as mentioned above occurs will be described.

Figure 5:
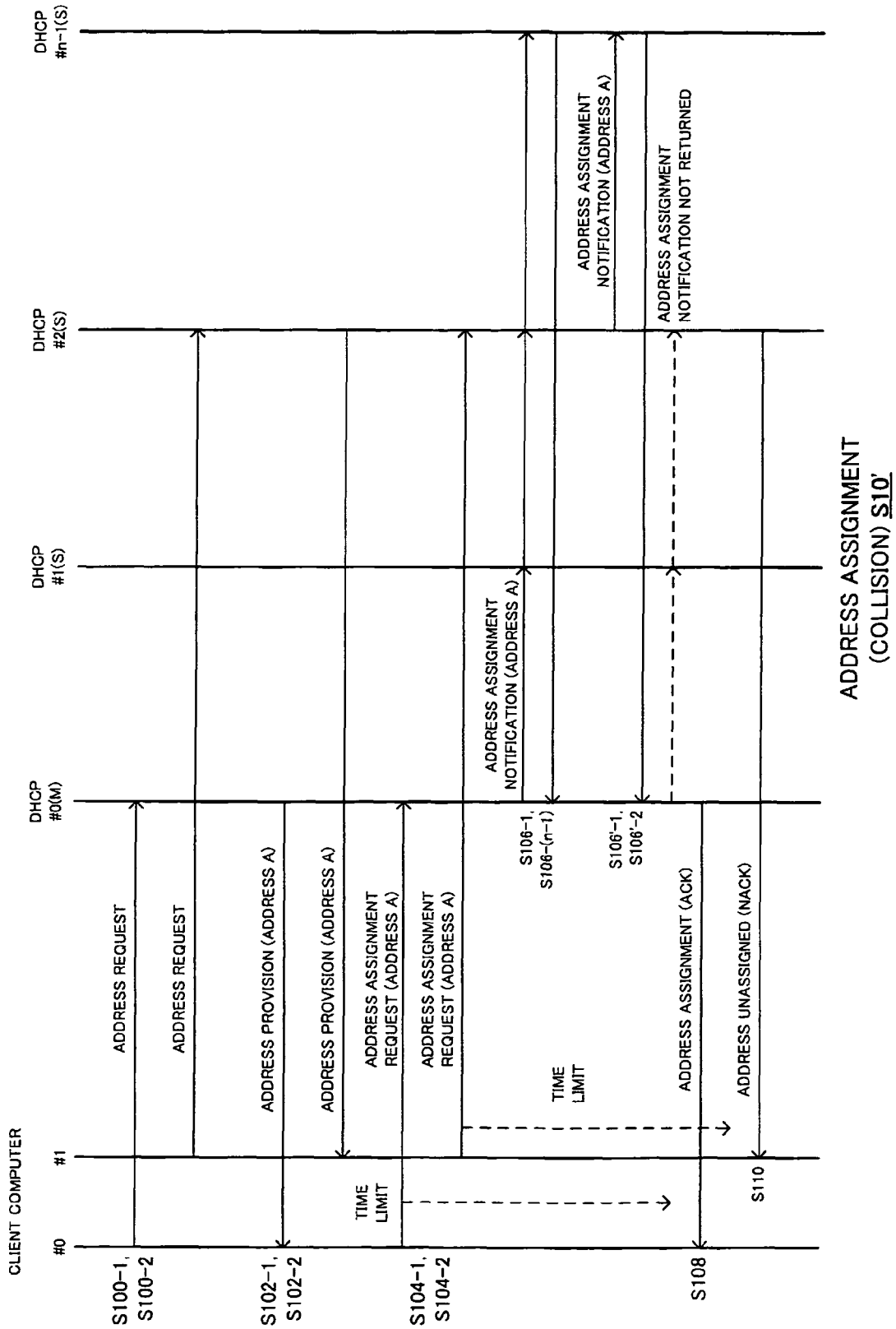
FIG. 5 A communication sequence diagram showing an IP address assignment process for the client computers by the logical ring shown in FIG. 3, illustrating a case where collision occurs in IP address provision.

FIG. 5 is a communication sequence diagram showing an IP address assignment process (S10') for the client computers 10 by the logical ring 16-1 shown in FIG. 3, illustrating the case where collision occurs in the IP address provision.

As in the process at S10 shown in FIG. 4, at steps 100-1 and 100-2 (S100-1 and S100-2), for example, the client computers 10-0 and 10-1 make a request to the DHCP servers 2-0 and 2-2 for IP address assignment, respectively.

At steps 102-1 and 102-2 (S102-1 and S102-2), the DHCP servers 2-0 and 2-2 return a signal (Offer) indicating that the IP address A contained in the virtual scope (VS) is provided to the client computers 10-0 and 10-2 making the request for IP address assignment, respectively.

At steps 104-1 and 104-2 (S104-1 and S104-2), the client computers 10-0 and 10-1 make a request to the DHCP servers 2-0 and 2-2 for the assignment of the IP address A.

At steps 106-1 (S106-1 to 106-n), the DHCP server 2-0 offering the IP address provision to the client computer 10-1 transmits a signal (an address assignment notification signal) indicating the provision of the IP address A to the DHCP server 2-1.

The address assignment notification signal is relayed through all the DHCP servers 2 included in the logical ring 16-1. The address assignment notification signal is returned to the DHCP server 2-0 within a time limit after the DHCP server 2-0 sends a signal indicating the provision of the IP address A.

On the other hand, at steps 106'-1 and 106'-2 (S106'-1 and S106'-2), the DHCP server 2-2 offering the IP address provision to the client computer 10-1 transmits a signal (an address assignment notification signal) indicating the provision of the IP address A to the DHCP server 2-3 (not shown in FIG. 5).

The address assignment notification signal is blocked by the DHCP server 2-0 having the higher order of priority, which provides the IP address A to the same client computer 10-0. Therefore, the address assignment notification signal is not returned to the DHCP server 2-2 within the time limit after the DHCP server 2-2 sends the signal indicating the provision of the IP address A.

The DHCP server 2-2 is capable of knowing that the IP address A is used by the DHCP server 2-0 having the higher order of priority based on the reception of the address assignment notification signal transmitted from the DHCP server 2-0 to be relayed by the DHCP server 2-1 at S106'-1. Therefore, the DHCP server 2-2 having a lower order of priority than that of the DHCP server 2-0 does not assign the IP address A.

In step 108 (S108), the DHCP server 2-0 returns a signal (ACK) indicating the assignment of the IP address A to the client computer 10-0.

On the other hand, in step 110 (S110), the DHCP server 2-2 returns a signal (NACK) indicating that the IP address A is not assigned to the client computer 10-1.

[Ring Update]

Moreover, the master DHCP server 2-0 tests the DHCP server 2-0, for example, in a given cycle, to know whether the communication in the logical ring 16-1 is maintained normally.

Figure 6:
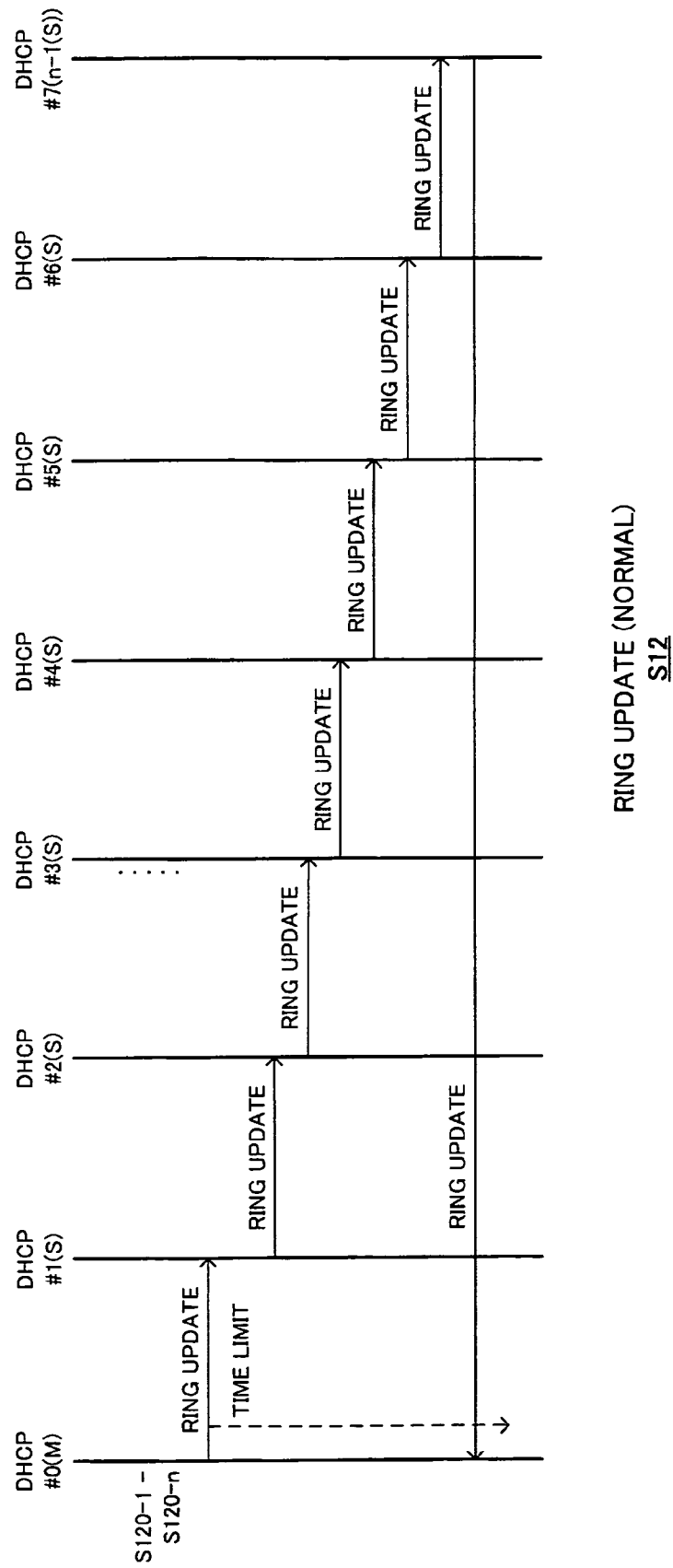
FIG. 6 A signal sequence representing a test (ring update) for judging whether communication in the logical ring shown in FIG. 3 is maintained normally or not, illustrating a case where the communication in the logical ring is maintained normally.

FIG. 6 shows a signal sequence representing a test (ring update) for knowing whether the communication in the logical ring 16-1 shown in FIG. 3 is maintained normally or not, illustrating the case where the communication in the logical ring 16-1 is maintained normally.

As shown in FIG. 6, in step 120-1 (S120-1), the master DHCP server 2-0 transmits a ring update signal to the slave DHCP server 2-1.

At steps 120-2 to 120-n (S120-2 to S120-n), the ring update signal is sequentially relayed through the DHCP servers 2-1 to 2-(n−1) to be finally returned to the DHCP server 2-0.

The DHCP server 2-0 can determine that the communication in the logical ring 16-1 is maintained normally based on the return of the ring update signal within a time limit after the transmission of the ring update signal.

[At the Occurrence of an Error]

Hereinafter, an operation of the logical ring 16-1 (FIG. 3) at the occurrence of an error will be described.

Figure 7:
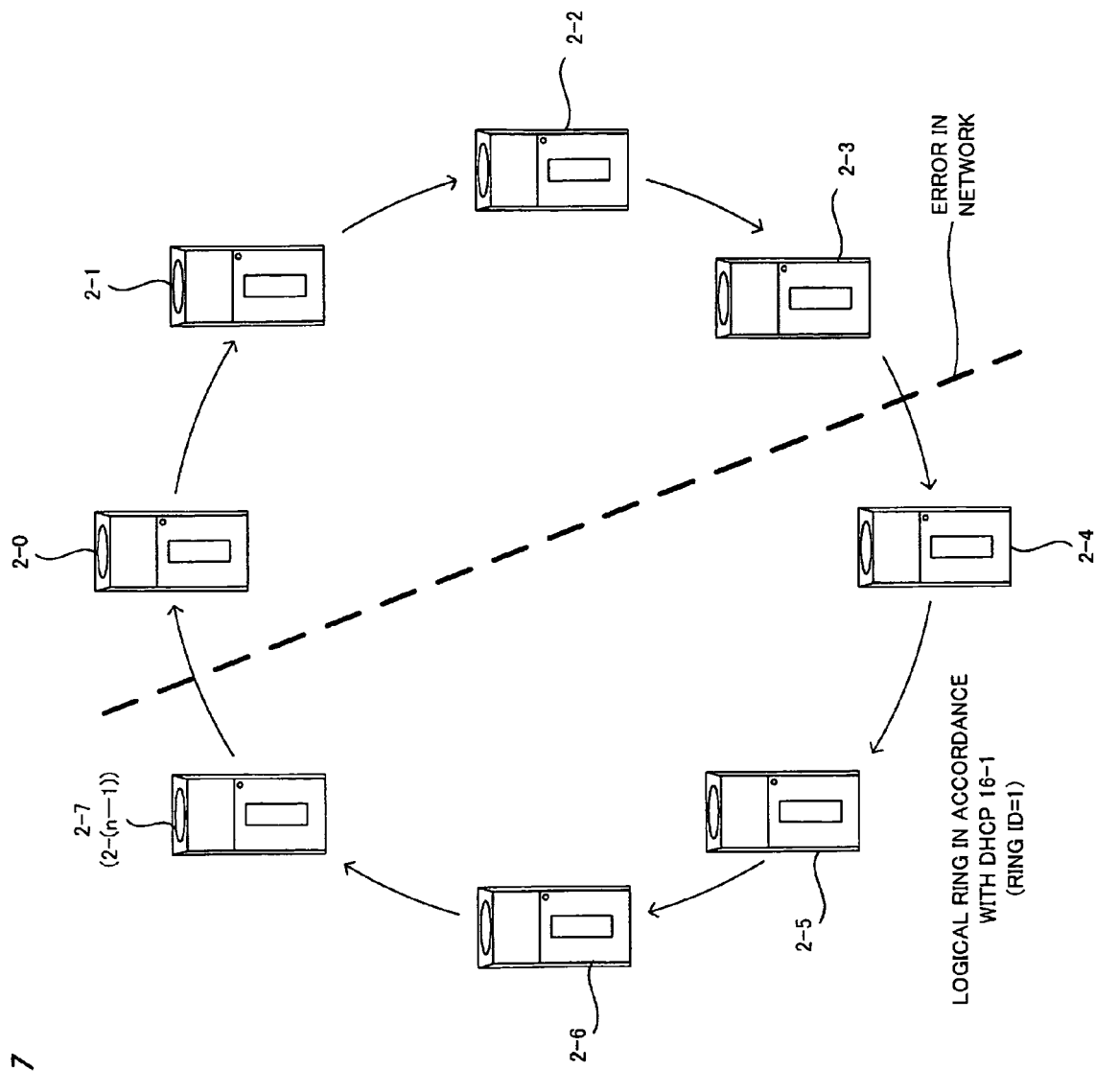
FIG. 7 A diagram illustrating an error occurring in the logical ring (FIG. 3).

FIG. 7 is a diagram illustrating an error occurring in the logical ring 16-1 (FIG. 3).

Hereinafter, the case where the communication between the DHCP servers 2-0 to 2-3 and the DHCP servers 2-4 to 2-7(n−1) becomes impossible in the logical ring 16-1 (FIG. 3) due to the occurrence of an error in the network 14 of the network system 1 (FIG. 1) and the like as shown in FIG. 7 will be given as a specific example.

Figure 8:
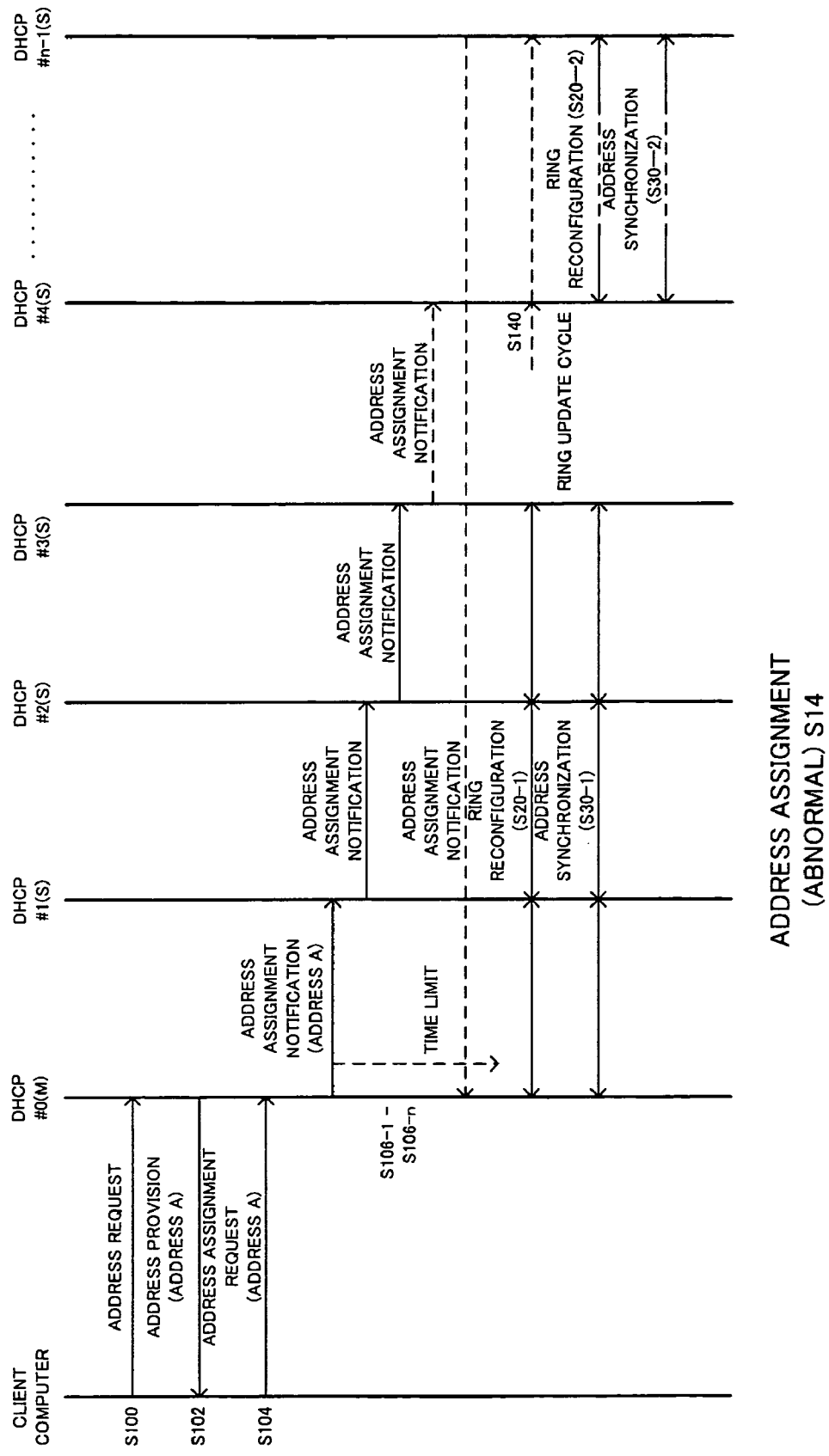
FIG. 8 A diagram illustrating an abnormal communication sequence (S14) when the client computer (FIG. 1) makes a request to the DHCP servers for the IP address at the occurrence of an error in the logical ring (FIG. 3) as shown in FIG. 7.

FIG. 8 is a diagram showing an abnormal communication sequence (S14) when the client computer 10 (FIG. 1) makes a request to the DHCP servers 2 for the IP address at the occurrence of an error in the logical ring 16-1 (FIG. 3) as shown in FIG. 7.

As in the normal case (FIG. 4; S10), the client computer 10 makes a request to the DHCP servers 2 for IP address assignment in step 100 (S100) as shown in FIG. 8.

In step 102 (S102), the DHCP server 2-0 provides the IP address A for the client computer 10.

In step 104 (S104), the client computer 10 makes a request to the DHCP server 2-0 for the assignment of the IP address A.

In steps 106-1 to 106-3 (S106-1 to S106-3), as in the normal case (FIG. 4), the DHCP servers 2-0 to 2-3 are informed of the assignment of the IP address A to the client computer 10 in this order.

As indicated with a broken line at steps 106-4 to 106-n (S106-4 to S106-n; partially not shown), however, the communication between the DHCP servers 2-3 and 2-4 is impossible in contrast with the normal case. Therefore, the DHCP server 2-4 does not receive the notification.

Accordingly, the notification is not returned to the DHCP server 2-0 within the time limit.

In such a case, in step 20-1 (S20-1), the DHCP server 2-0 performs a process for reconfiguring the ring (S20-1) between the DHCP servers 2-0 to 2-3 (FIG. 7) which are capable of intercommunicating (a communication sequence for the ring reconfiguration (S20) will be described below with reference to FIG. 11).

Similarly, even if it is time to perform the ring update on, for example, the DHCP servers 2-4 to 2-(n−1) in step 140 (S140), these DHCP servers cannot receive the ring update signal from the DHCP server 2-0.

After this event, the DHCP servers 2-4 to 2-(n−1) perform a process for ring reconfiguration (S20-2) between the DHCP servers 2-4 to 2-(n−1) which are capable of intercommunicating.

Figure 9:
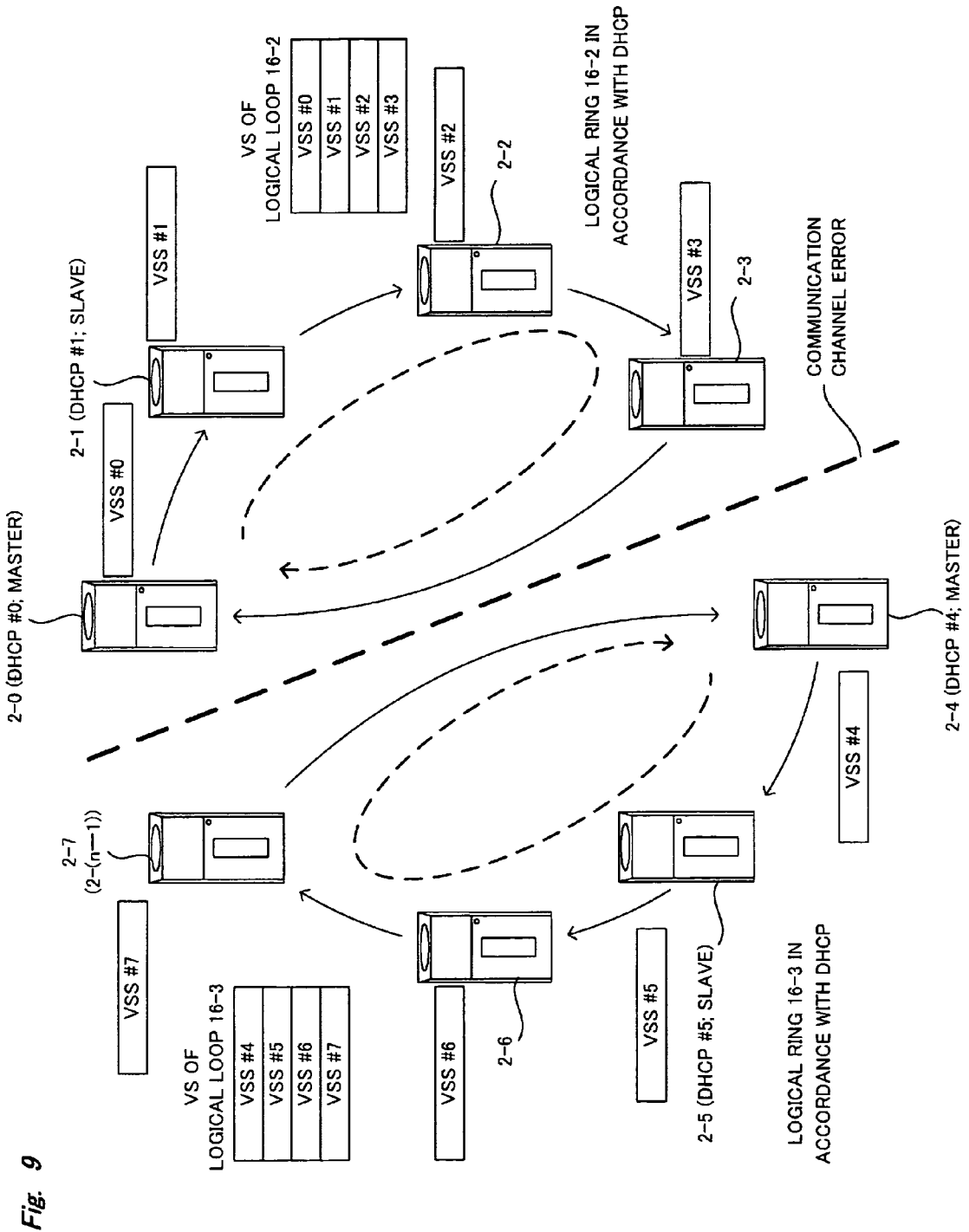
FIG. 9 A diagram illustrating a second logical ring and a third logical ring, which are configured by ring reconfiguration processes (FIG. 11) when the error occurs as shown in FIG. 7 in the communication between the DHCP servers included in the logical ring shown in FIG. 3.

FIG. 9 is a diagram illustrating a second logical ring 16-2 and a third logical ring 16-3, which are configured by the ring reconfiguration processes (S20-1 and S20-2; FIG. 11) when the error occurs as shown in FIG. 7 in the communication between the DHCP servers 2 included in the logical ring 16-1 shown in FIG. 3.

As a result, as shown in FIG. 9, the first logical ring 16-1 (FIG. 3) is divided at the position where the error occurs as shown in FIG. 7, to be reconfigured as two logical rings 16 (the second logical ring 16-2 and the third logical ring 16-3).

At this time, in the logical ring 16-1 (FIG. 3), the VS composed of the VSSs #0 to #7 associated with the DHCP servers 2-0 to 2-7 (n−1) are also reconfigured as a VS composed of VSSs #0 to #3 in the logical ring 16-2 and a VS composed of VSSs #4 to #7 (n−1) in the logical ring 16-3.

Furthermore, as shown in FIG. 8, a process for address synchronization for eliminating the inconsistency of the IP addresses assigned to the client computer 10 by the DHCP servers 2 is performed between the DHCP servers 2-0 to 2-3 and between the DHCP servers 2-4 to 2-(n−1), respectively (S30-1 and S30-2; described below with reference to FIGS. 13 and 14).

If an error occurs in the logical ring 16-1 as shown in FIG. 7, the processes for ring reconfiguration (S20-1 and S20-2) are performed even at the ring update as well as at the assignment of the IP address shown in FIG. 8 so as to create the logical rings 16-2 and 16-3 (FIG. 9). In each of the created rings, the process for address synchronization (S30-1 and S30-2) is performed.

Figure 10:
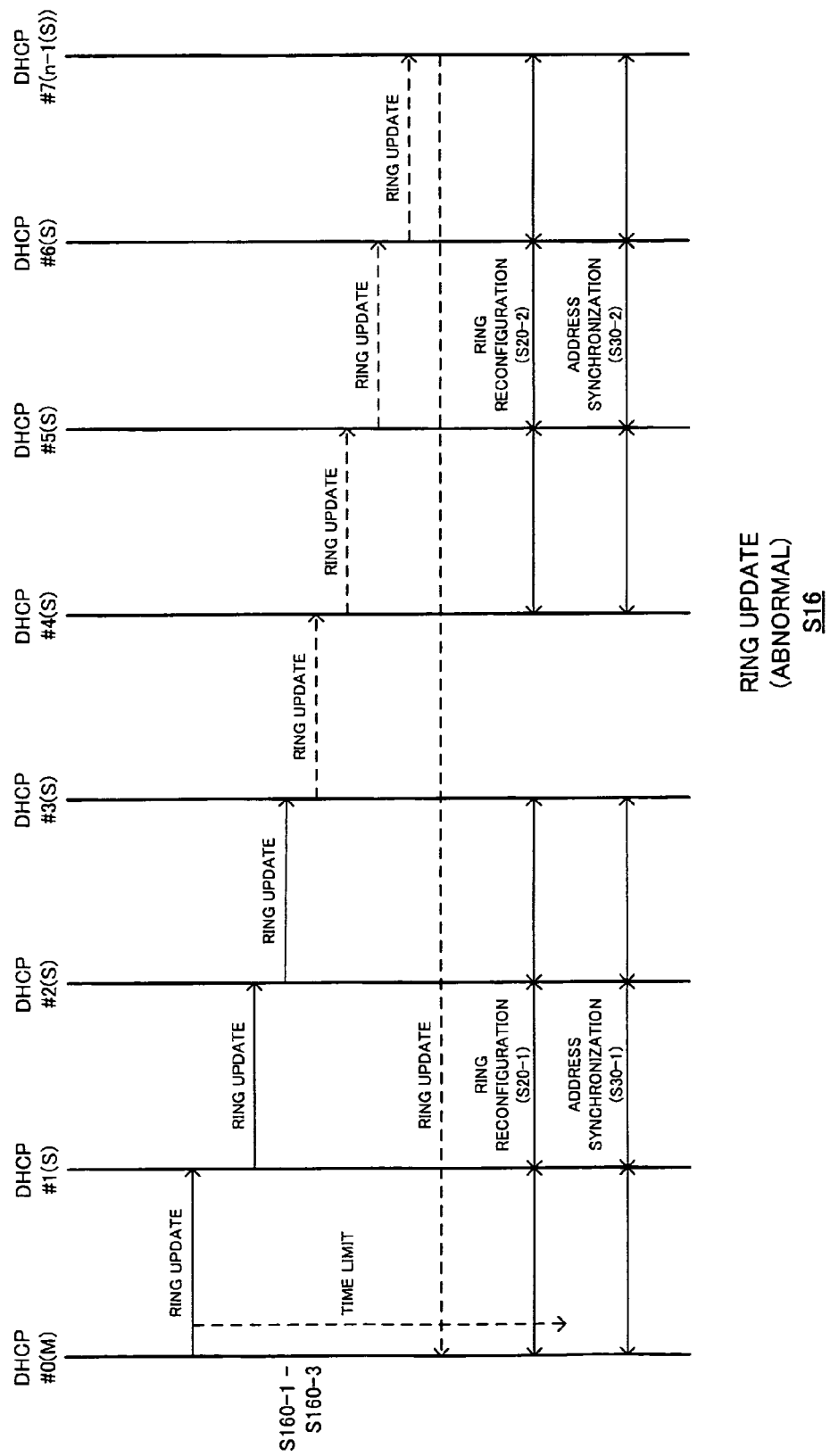
FIG. 10 A diagram illustrating an abnormal communication sequence in ring updating performed by a master DHCP server when an error occurs in the logical ring (FIG. 3) as shown in FIG. 7.

FIG. 10 is a diagram illustrating an abnormal communication sequence (S16) in ring updating performed by the master DHCP server 2-0 when an error occurs in the logical ring 16-1 (FIG. 3) as shown in FIG. 7.

As shown in FIG. 10, the master DHCP server 2-0 transmits a ring update signal to the slave DHCP server 2-1 at steps 160-1 to 160-3 (S160-1 to S160-3). The signal is relayed to the DHCP server 2-3.

However, since the communication between the DHCP server 2-3 and the DHCP server 2-4 is impossible, the ring update signal is never returned to the DHCP server 2-0 within the time limit.

In such a case, the DHCP server 2-0 performs the process for ring reconfiguration (S20-1) and the process for address synchronization (S30-1).

On the other hand, the DHCP servers 2-4 to 2-7 (n−1) performs the process for ring reconfiguration (S20-1) and the process for address synchronization (S30-1) based on the fact that the ring update signal is not transmitted from the DHCP server 2-0 for predetermined time.

As a result of the above-described processes, the logical rings 16-2 and 16-3 (FIG. 9) are created even if the ring update is not completed normally. Furthermore, the VS and VSS are reconfigured.

Figure 11:
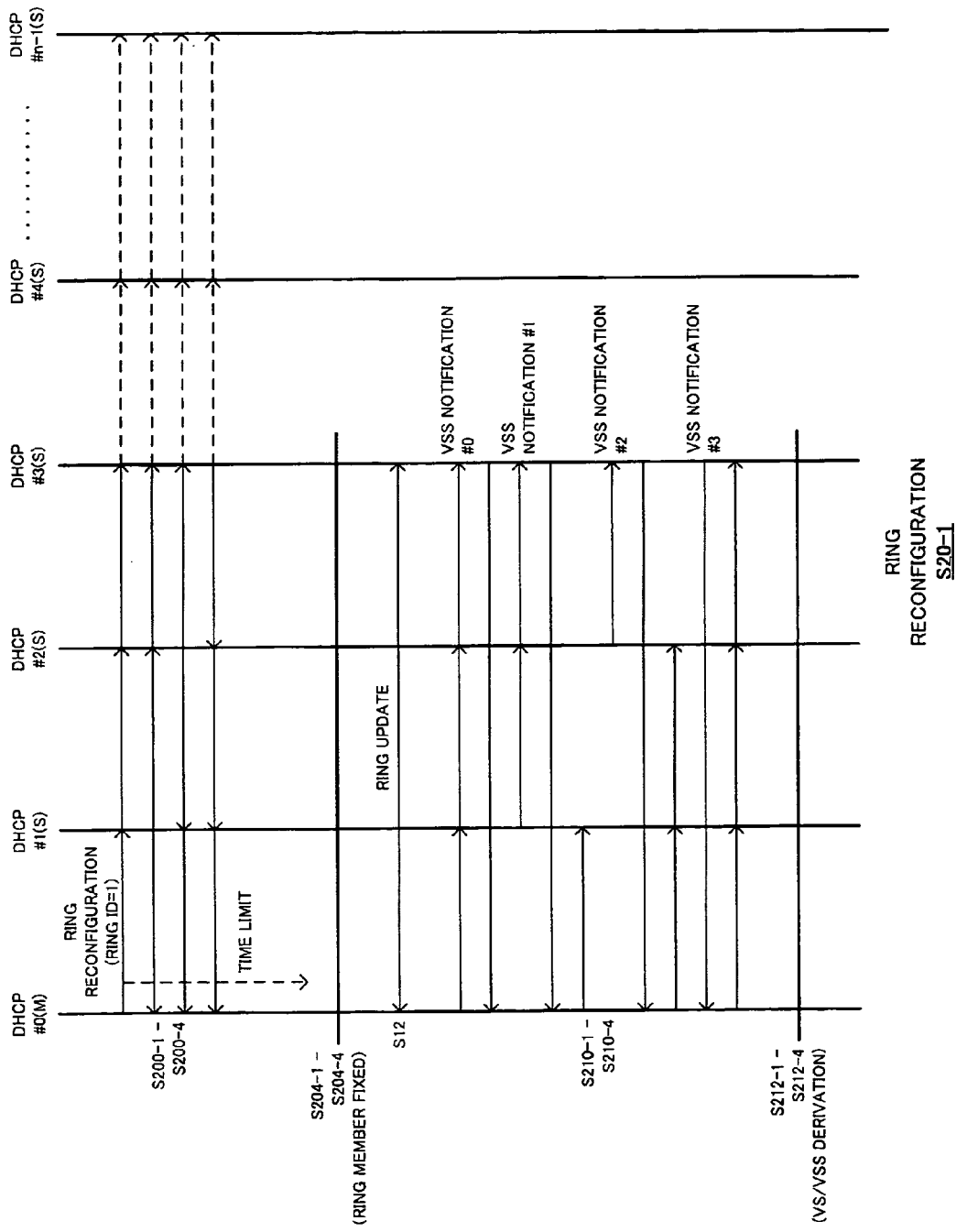
FIG. 11 A diagram showing a communication sequence illustrating a ring reconfiguration process in the DHCP servers (a logical ring.

FIG. 11 is a diagram showing a communication sequence illustrating the ring reconfiguration process (S20-1) in the DHCP servers 2-0 to 2-4 (the logical ring 16-2; FIG. 9) shown in FIGS. 8 and 10.

At steps 200-1 to 200-4 (S200-1 to S200-4), each of the DHCP servers 2-0 to 2-3 includes a ring ID=1 as a parameter for the network 14 in the network system 1 (FIG. 1) to broadcast or multicast a signal for the notification of ring reconfiguration.

The ring reconfiguration signal is transmitted only between the DHCP servers 2-0 to 2-3 that are capable of intercommunicating; as indicated with a broken line, the ring reconfiguration signal is not transmitted to the other DHCP servers 2-4 to 2-7 (n−1).

At steps 204-1 to 204-4 (S204-1 to S204-4), when a time limit is exceeded after the transmission of each of the ring reconfiguration signals, each of the DHCP servers 2-0 to 2-3 determines that the DHCP servers 2-0 to 2-3 receiving the ring reconfiguration signal within the time limit are included in the same logical ring 16-2 to fix the DHCP servers 2 (ring members) included in the logical ring 16-2 to which each ring reconfiguration signal belongs.

Furthermore, the DHCP server 2-0 determines that the server ID having the smallest value should be assigned to the DHCP server 2-0 itself so that the DHCP server 2-0 serves as the master DHCP server 2 in the logical ring 16-2 and the other DHCP servers 2-1 to 2-3 should be the slave DHCP servers 2.

Moreover, each of the DHCP servers 2-0 to 2-3 identifies its own order of priority in the logical ring 16-2 based on the server ID assigned to itself and the server ID in the logical ring 16-1, which is notified from another DHCP server 2.

As can be easily understood, in this case, the order of priority of the DHCP servers 2-0 to 2-3 is 0 to 3 in the logical ring 16-2.

In step 12 (S12), the DHCP server 2-0 performs the process for ring update shown in FIG. 6.

At steps 210-1 to 210-4 (S210-1 to S210-4), each of the master DHCP servers 2-0 to 2-3 notifies the other DHCP servers 2 of the VSSs which have been set before the ring reconfiguration takes place.

The notification of VSSs is performed in such a manner that each of the DHCP servers 2 adds its own VSS to the notification of the VSSs received from the other DHCP servers 2 so as to relay it to the next DHCP server 2.

After the notification of VSSs circulates through the logical ring 16-2 once, it is returned to the DHCP servers 2-0 to 2-3.

At steps 212-1 to 212-4 (S212-1 to S212-4), each of the DHCP servers 2-1 to 2-2 obtains an aggregate (a Virtual Scope: VS) of VSSs set for the DHCP servers 2 to be included in the new logical ring 16-2 after the ring reconfiguration in the old logical ring 16-1 before the occurrence of the ring reconfiguration based on the VSSs notified from the other DHCP servers 2 and the VSS set to itself (FIG. 9).

Furthermore, each of the DHCP servers 2-0 to 2-3 obtains a VSS to be set to itself in accordance with the obtained VS, the number of the DHCP servers 2 included in the logical ring 16-2 and its own order of priority.

Although FIG. 11 only shows the ring reconfiguration process (S20-1) in the second logical ring 16-2 (FIG. 9), the ring reconfiguration process (S20-2) in the third logical ring 16-3 is performed in a similar manner (hereinafter, the same will be applied to each of the logical rings 16).

FIG. 12 is a view illustrating a VS that is set for each of the DHCP servers 2 shown in FIG. 1 and the like and a VS table used for managing the VS, where FIG. 12(A) shows the VSSs defined in the form of table and FIG. 12(B) shows a table of the VS (scope) in the first logical ring 16-1 shown in FIG. 3.

In each of the DHCP servers 2, the VS and the VSSs are defined by a method using recurrence formulae described below with reference to Formulae 1 to 3 or in the form of table of IP addresses and their indices set for the respective DHCP servers as shown in FIG. 12(A).

In this manner, the VS defined in the form of formula or table is set for each of the DHCP servers 2.

Figure 18:
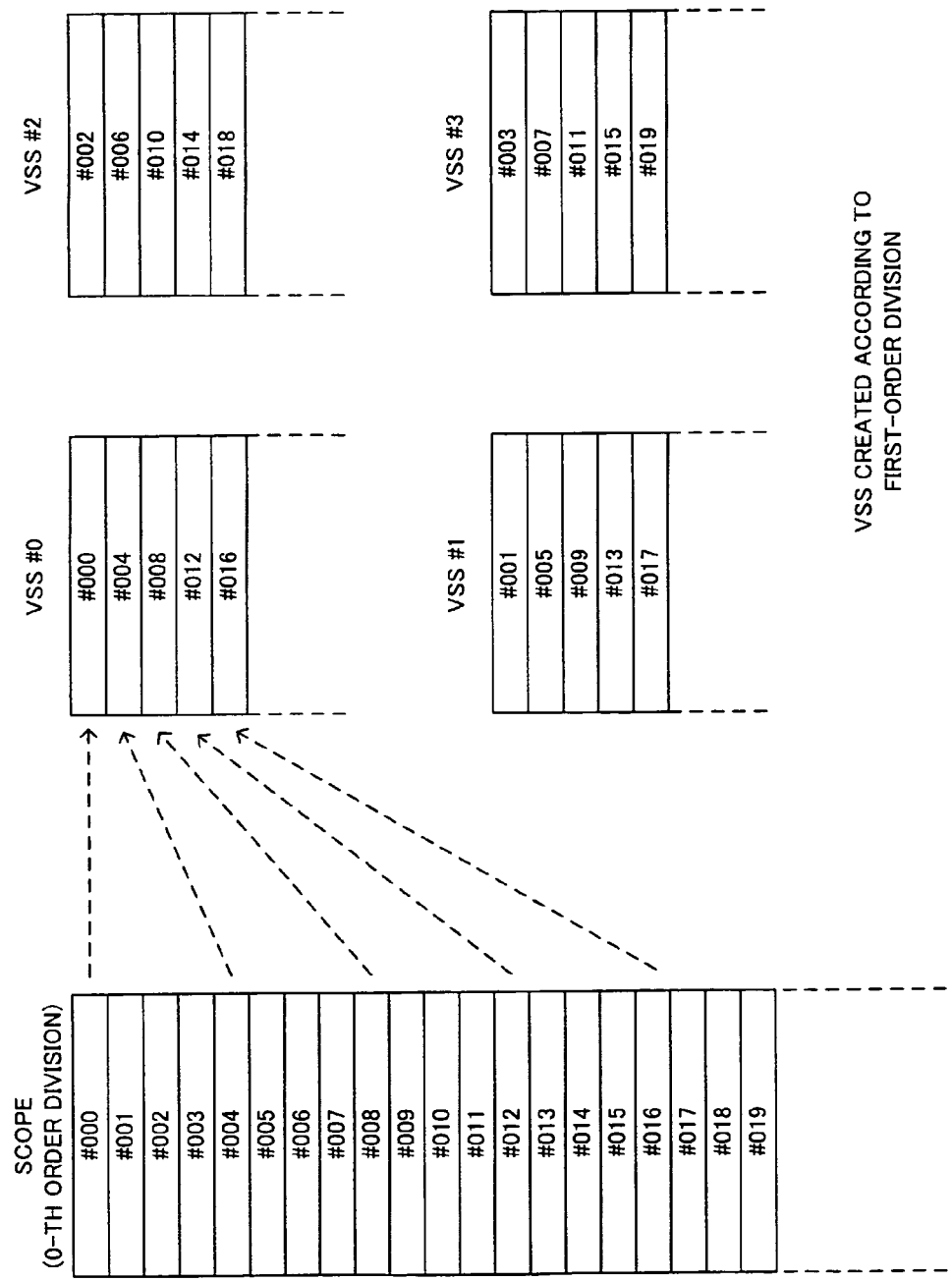
FIG. 18 A diagram showing a process of creating the VSSs respectively corresponding to the DHCP servers from an aggregate (scope) of IP addresses given to the logical ring shown in FIG. 17.

As shown in FIG. 12(B), for example, in the logical ring 16-1 (FIG. 3), the VS table that is used by the DHCP servers 2 for managing the VS contains in a correlated manner: an index of an IP address; an IP address and a MAC address; an identifier (a server ID) of the DHCP server 2 for assigning the IP address to the client computer 10; and data indicating whether the IP address is assigned or not (assigned/unassigned), whether the IP addresses are synchronized or not (synchronized/unsynchronized), an assignment time limit (lease time limit), an order of division when the IP address is assigned to the client computer 10 (the order of division will be described below with reference to FIG. 18 and the like).

As is already described with reference to FIG. 3, in the first logical ring 16-1 in an undivided state, the VS is exactly the scope that can be assigned by the DHCP servers 2-0 to 2-(n−1) as a whole to the client computer 10.

In the logical rings 16 obtained as a result of the ring reconfiguration such as the second logical ring 16-2, the VS is defined as an aggregate of all the VSSs set before the ring configuration for the DHCP servers 2, which are to be included in the logical rings 16 after the ring reconfiguration as described above.

FIG. 13 is a first view showing a communication sequence illustrating the address synchronization process (S30-1) in the DHCP servers 2-0 to 2-4 (the logical ring 16-2; FIG. 9) shown in FIGS. 8 and 14.

FIG. 13 illustrates the case where the IP address A recognized by the DHCP server 2-0 as being used by the DHCP server 2-2 is actually assigned to the client computer 10 (in use) by the DHCP server 2-2.

As illustrated in FIG. 13, the DHCP server 2-0 transmits a signal for inquiring of the DHCP server 2-2 whether the IP address A is assigned to the client computer 10 or not (IP address A is in use) to the DHCP server 2-2 in step 300-1 (S300-1).

In step 300-2 (S300-2), the DHCP server 2-1 relays the signal from the DHCP server 2-0 to the DHCP server 2-2.

In step 302-1 (S302-1), the DHCP server 2-2 transmits a signal indicating that the IP address A is in use to the DHCP server 2-3.

In step 302-2 (S302-2), the DHCP server 2-3 transmits the signal indicating that the IP address A is in use to the DHCP server 2-0.

If the signal is returned from the DHCP server 2-3 within the time limit, the DHCP server 2-0 determines that the IP address A is actually being used by the DHCP server 2-2 and stores that effect.

At steps 302-3 and 302-4 (S302-3 and S302-4), the signal indicating that the IP address A is in use circulates once through the logical ring 16-2 to be returned to the DHCP server 2-2.

As in the case of the DHCP server 2-0, the DHCP servers 2-3 and 2-1 receiving the signal indicating that the IP address A is in use determine that the IP address A is actually being used by the DHCP server 2-2 and stores that effect.

Figure 14:
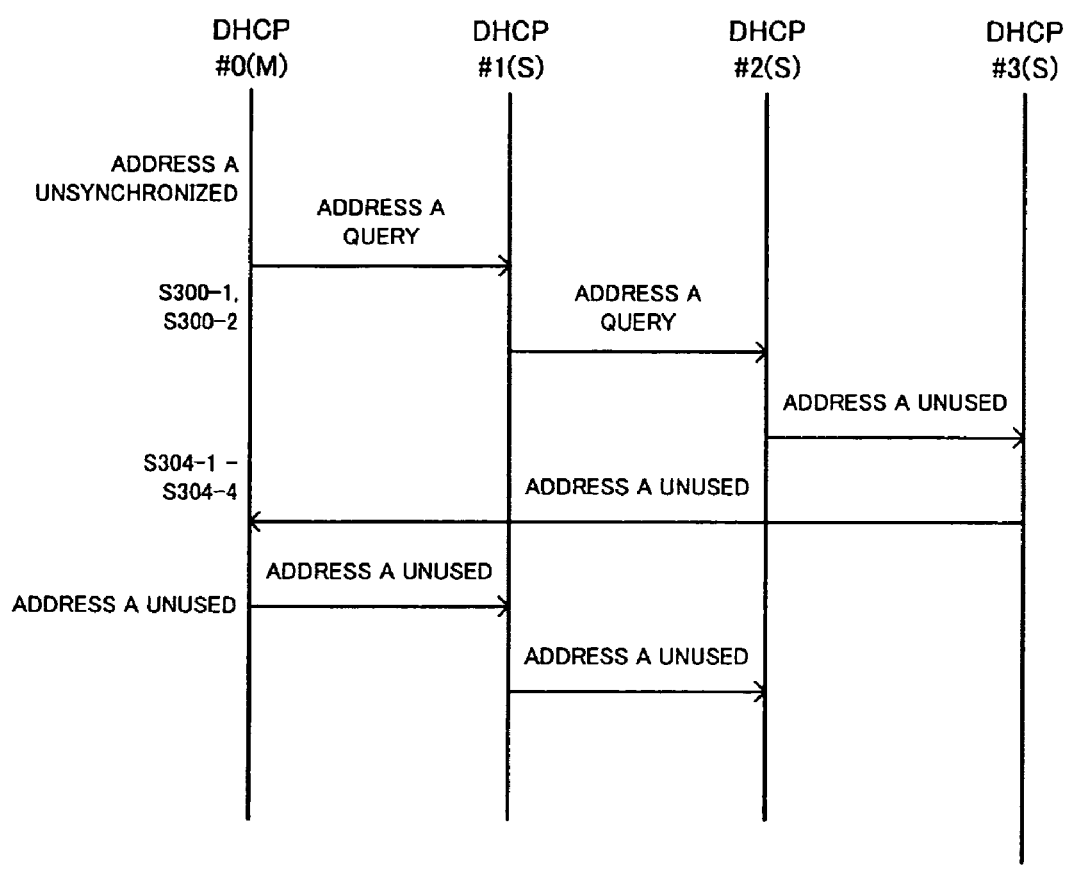
FIG. 14 A view showing a second communication sequence showing the address synchronization process in the DHCP servers (the logical ring.

FIG. 14 is a view showing a second communication sequence illustrating the address synchronization process (S30-1) in the DHCP servers 2-0 to 2-4 (the logical ring 16-2; FIG. 9) shown in FIGS. 8 and 14.

FIG. 14 illustrates the case where the IP address A recognized by the DHCP server 2-0 as being used by the DHCP server 2-2 is not actually assigned to the client computer 10 (not used) by the DHCP server 2-2, that is, the case where the addresses are not synchronized between the DHCP servers 2-0 and 2-2.

As illustrated in FIG. 14, as in the case shown in FIG. 13, the DHCP server 2-0 transmits a signal for inquiring of the DHCP server 2-2 whether the IP address A is in use or not to the DHCP server 2-2 in step 300-1 (S300-1).

In step 300-2 (S300-2), the DHCP server 2-1 relays the signal from the DHCP server 2-0 to the DHCP server 2-2.

In step 304-1 (S304-1), since the DHCP server 2-2 is not using the IP address A, the DHCP server 2-2 transmits to the DHCP server 2-3 a signal indicating the IP address A is not used in contrast with the case shown in FIG. 13.

In step 304-2 (S300-2), the DHCP server 2-3 relays a signal indicating that the IP address A is not being used to the DHCP server 2-0.

In such a case, the DHCP server 2-0 determines that the IP address A is not used by the DHCP server 2-2 and stores that effect. At steps 304-3 and 304-4 (S304-3 and S304-4), the signal indicating that the IP address A is not being used is returned to the DHCP server 2-2.

As in the case of the DHCP server 2-0, the DHCP servers 2-3 and 2-1 receiving the signal indicating that the IP address A is not being used determines that the IP address is not actually being used by the DHCP server 2-2 and stores that effect.

Figure 15:
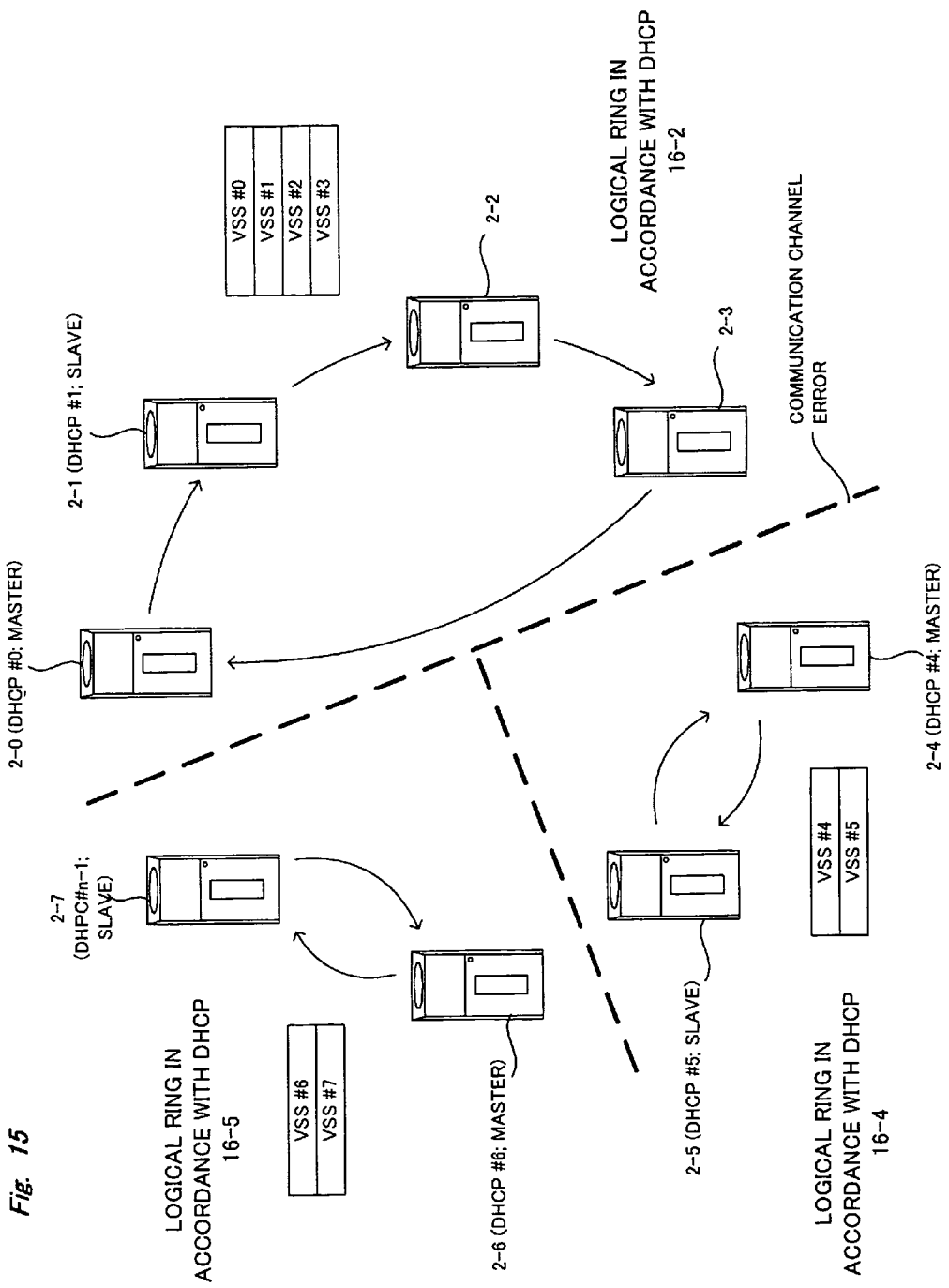
FIG. 15 A diagram illustrating a mode in which the third logical ring is reconfigured as a fourth logical ring and a fifth logical ring when an error occurs in the third logical ring shown in FIG. 9.

FIG. 15 is a diagram illustrating a mode in which the third logical ring 16-3 is reconfigured as a fourth logical ring 16-4 and a fifth logical ring 16-5 when an error occurs in the third logical ring 16-3 shown in FIG. 9.

Figure 16:
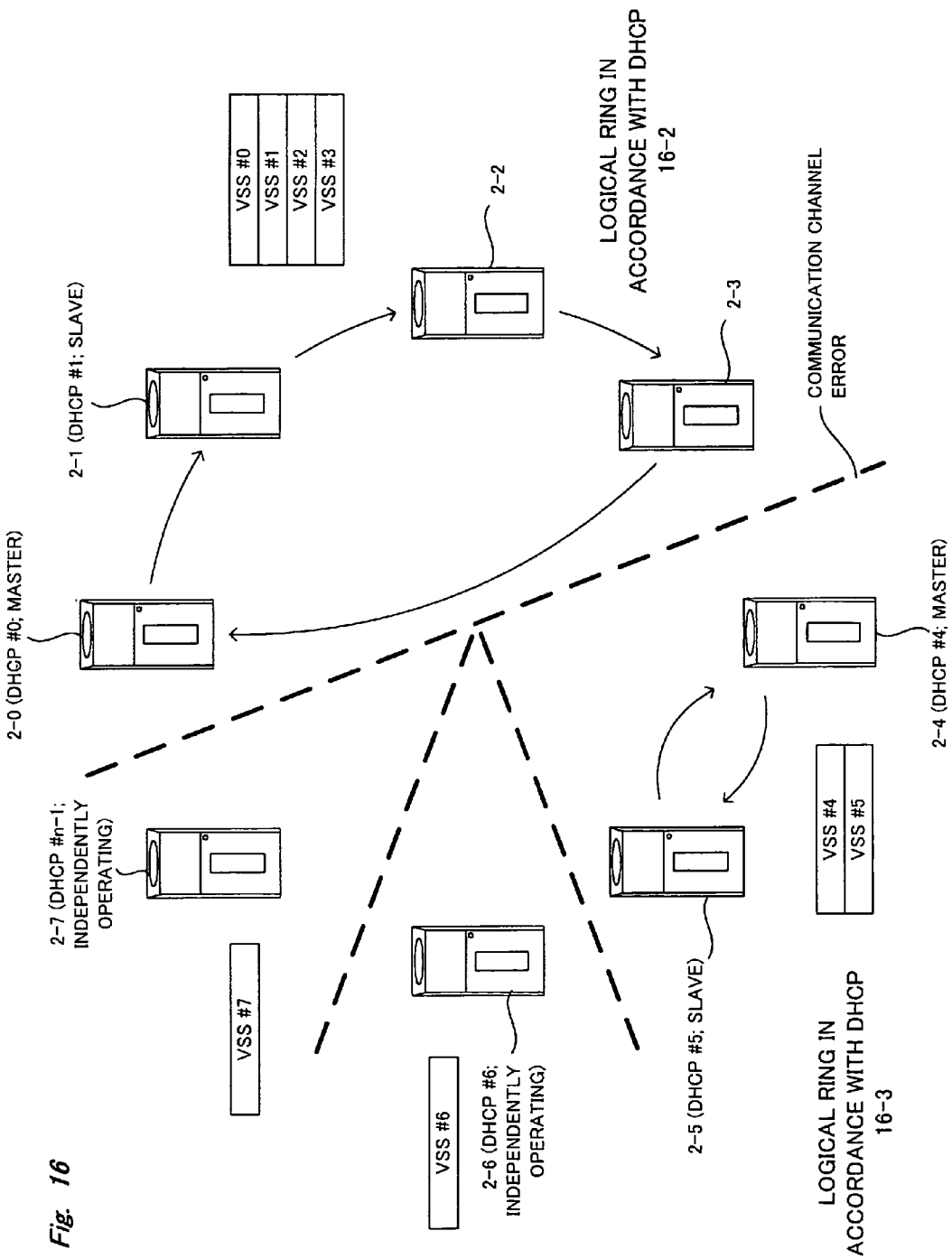
FIG. 16 A diagram illustrating a mode in which two DHCP servers are reconfigured from the third logical ring so as to operate independently when an error occurs in the fifth logical ring shown in FIG. 15.

FIG. 16 is a diagram illustrating a mode in which two DHCP servers 2-6 and 2-7(n−1) are reconfigured from the third logical ring 16-3 so as to operate independently when an error occurs in the fifth logical ring 16-5 shown in FIG. 15.

By repeating the processes described above with reference to FIGS. 3 to 14, the fourth logical ring 16-4 and the fifth logical ring 16-5 can be reconfigured from the third logical ring 16-3 when an error further occurs in the third logical ring 16-3 that disables communications between the DHCP servers 2-5 and 2-6 as shown in FIG. 15.

Furthermore, as shown in FIG. 16, when an error further occurs in the fifth logical ring 16-5 that disables communications between the DHCP servers 2-6 and 2-7 (n−1), the fifth logical ring 16-5 can be reconfigured so that each of the DHCP servers 2-6 and 2-7(n−1) can operate independently.

FIGS. 9, 15 and 16 illustrate above the case where an error occurs in the logical ring 16 that disables communications between the DHCP servers 2. However, even if various errors occur such as in the case where at least one of the DHCP servers 2 goes down to disable the IP address assignment process, similar processes for the reconfiguration of the logical rings 16, VSS reconfiguration and address synchronization are performed.

Furthermore, for example, when the communications in the second logical ring 16-2 and the third logical ring 16-3 shown in FIG. 9 are reestablished, the master DHCP server 2-0, for example, periodically performs the ring reconfiguration process (S20) shown in FIG. 11 so as to combine the plurality of logical rings 16 into one logical ring 16-1 (FIG. 3). The VSSs can be reconfigured in accordance with the combination so that the addresses can be synchronized.

[VSS Reconfiguration]

Figure 17:
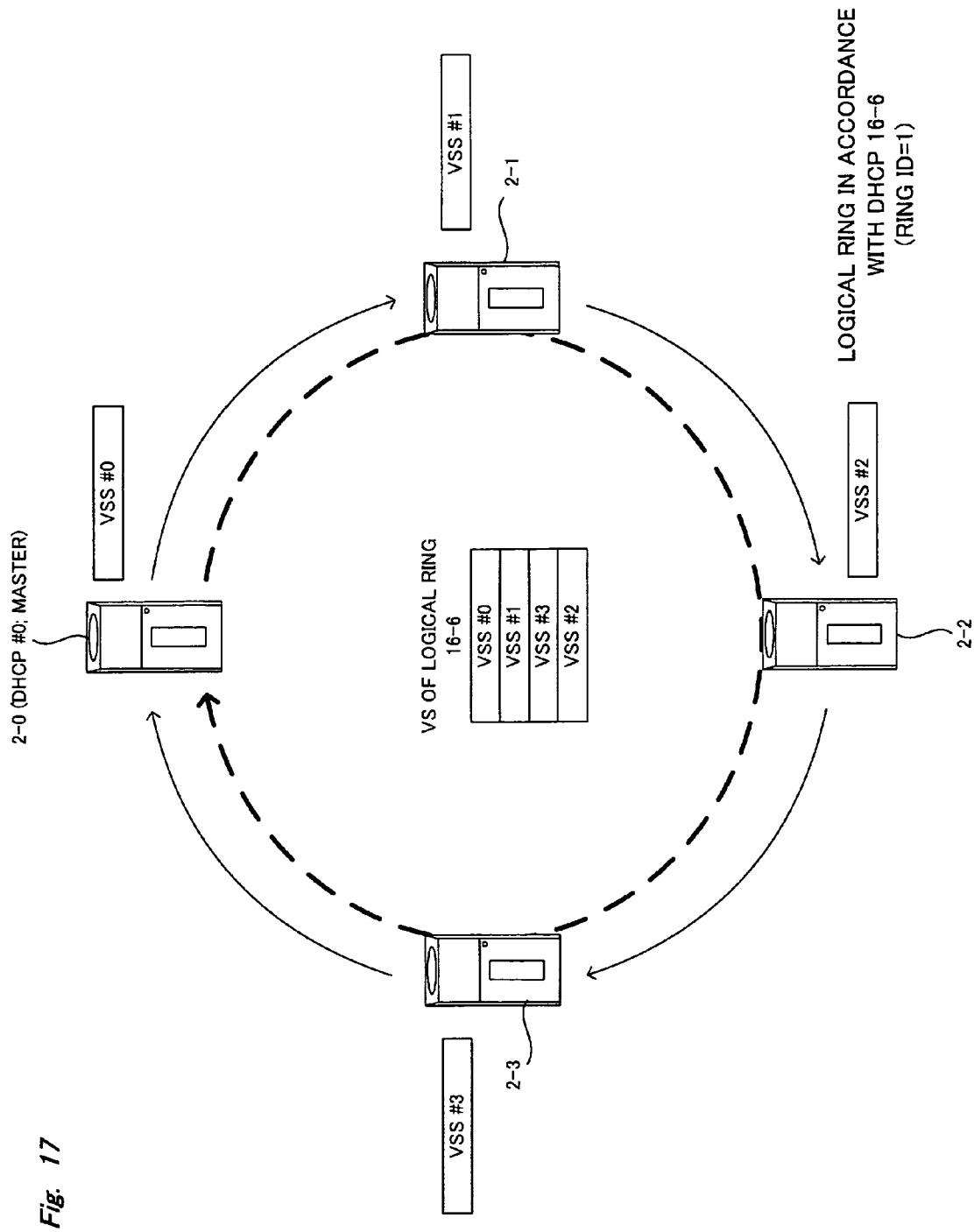
FIG. 17 A first diagram illustrating a sixth logical ring composed of four DHCP servers.

FIG. 17 is a diagram illustrating a sixth logical ring 16-6 composed of four DHCP servers 2-0 to 2-3.

Hereinafter, for clarification of the description, the logical ring 16-6 composed of the four DHCP servers 2-0 to 2-3 as shown in FIG. 17 is taken as a specific example to describe the reconfiguration of VSSs along with the division of one logical ring 16 into a plurality of logical rings 16.

FIG. 18 is a diagram showing a process of creating the VSSs respectively corresponding to the DHCP servers 2-0 to 2-3 from the aggregate (the scope) of the IP addresses given to the logical ring 16-6 shown in FIG. 17.

The DHCP servers 2-0 to 2-3 are provided with the same scope as an initial value, and do not initially have a VSS. Therefore, even if all the VSSs of the DHCP servers 2-0 to 2-3 are assembled in the logical ring 16-6, the VS is vacant (0 in size). In this case, each of the DHCP servers 2-0 to 2-3 regards its own scope as the VS. The VS at this time corresponds to the same IP address aggregate as the scope given as the initial value, which includes IP addresses #000, #001 and so on as illustrated on the left of FIG. 18.

An undivided state of the VS as described above is defined as a 0-th order division of the VS.

The 0-th order divided VS is identical with the scope given to each of the DHCP servers 2 in the logical ring 16.

When dividing the VS divided the 0-th order to equally assign the same number of IP address as much as possible to four DHCP servers 2-0 to 2-3 (the order of priority 0 to 3) forming the logical ring 16-6, the division is performed as shown on the right of FIG. 18.

Specifically, focusing on an index k of an IP address #k (k=0, 1, 2, 3, . . . (S−1)) contained in the 0-th order divided VS, the 0-th order divided VS is subjected to the first-order division into VSSs #0 to #3 respectively containing the IP addresses having the index k of the IP address #k giving k [mod] 4=0 to 3 so that the VSSs #0 to #3 are associated with the DHCP servers 2-0 to 2-3 forming the logical ring 16-6.

In the first-order divided state of the VSS, the VS of the logical ring 16 obtained by aggregating all the VSSs of the DHCP servers 2-0 to 2-3 forming the logical ring 16 corresponds to the 0-th order division and is identical with the scope corresponding to the initial value possessed by each of the DHCP servers 2-0 to 2-3.

As described above, the order of division of the VSS is always larger than that of the VS by 1.

An index $Y_1 i_1$ of the IP address in the $VSS_1 \# i_1$ ($i$=0, 1, 2, ..., $A_1$–1) set for each of $A_1$ (a subscript indicates the order of division of the VSS) DHCP servers 2-0 to 2-($A_1$–1) included in the logical ring 16 having the 0-th order divided VS can be defined by the following Formula 1.

$$Y_1 i_1 = A_1 X + B_1 i_1 \quad (1)$$

where, in Formula 1, the order of priority of the DHCP server 2-$i_1$ is $B_1 i_1$, and X is an integer equal to or larger than 0, satisfying $$Y_1 i_1 \leq S - 1.$$

Figure 19:
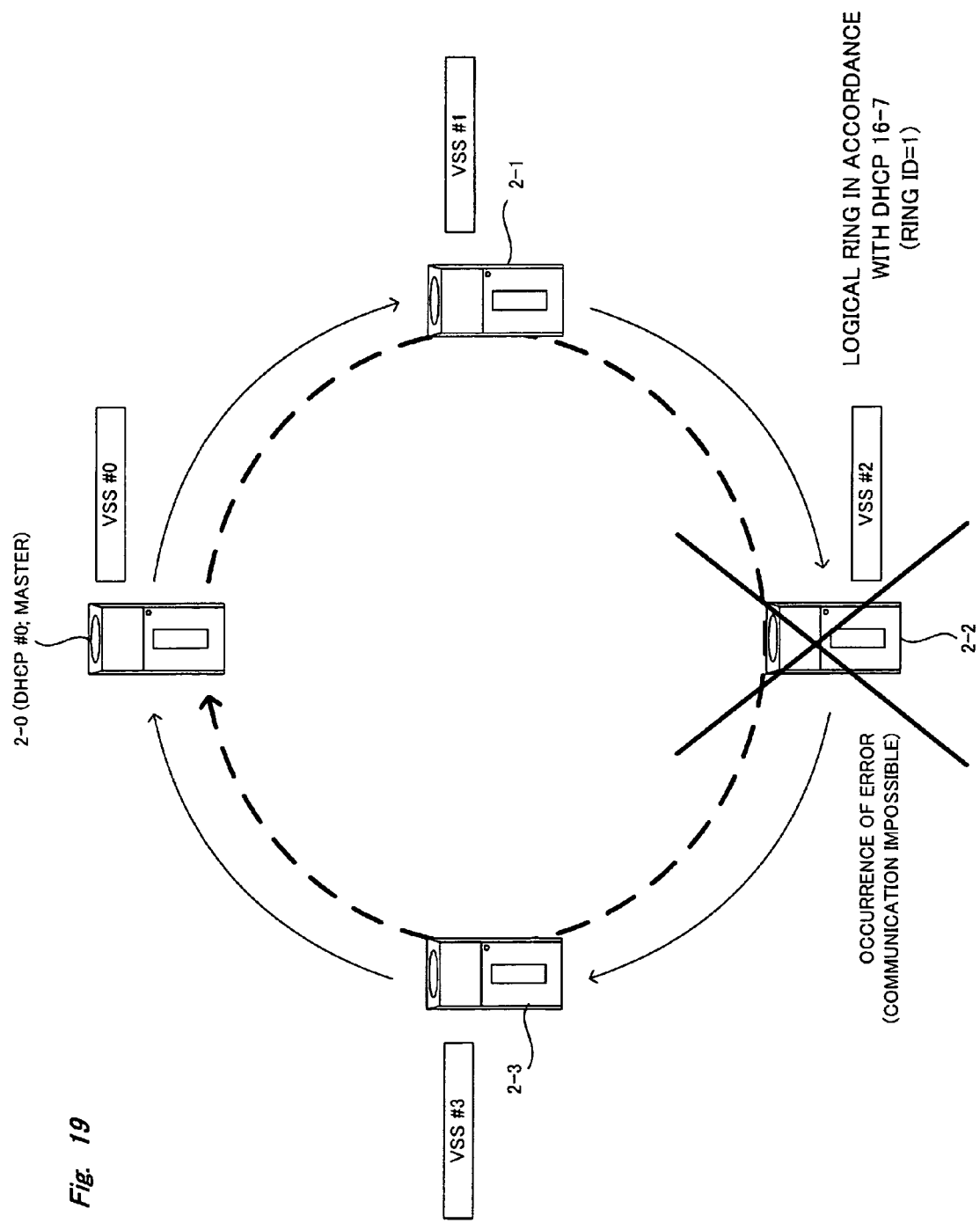
FIG. 19 A first diagram illustrating an error occurring in the logical ring shown in FIG. 17.

FIG. 19 is a first diagram illustrating an error occurring in the logical ring 16-6 shown in FIG. 17.

Hereinafter, as shown in FIG. 19, the case where the communication to the DHCP server 2-2 from the other DHCP servers 2 becomes impossible in the logical ring 16-6 is taken as a specific example.

In such a case, the master DHCP server 2-0 reconfigures a seventh logical ring 16-7 including only the DHCP servers 2-0, 2-1 and 2-3 from the sixth logical ring 16-6 as is already described above.

In the logical ring 16-7, the orders of priority A20 to A22 of the DHCP servers 2-0, 2-1 and 2-3 are 0 to 2.

Figure 20:
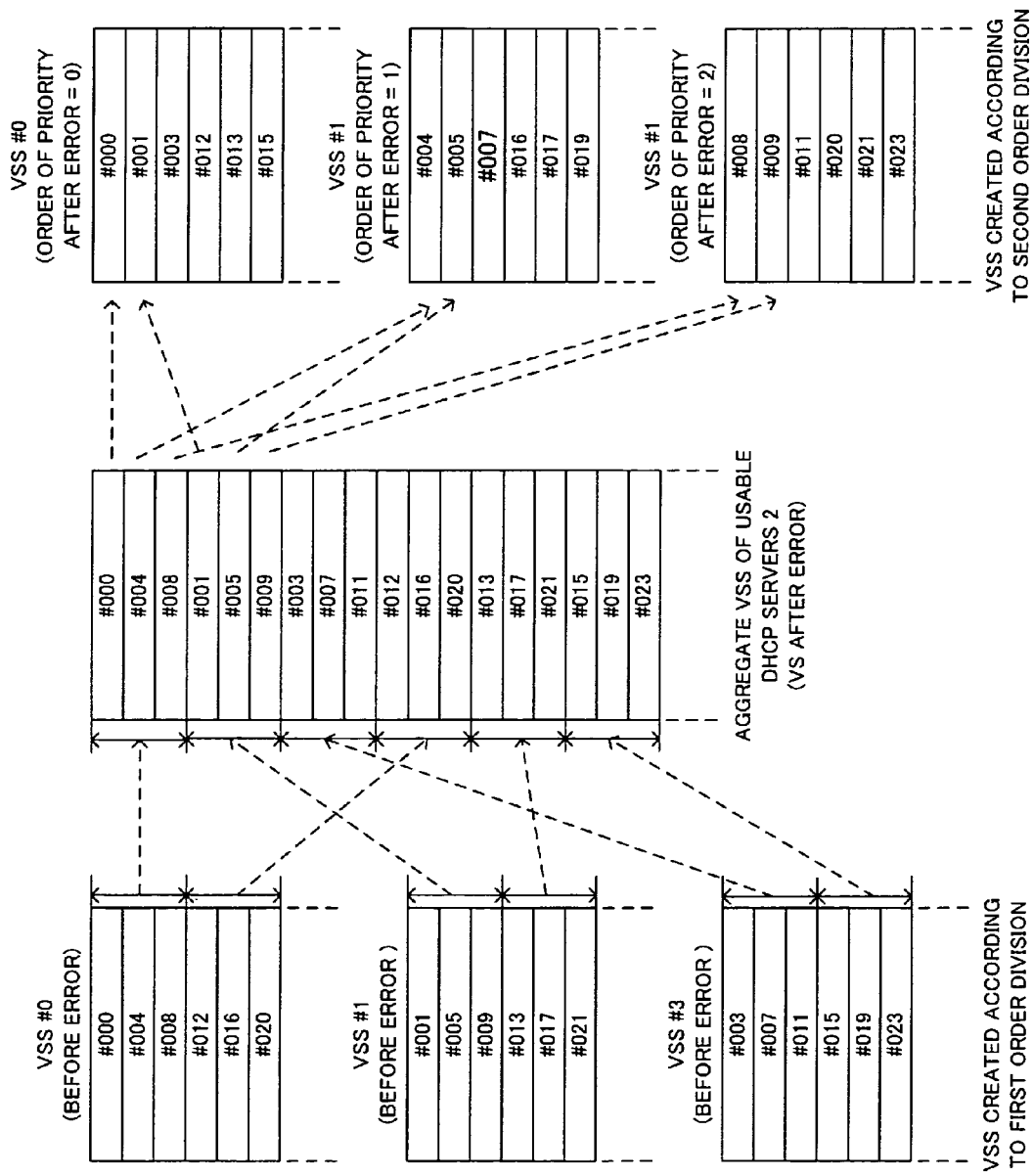
FIG. 20 A diagram illustrating a VSS reconfiguration with the DHCP servers shown in FIG. 19.

FIG. 20 is a diagram illustrating the VSS reconfiguration with the DHCP servers 2-0, 2-1 and 2-3 shown in FIG. 19.

On the other hand, since the DHCP servers 2-0, 2-1 and 2-3 cannot know whether the DHCP server 2-2 is operating or not, it is necessary to reconfigure the VS and the VSSs so that the IP address can be assigned to the client computer 10 without using the VSS #2 correlated with the DHCP server 2-2 as shown in FIG. 18.

In order to satisfy the requirement as described above, as shown on the left of FIG. 18 and on the left of FIG. 20, the DHCP servers 2-0, 2-1 and 2-3 aggregate the IP addresses included in the VSSs #0, #1 and #3 respectively associated with the DHCP server 2-0 and the DHCP servers 2-1 and 2-3 capable of communicating with the DHCP server 2-0 before the occurrence of an error in the mode as shown in the center of FIG. 20. In this manner, the VS of the logical ring 16 including the DHCP servers 2-0, 2-1 and 2-3, which is reconfigured after the occurrence of the error, is obtained.

The VS in this case is the VS of the first-order division.

Furthermore, the aggregate of the IP addresses included in the thus assembled VSSs #0, #1 and #3, that is, the VS of the first order division is subjected to the second order division in the same manner as that in the first order division from the 0-th order divided VS as shown on the right of FIG. 20 to obtain new VSSs #0, #1 and #3 after the occurrence of an error. As a result, the VSSs in the logical ring 16-6 can be reconfigured as VSSs in the logical ring 16-7.

Each time a certain logical ring 16 is divided into a plurality of logical rings 16, the IP addresses contained in the VSSs corresponding to the DHCP servers 2 forming each of the logical rings 16 are aggregated as the VS, which is further divided into new VSSs for reconfiguration. As a result, a new VSS can be associated with each of the DHCP servers 2 forming the logical ring 16.

The index $Y_2 i_2$ of the IP address in the $VSS_2 \# i_2$ ($i$=0, 2, ..., $A_2$–1) in the state of the n-th order division, which is set for each of $A_2$ DHCP servers 2-0 to 2-($A_2$–1) included in the logical ring 16 after the reconfiguration of the ring can be defined where $G_1$ is a total number of $B_1$, expressed in Formula 2 below.

$$Y_2 i_2 = A_1 (A_2 X + B_2 i_2) + B_1 j_1 (0), \quad (2)$$
$$\vdots$$
$$= A_1 (A_2 X + B_2 i_2) + B_1 j_1 (B_1 - 2) \text{ and}$$
$$= A_1 (A_2 X + B_2 i_2) + B_1 j_1 (B_1 - 1)$$

where, in Formula 2, the order of priority of the DHCP server 2-$i_2$ is $B_2 i_2$, X is an integer equal to or larger than 0, satisfying $Y_2 i_2 \leq S - 1$, and $j_1(0)$ to $j_1(B_1-1)$ are the orders of priority respectively given to the DHCP servers 2 prior to the ring reconfiguration, which are to be included in the logical ring 16 obtained by the ring reconfiguration (however, the order of priority of the DHCP server 2 that does not have the order of priority given prior to the ring reconfiguration is excluded).

Other symbols are identical to those of method 1.

The VSS reconfiguration described above will be further described below.

As is already described above with reference to FIG. 18, the state where the VS identical with the scope corresponding to the initial value possessed by each of the DHCP servers 2 forming the logical ring 16 is not divided is referred to as the 0-th order divided VS.

Moreover, as is already described above with reference to FIGS. 17 and 18, the state where the IP addresses contained in the 0-th order divided VS are divided into VSSs respectively corresponding to the DHCP servers 2 forming the logical ring 16 is referred to as the first order divided VSS.

Furthermore, as is already described above with reference to FIGS. 19 and 20, the state where the VS obtained by aggregating the VSSs obtained as a result of the first order division does not return to the 0-th order division for lack of a part of the VSSs (that is, remains as the first order division) and is reconfigured as new VSSs, is referred to as the second order divided VSS.

As described above, the VSS reconfigured along with the division of the VS of the logical ring 16 for n–1 times can be defined as the VSS obtained by the n-th order division. Hereinafter, the number n of division of the VS is defined as the order of division.

The above-described Formula 2 can be further generalized. The index $Y_n i_n$ of the IP address in the $VSS_n \# i_n$ ($i_n$=0, 1, 2, ..., $A_n$–1) in the state of the n-th order division, which is set for each of $A_n$ DHCP servers 2-10 to 2-($A_n$–1) included in the logical ring 16 after the reconfiguration of the ring can be recursively defined by $G_0, G_1, \ldots, G_{n-1}$ formulae where $G_n$ is a total number of $B_n$, as expressed in Formula 2 below.

Hereinafter, the number $G_0, G_1, \ldots, G_{n-1}$ of formulae in the VSS with the order of division n is referred to as $F_n$.

$$Y_n i_n = A_{n-1}(A_n X + B_n i_n) + B_{n-1} j_{n-1}(0), \quad (3)$$
$$= A_{n-1}(A_n X + B_n i_n) + B_{n-1} j_{n-1}(B_{n-1} - 2) \text{ and}$$
$$= A_{n-1}(A_n X + B_n i_n) + B_{n-1} j_{n-1}(B_{n-1} - 1)$$

where, in Formula 3, the order of priority of the DHCP server 2-$i_n$ is $B_n i_n$, X is an integer equal to or larger than 0, satisfying $Y_n i_n \leq S - 1$, and $j_{n-1}(0)$ to $j_{n-1}(B_{n-1}-1)$ are the orders of priority respectively given to the DHCP servers 2 prior to the ring reconfiguration, which are to be included in the logical ring 16 obtained by the ring reconfiguration, (however, the order of priority of the DHCP server 2 that does not have the order of priority given prior to the ring reconfiguration is excluded).

As described above, the history of change of VSSs from the VS in the logical ring in the 0-th order division state through the VS in the logical ring 16 in the n−1-th order division state to the VSS in the n-th order division state of each of the DHCP servers 2 forming the logical ring 16 can be stored in the form of recursive formula in each of the DHCP servers 2 as expressed in Formulae 1 to 3.

When the logical rings 16 are restored to a single form again along with the recovery from an error or the like, each of the DHCP servers 2 after restoration can calculate back the stored recursive formulae so as to calculate and reset the VSS used in the restored logical ring 16.

[VSS Duplication Determination]

As described above, the VSSs respectively assigned to the DHCP servers 2 are not the same in principle in any logical ring 16 obtained by the reconfiguration from the logical ring 16-1 (FIG. 3).

Therefore, even if the VSSs are combined when a plurality of logical rings 16 are to be reconfigured as a single logical ring 16, the IP addresses contained in the VSSs to be combined are never the same.

However, the possibility that the IP address duplication may occur between a plurality of VSSs is not 0 because of some processing error. Therefore, if the occurrence of duplication can be determined to take a measure of excluding any of the VSSs causing the duplication from the combination or the like, the reliability of the logical ring 16 can be further enhanced.

Herein, Formula 3 is expressed in the following manner, $$Y_n i_n = A_{n-1}(A_n X + B_n i_n) + B_{n-1} j_{n-1}(0), \quad (3)$$
$$= A_{n-1}(A_n X + B_n i_n) + B_{n-1} j_{n-1}(B_{n-1} - 2) \text{ and}$$
$$= A_{n-1}(A_n X + B_n i_n) + B_{n-1} j_{n-1}(B_{n-1} - 1)$$

can be expressed in a simplified form as Formula 4 below.

$$Y_n i_n = C_n X + E_n i_n(0), \quad (4)$$
$$\vdots$$
$$= C_n X + E_n i_n(F_n - 2) \text{ and}$$
$$= C_n X + E_n i_n(F_n - 1)$$

Herein, indices $Y_n i1_n$ and $Y_n i2_n$ of the IP addresses included in the VSSs set for two DHCP servers 2 are expressed by Formulae 5-1 and 5-2 as follows.

$$Y_n i1_n = C_n X_1 + E_n i1_n(0), \quad (5\text{-}1)$$
$$\vdots$$
$$= C_n X_1 + E_n i1_n(F_n - 2) \text{ or}$$
$$= C_n X_1 + E_n i1_n(F_n - 1)$$
$$Y_n i2_n = C_n X_2 + E_n i2_n(0), \quad (5\text{-}2)$$
$$\vdots$$
$$= C_n X_2 + E_n i2_n(F_n - 2), \text{ or}$$
$$= C_n X_2 + E_n i2_n(F_n - 1)$$

where $X_1$ and $X_2$ are integers equal to or larger than 0, satisfying $Y_n i1_n \leq S-1$ and $Y_n i2_n \leq S-1$, respectively.

When the two VSSs are the same, Formula 6 below is established.

$$Y_n i1_n = Y_n i2_n \quad (6)$$

When the two VSSs are the same, any one of Formulae 7 below is established.

$$C_n X_1 + E_n i1_n(0) = C_n X_2 + E_n i2_n(0), \quad (6)$$
$$\vdots$$
$$= C_n X_2 + E_n i2_n(F_n - 2), \text{ or}$$
$$= C_n X_2 + E_n i2_n(F_n - 1),$$

or $$C_n X_1 + E_n i1_n(1) = C_n X_2 + E_n i2_n(0),$$
$$\vdots$$
$$= C_n X_2 + E_n i2_n(F_n - 2), \text{ or}$$
$$= C_n X_2 + E_n i2_n(F_n - 1),$$

or $$\vdots$$

$$C_n X_1 + E_n i1_n(F_n - 1) = C_n X_2 + E_n i2_n(0),$$
$$\vdots$$
$$= C_n X_2 + E_n i2_n(F_n - 2), \text{ or}$$
$$= C_n X_2 + E_n i2_n(F_n - 1),$$

Each of the equations included in Formula 6 can be simplified as Formula 7 as follows.

$$aX_1 + b = cX_2 + d \quad (7)$$

However, in Formula 7, $$0 \leq b < a, \quad (8)$$
$$0 \leq d < c, \quad (9)$$
$$0 \leq aX_1 + b < S, \; 0 \leq cX_2 + d < S. \quad (10)$$

When Formula 7 is transformed, Formula 11 is obtained below, where each of $aX_1$ and $cX_2+d-b$ is a multiple of a.

$$aX_1 = cX_2 + (d-b) \quad (11)$$

Therefore, if both $cX_2$ and (d−b) are multiples of a, that is, when the following Formula 12 is established and the sum of a residue system of a of $cX_2$ and a residue system of a of (d−b) is a, more specifically, when the following Formula 13 is established, duplication of the two VSSs occurs.

Accordingly, the following Formulae 12 and 13 are executed for each of the equations included in Formula 6 to determine whether the two VSSs are the same.

$$cX_2[\text{mod}]a=0 \text{ and } (d-b)[\text{mod}]a=0 \quad (12), \text{ or,}$$

$$cX_2[\text{mod}]a+(d-b)[\text{mod}]a=a \quad (13)$$

Herein, A and B are defined as expressed in Formulae 14 and 15 below. If a value of a−B is contained in a set of A, it can be determined that the IP addresses contained in the two VSSs are the same.

$$A=cX_2[\text{mod}]a \quad (14)$$

$$B=(d-b)[\text{mod}]a \quad (15)$$

Alternatively, when a value of B is 0 and a value of c is a multiple of a, it can be determined that the IP addresses contained in the VSS1 and VSS2 are the same.

If Formulae 14 and 15 are assigned in the following Formula 16, Formula 17 below can be obtained.

$$A=(a-B)[\bmod]a \quad (16)$$

$$cX_2[\bmod]a=(a-(d-b)[\bmod]a)[\bmod]a \quad (17)$$

When $X_2$ satisfying Formula 17 is obtained and $X_2$ satisfies Formulae (9) and (11), an index Y of the duplicate IP address can be obtained by Formula 18 below.

By performing the above-described process for each of the equations expressed in Formula 6, the duplicate IP address (the index of the IP address) in the two VSSs can be obtained.

$$Y=cX_2+d \quad (18)$$

[Determination Whether or not an Index Value of a Certain IP Address is Contained in the VSS]

Hereinafter, the determination whether or not an index value of a certain IP address is contained in the VSS will be described.

The determination is employed for determining with an index value k of an IP address #k whether or not the IP address is contained in the VSS to be determined and the IP address is assigned to the client computer 10.

Since the index value Y of the IP address to be determined should satisfy the above-described Formula 11 and the index value Y is expressed by Formula 19 below, it can be determined that the index value of the IP address is contained in the VSS to be determined if Formula 20 below is satisfied.

$$Y=aX_1+b \quad (19)$$

$$(Y-b)[\bmod]a=0 \quad (20)$$

According to the above-described method, based on the history of change of the VSS of each of the DHCP servers 2, which is stored in the form of order of division and recurrence formula of each of the logical rings 16, (a) the VSSs can be easily reconfigured, and (b) the division and combination of the VSSs;

(c) the determination of VSS duplication; and (d) the determination whether or not a certain IP address is contained in the VSS to be determined can be performed by simple calculations.

Therefore, if the VSS is defined by the recurrence formulae to be used for the notification between the DHCP servers 2, it is no longer necessary to transmit all the IP addresses in the VSSs between the DHCP servers 2 as in the case where the VSS is defined in the form of table (FIG. 12(A)). Therefore, the amount of information to be transmitted between the DHCP servers 2 can be reduced for the reconfiguration of the logical ring 16 and the division and combination of the VSSs.

[IP Address Proxy Reassignment]

Hereinafter, an IP address proxy assignment process when an error occurs in the logical ring 16 will be described.

Figure 21:
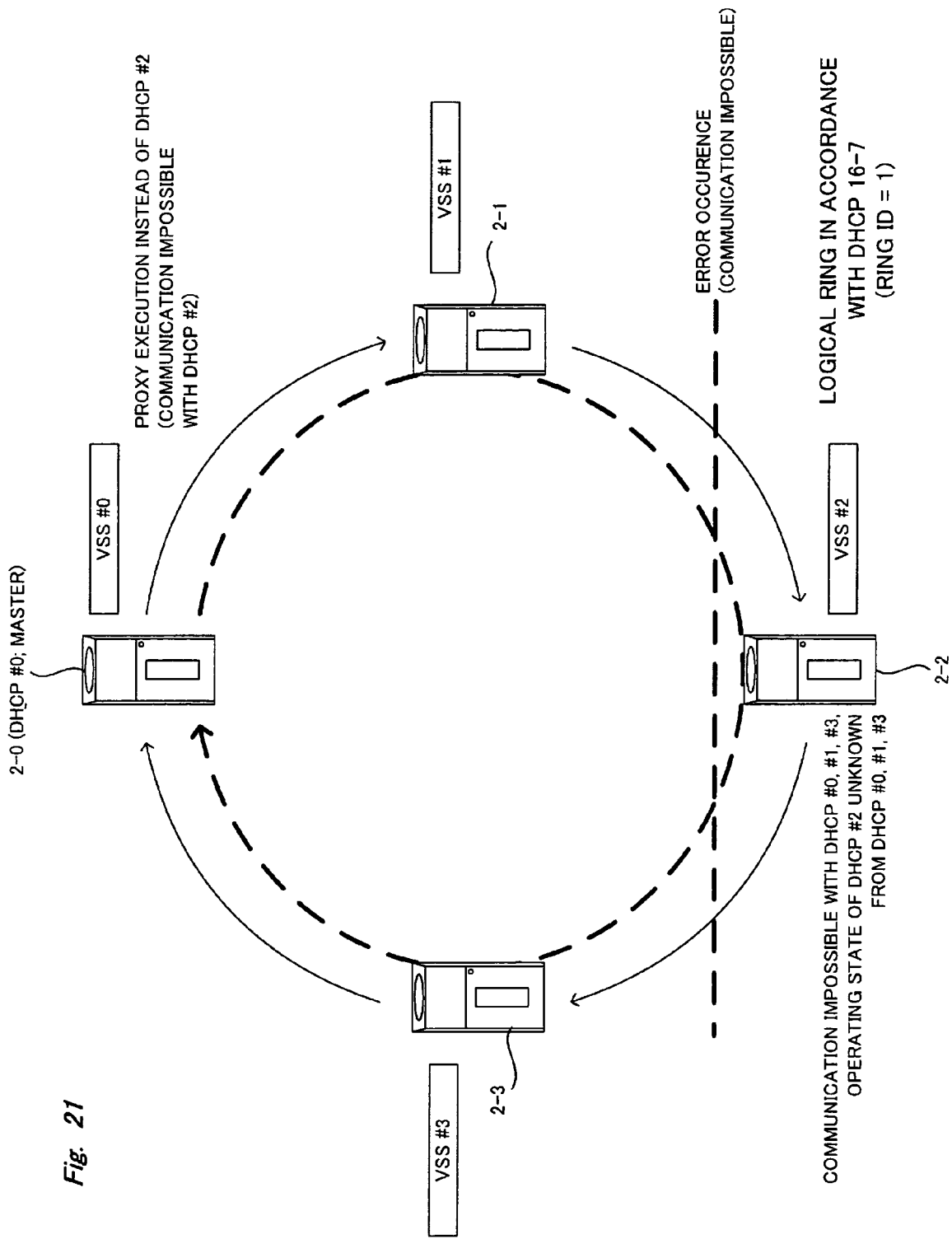
FIG. 21 A second diagram illustrating an error occurring in the logical ring shown in FIG. 17.

FIG. 21 is a second diagram illustrating an error occurring in the logical ring 16-6 shown in FIG. 17.

As shown in FIG. 21, as in the case illustrated in FIG. 19, communication between the DHCP server 2-2 in the logical ring 16-6 and the other DHCP servers 2-0, 2-1 and 2-3 becomes impossible, so that the DHCP servers 2-0, 2-1 and 2-3 cannot know the operating state indicating whether or not the DHCP server 2-2 is operating normally in some cases.

In such a case, for example, the master DHCP server 2-0 in the logical ring 16-7 obtained by the ring reconfiguration performs the processing of the DHCP server 2-2 instead of the DHCP server 2-2.

If the master DHCP server 2-0 reassigns an IP address instead of the DHCP server 2-2 when the client computer 10 which cannot communicate with the DHCP server 2-2 reassigns an IP address to the DHCP server 2-2 or the like before the IP address assignment time limit expires, the IP address assignment to the client computer 10 is not interrupted. As a result, communication can be prevented from being interrupted.

Herein, the case where only the communication between the DHCP servers 2-0 and 2-2 becomes impossible whereas the DHCP server 2-2 itself is capable of performing the processing normally will be considered.

In such a case, at the time when the link reconfiguration occurs, the IP address assigned by the DHCP server 2-0 in the proxy processing to the client computer 10 remains continuously reassigned to the client computer 10 whereas the DHCP server 2-2 cannot receives an IP address reassignment request from the client computer 10 to release the IP address at the assignment time limit.

Thereafter, if it happens that the DHCP server 2-2 assigns the same (released) IP address to another client computer 10 independently of the DHCP server 2-0, inconsistency sometimes occurs in the IP address assignment state between the DHCP servers 2-0 and 2-2.

In order to eliminate such inconsistency, the measures as described in (1) to (7) below are taken so that the DHCP server 2-0 is capable of performing the proxy processing in accordance with the IP address reassignment request to the DHCP server 2-2 in the logical ring 16-7 and the like.

(1) The DHCP servers 2 are provided with a proxy ARP server function for realizing an ARP (Address Resolution Protocol) in addition to the function described above as the DHCP servers.

(2) A "gratuitous ARP request" (according to the translation in "TCP/IP illustrated, Vol 1.1, the Protocols; by W. Richard Stevens, translated in Japanese by Yasuo Tachibana and Shoji Inoue, edited by Pearson Education Japan) is made to the slave DHCP servers 2 in the new logical ring 16. With the gratuitous ARP request, the master DHCP server 2 in the new logical ring 16 after the ring reconfiguration resolves the IP address of the DHCP server 2, which is included in the logical ring 16 before the ring reconfiguration but not in the new logical ring 16, to a MAC address of the master DHCP server 2.

Moreover, after the ring reconfiguration, each of the DHCP servers 2 sends a "gratuitous ARP request" to resolve its own address to its own MAC address.

(3) When an error occurs in the communication between the DHCP server 2-2 and the other DHCP servers 2-0, 2-1 and 2-3 in the logical ring 16-6 to induce the ring reconfiguration, the master DHCP server 2-0 in the logical ring 16-7 looks up the VS table shown in FIG. 12(B) to obtain the DHCP server 2 not included in the logical ring 16-7 (in the example shown in FIG. 21, the DHCP server 2-2) after the ring reconfiguration among the DHCP servers 2 in the logical ring 16-6, which assign the IP address to the client computer 10 at the time when the ring reconfiguration occurs.

(4) The master DHCP server 2-0 in the logical ring 16-7 stores the IP address of the DHCP server 2-2, which is not included in the logical ring 16-7 after the ring reconfiguration but assigns the IP address to the client computer 10 at the time of the ring reconfiguration, in a proxy reply list.

(5) The master DHCP server 2-0 sends a gratuitous ARP request to the other DHCP servers 2 (the DHCP servers 2-1 and 2-3) in the logical ring 16-7 so that the IP address of the DHCP server 2-2 contained in the proxy reply list is resolved to the MAC address of the DHCP server 2-0. In this manner, the master DHCP server 2-0 is capable of receiving the IP address reassignment request issued from the client computer 10 to the DHCP server 2-2 and the like in the logical ring 16-7.

(6) The master DHCP server 2-0 receives the IP address reassignment request issued to the DHCP server 2-2 and the like in addition to the IP address reassignment request issued to itself and performs the processing instead of the DHCP server 2-2.

(7) The DHCP servers 2-0 to 2-3 store all the IP addresses reassigned after the occurrence of the ring reconfiguration in association with the order of division (for example, n) of the VS at the time of the occurrence of the ring reconfiguration (FIG. 12(B)). The order of division of the VS is identical with the number of division of the logical ring 16.

For the IP address having a larger order of division of the VS stored in association than that of the VS at the occurrence of the ring reconfiguration, the associated order of division of the VS is reset to that of the VS at the occurrence of the ring reconfiguration.

The DHCP servers 2-0 and 2-2 do not reuse the IP address, which is already assigned by the DHCP server 2-2 to a certain client computer 10 at the time when the ring reconfiguration occurs, so as not to assign it to the other client computers 10 even if the assignment time limit expires before the recovery from the error is achieved or the network system 1 is restored to an initial state by an administrator so that the order of division of the VS in the logical ring 16 is reduced to the order of division of the VS stored with the IP address or smaller.

In this manner, inconsistency can never be generated in the IP address assignment state between the DHCP server 2-2 and the other DHCP servers 2-0, 2-1 and 2-3.

The order of division of the VS is handled as follows.

(i) The order of division of the VS in the logical ring 16 at the time of the IP address assignment is stored at that time as an order of division to be stored with the IP address.

(ii) If the order of division stored with the IP address is larger than that of the VS in the logical ring at the time of ring reconfiguration, the order of division is overwritten by the order of division of the VS in the logical ring 16 at the time of ring reconfiguration.

(iii) The IP address is not assigned even if the assignment time limit expires unless the order of division of the VS of the logical ring 16 at that time becomes equal to or less than that of the VS stored with it.

By handling the order of division of the VS in this manner, the proxy reassignment processing of the IP address can be performed without regarding the 0-th order division as special.

Figure 22:
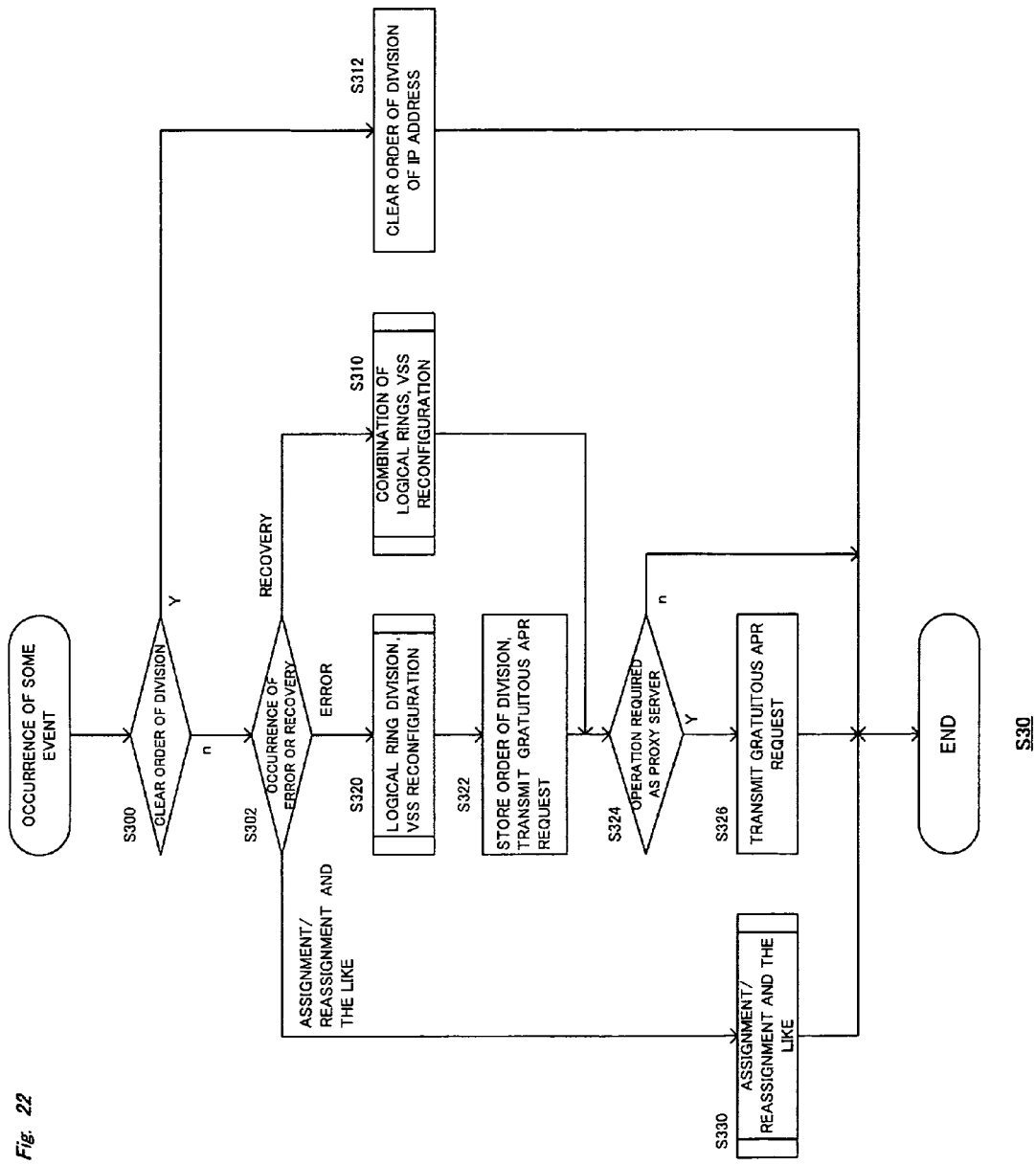
FIG. 22 A flowchart showing a proxy process (S30) in which the DHCP server in a logical ring shown in FIG. 21 performs a function of the DHCP server departing from the logical ring.

FIG. 22 is a flowchart showing a process (S30) in which the DHCP server 2 in the logical ring 16-7 illustrated in FIG. 21 performs the function of the DHCP server 2-2 departing from the logical ring 16-7 instead of the DHCP server 2-2.

FIG. 23 is a diagram showing data setting to the order of division in the VS table in the proxy process shown in FIG. 22.

In the logical ring 16, as shown in FIG. 22, if some event (clear of the order of division in the VS table, an IP address assignment request, an IP address reassignment request, the occurrence of an error, the recovery from an error and the like) occurs, each of the DHCP servers 2 in the logical ring 16-6 determines whether or not the occurring event is an instruction of clearing the order of division in the VS table (FIG. 12(B)) by an administrator of the network system 1 and setting initial data (Don't Care; see the entry of an index #(A+1) shown in FIG. 23) indicating no error occurs in the logical ring 16 in step 300 (S300).

If the event is an instruction to clear the VS table, the DHCP server 2 proceeds to step S312. The DHCP server 2 otherwise proceeds to step S302.

In step 302 (S302), the DHCP server 2 in the logical ring 16-6 determines whether or not the event corresponds to the occurrence of an error, the recovery from an error, an IP address reassignment request/assignment request from the client computer 10 or the like.

The DHCP server 2 in the logical ring 16-6 proceeds to step S320 if the event indicates the occurrence of an error. Otherwise, it proceeds to step S330.

In step 310 (S310), the DHCP server 2 in the logical ring 16-1 combines the plurality of logical rings 16 generated as a result of the ring reconfiguration due to the error occurring before this step.

Furthermore, the DHCP servers 2 in the logical ring 16-6 uses the recursive formulae described with reference to Formulae 1 to 3 to combine the VSSs associated with the DHCP servers 2 in the plurality of logical rings 16 to create a new VS. Furthermore, the new VS is further divided to be associated with each of the DHCP servers 2, thereby reconfiguring the ring.

In step 312 (S312), the DHCP server 2 in the logical ring 16-6 sets initial data to the orders of division of all the entries in the VS table.

In step 320 (S320), the DHCP server 2 in the logical ring 16-6 performs the processing for ring reconfiguration and VSS reconfiguration.

In step 322 (S322), the DHCP servers 2-0 to 2-3 look up the VS table to set the order of division (the order of division of the logical ring 16-7) at the time when the ring reconfiguration occurs for the entry of the IP address having a larger order of division than that at the time when the ring reconfiguration occurs, which was assigned to the client computer 10 before the ring reconfiguration (when included in the logical ring 16-6) without exceeding the assignment time limit (see the entry of the index #A shown in FIG. 23).

At S322, the DHCP server 2 issues a "gratuitous ARP request" for resolving its own IP address to its own MAC address.

In step 324 (S324), the DHCP server 2 in the logical ring 16-7 determines whether or not to perform the IP address reassignment instead of the DHCP server 2-2.

The DHCP server 2 in the logical ring 16-7 for performing the processing instead of the DHCP server 2-2 is selected in accordance with, for example, the previous setting for each of the DHCP servers 2 or the rule that the master DHCP server 2 in the new logical ring 16 performs the processing instead of the DHCP server 2-2 (herein, the case where the DHCP server 2-0 performs the processing instead of the DHCP server 2-2 is given as a specific example).

If it is not necessary to perform the processing instead of the DHCP server 2-2, the DHCP server 2 in the logical ring 16-7 completes the processing. The DHCP server 2 otherwise proceeds to step S326.

In step 326 (S326), the DHCP server 2 in the logical ring 16-7 sends a gratuitous ARP request to the other DHCP servers 2 in the logical ring 16-7 and the client computer 10 so as to be able to receive the IP address reassignment request to the DHCP server 2-2 instead of the DHCP server 2-2.

If it is not necessary to perform the processing instead of the DHCP server 2-2, the DH in the logical ring 16-7.

In step 330 (S330), the DHCP server 2-0 to 2-3 process the IP address reassignment request issued to themselves. The DHCP server 2-0, 2-1 and 2-3 process the IP address assignment request to themselves.

Furthermore, the DHCP servers 2-0 and 2-2 process the IP address assignment request and the reassignment request to the DHCP server 2-2.

However, if a new IP address assignment request is generated, the DHCP server 2-0 selects the IP address from the IP addresses which are not registered yet on the VS table while being in the VS of the logical ring 16 to which the DHCP server 2-0 belongs or from those in the VS table with an order of division of the VS which is larger than or equal to that at the occurrence of ring reconfiguration as the order of division with the assignment time limit being exceeded, thereby assigning the selected IP address to the client computer 10 making the request.

Similarly, when the DHCP server 2-2 assigns a new IP address, the DHCP server 2-2 selects the IP address from the IP addresses which are not registered yet on the VS table while being in the VS of the logical ring 16 to which the DHCP server 2-2 belongs or from those in the VS table with a larger order of division of the VS than that at the occurrence of ring reconfiguration as the order of division with the assignment time limit being exceeded, thereby assigning the selected IP address to the client computer 10 making the request (however, this is applied to the case where the order of division is obtained by subtracting the frequency of recovery from error from the frequency of occurrence of error. If the order of division is obtained by subtracting the frequency of occurrence of the error from the frequency of recovery from error, the condition defined by the order of division in the VS table and the order of division in the logical ring 16 at the time of assignment is reverse to that described above).

Figure 24:
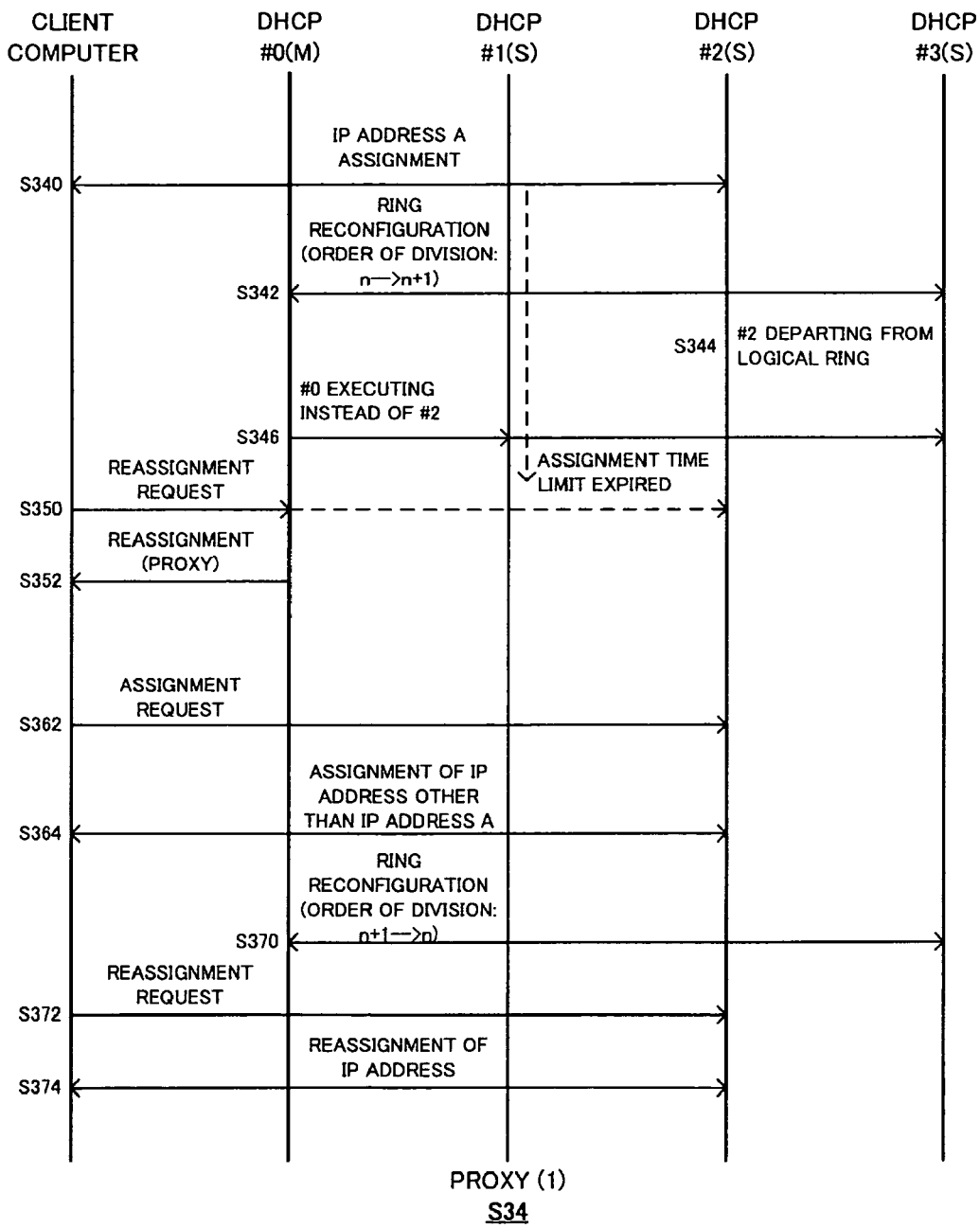
FIG. 24 A first communication sequence diagram illustrating a proxy process (S34) in which a DHCP server #0 in the logical ring shown in FIG. 21 performs a function of a DHCP server #2 departing from the logical ring.

FIG. 24 is a first communication sequence diagram illustrating a process (S34) in which the DHCP server 2 in the logical ring 16-7 shown in FIG. 21 performs the function of the DHCP server 2-2 departing from the logical ring 16-7 instead of the DHCP server 2-2.

As shown in FIG. 24, in step 340 (S340), the DHCP server 2-2 in the logical ring 16-6 assigns the IP address A to a certain client computer 10 so as to store it with the order of division n of the VS in the VS table.

At steps 342 and 344 (S342 and S344), the ring reconfiguration and the VSS reconfiguration occur. As a result, the DHCP server 2-2 departs from the logical ring 16-7.

At this time, the order of division of the logical ring 16-7 and the VS of the DHCP server 2-2 is increased from n to n+1. On the other hand, the order of division of the IP address A assigned by the DHCP server 2-2 to the client computer 10 (FIGS. 12(B) and 23) remains n even after the occurrence of ring reconfiguration.

In step 346 (S346), the DHCP server 2-0 issues a gratuitous ARP request to the other DHCP servers 2 and the client computer 10 in the logical ring 16-7 so as to be able to perform the IP address reassignment instead of the DHCP server 2-2 in the logical ring 16-7.

In step 350 (S350), the client computer 10 makes a request to the DHCP server 2-2 for the reassignment of the IP address A. This request is received only by the DHCP server 2-0 but not by the DHCP server 2-2 as indicated with a broken line.

In step 352 (S352), the DHCP server 2-0 reassigns the IP address A instead of the DHCP server 2-2.

At this time, the time limit for assigning the IP address A to the client computer 10 by the DHCP server 2-2 expires. Therefore, in the DHCP server 2-2, the IP address A is not assigned to any client computers 10.

In step 362 (S362), a certain client computer 10 makes a request to the DHCP server 2-2 for the IP address assignment.

In step 364 (S364), the DHCP server 2-2 cannot use the IP address A among unused IP addresses contained in the VS of the logical ring 16 to which the DHCP server 2-2 belongs because the order of division n+1 of the VS is larger than the order of division n stored with the IP address A. Therefore, the DHCP server 2-2 selects the IP address from those in the VS of the logical ring 16 to which the DHCP server 2-2 belongs but not registered yet on the VS table or from those with the order of division n+1 or larger in the VS table with the assignment time limit being exceeded, thereby assigning the selected IP address to the client computer 10 making a new request for IP address assignment.

In step 370 (S370), the recovery from the error occurring in the logical ring 16-6 is further made. As a result, the logical ring 16-6 and another logical ring 16 (not shown) are combined with each other so as to reconfigure the VSSs.

Furthermore, the order of division of the VS of the logical ring 16 after the combination is returned to n.

Furthermore, the DHCP server 2-2 is also informed of the IP address reassignment performed by the DHCP server 2-0 instead of the DHCP server 2-2 by synchronous processing.

The DHCP server 2-2 sends a gratuitous ARP request for resolving its own IP address to its own MAC address so as to be able to receive the IP address reassignment request from the client computer 10 that is using the IP address A.

After the combination of the logical rings 16, the DHCP server 2-2 does not leave the IP address A released but designates it as being in use, by synchronous processing.

In step 372 (S372), the client computer 10 using the IP address A issues the IP address reassignment request to the DHCP server 2-2.

In step 374 (S374), the DHCP server 2-2 accepts and processes the reassignment request of the IP address A.

Figure 25:
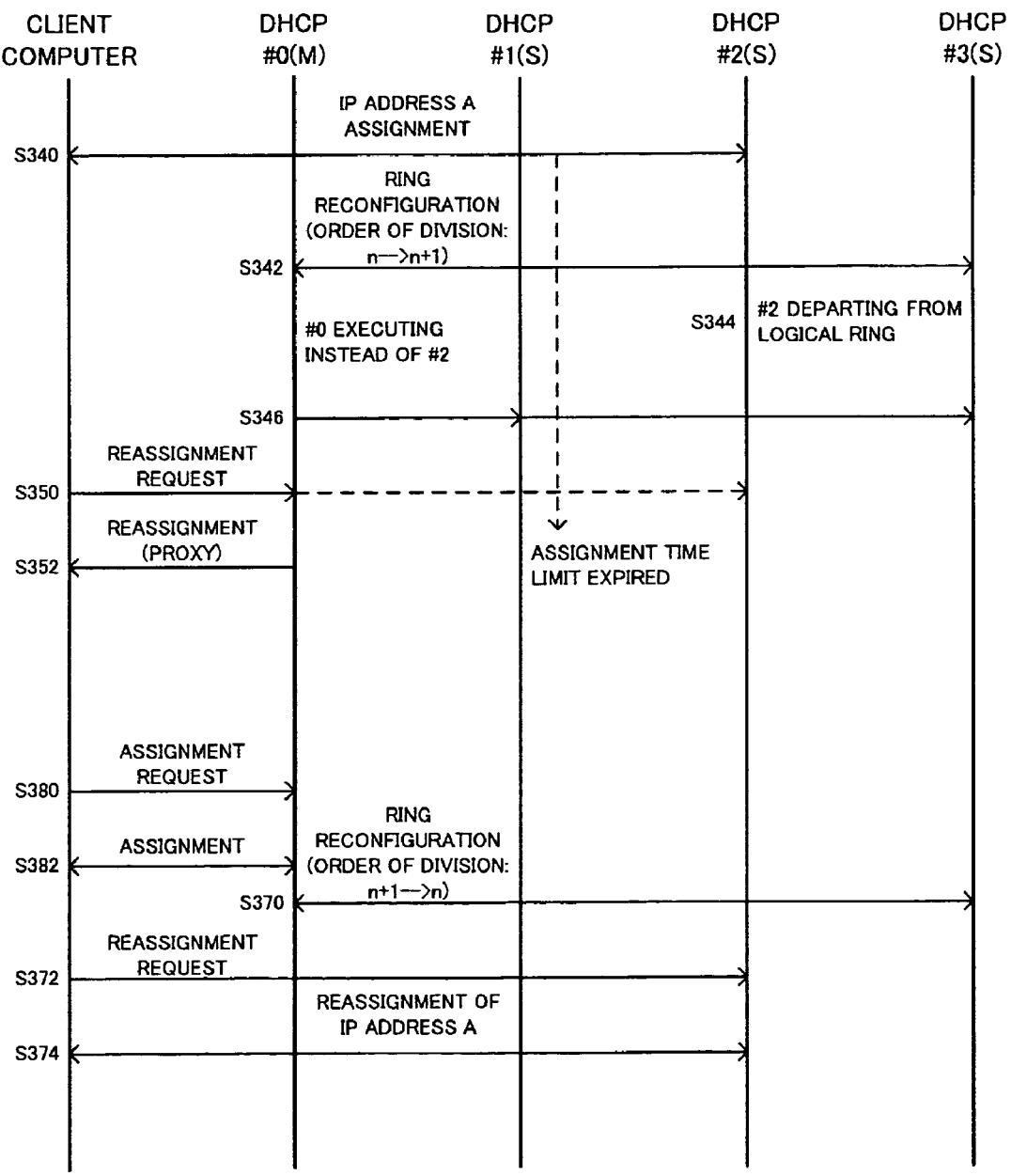
FIG. 25 A second communication sequence diagram illustrating a proxy process (S38) in which the DHCP server #0 in the logical ring shown in FIG. 21 performs the function of the DHCP server #2 departing from the logical ring.

FIG. 25 is a second communication sequence diagram illustrating a process (S38) in which the DHCP server 2 in the logical ring 16-7 shown in FIG. 21 performs the function of the DHCP server 2-2 departing from the logical ring 16-7 instead of the DHCP server 2-2.

As illustrated in FIG. 25, at S340 to S352, each of the DHCP servers 2 processes the steps denoted by the same reference symbols in FIG. 24.

In step 380 (S380), a certain client computer 10 makes a new request to the DHCP server 2-0 for the IP address assignment.

At step S382, the DHCP server 2-0 selects an IP address from those in the VS of the logical ring 16 to which it belongs while not being registered on the VS table yet or from those in the VS table with a larger order of division than that of the VS at the occurrence of the rings reconfiguration as an order of division with the assignment time limit being exceeded, thereby assigning the selected IP address to the client computer 10 making a request for the IP address assignment.

At S370 to S374, each of the DHCP servers 2 processes the steps denoted by the same reference symbols in FIG. 24.

[DHCP Server Program 20]

Hereinafter, a DHCP server program 20 will be described.

Figure 26:
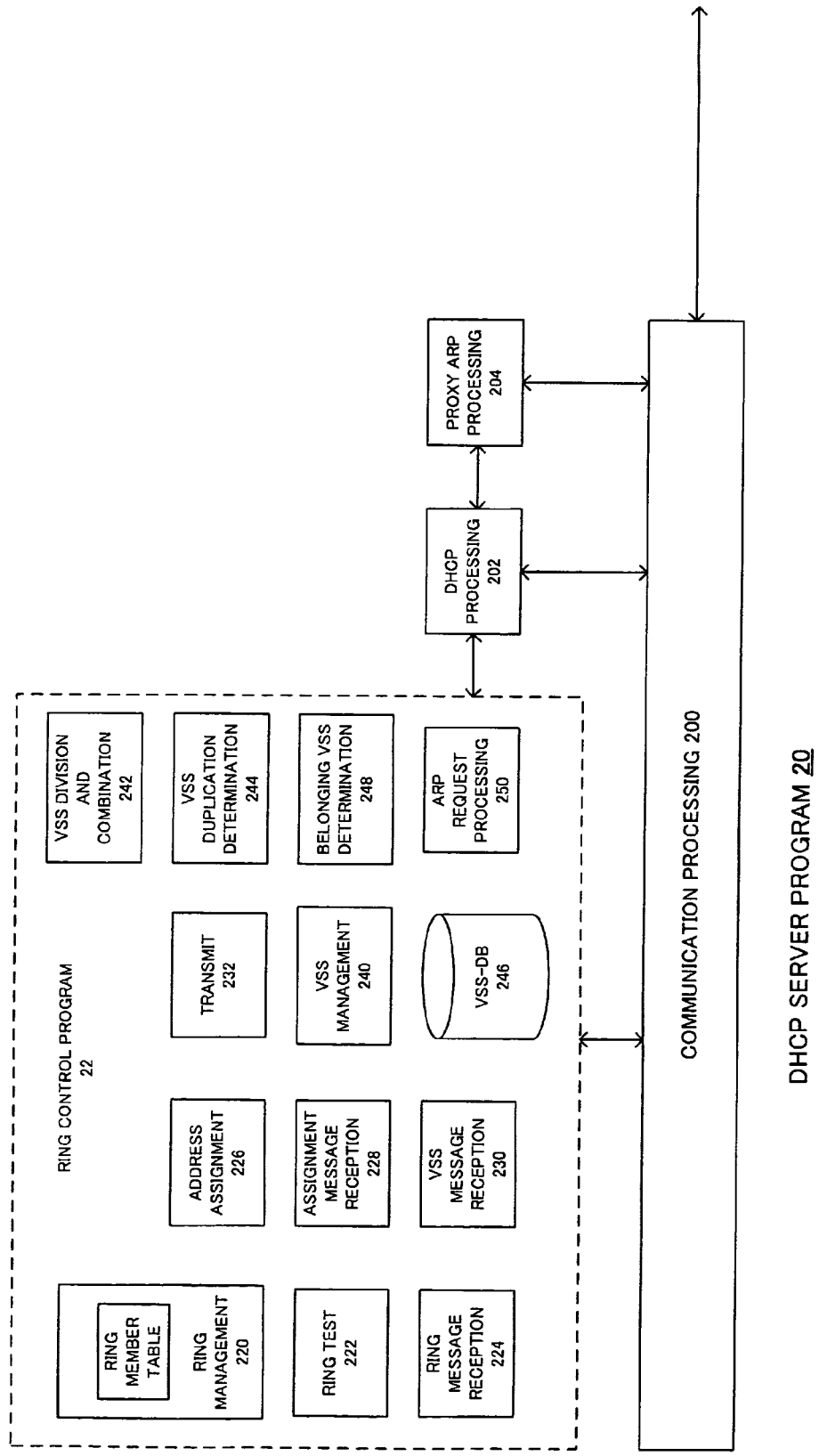
FIG. 26 A diagram showing a configuration of DHCP server program for performing processing shown in FIGS. 3 to 20, which is executed in the DHCP server shown in FIG. 1.

FIG. 26 is a diagram showing a configuration of the DHCP server program 20 for performing the processing shown in FIGS. 3 to 20, which is executed in the DHCP server 2 shown in FIG. 1.

As shown in FIG. 26, the DHCP server program 20 includes a communication processing section 200, a DHCP processing section 202, a proxy ARP processing section 204, and a ring control program 22.

The ring control program 22 includes: a ring management section 220, a ring test section 222, a ring message receiving section 224, an address assignment section 226, an assignment message receiving section 228, a VSS message receiving section 230, an transmission 232, a VSS management section 240, a VSS dividing section 242, a VSS duplication determining section 244, a VSS database (VSS-DB) 246, a belonging VSS determining section 248, and an ARP request processing section 250.

The DHCP server program 20 is supplied to, for example, through a recording medium 114 (FIG. 2) to the DHCP server 2 so as to be executed on an OS installed on the DHCP server 2 practically using a hardware of the DHCP server 2.

The DHCP server program 20 realizes the processing described with reference to FIGS. 3 to 25 by the above-described components.

In the DHCP server program 20, the communication processing section 200 performs processing necessary for the communication with the other nodes in each of the DHCP servers 2.

The DHCP processing section 202 operates in cooperation with the address assignment section 226 as described below so as to assign the IP address to the client computer 10 in accordance with the DHCP using the IP address other than that is inhibited to be assigned when the IP address proxy reassignment described with reference to FIGS. 21 to 25 is performed among the IP addresses contained in the VSS (FIG. 12(A), Formulae 1 to 3) assigned to the DHCP server 2.

The proxy ARP processing section 204 provides the function of the ARP and also sends a gratuitous ARP request described with reference to FIGS. 21 to 25 in accordance with the control of the ARP request processing section 250.

In the DHCP server program 20, the ring control program 22 performs the processing for the formation and the reconfiguration of the logical ring 16, the reconfiguration of the VSSs, and the IP address proxy reassignment described with reference to FIGS. 3 to 25.

[The Ring Management Section 220 and the Ring Test Section 222]

The ring management section 220 and the ring test section 222 performs a process using a list of sets of IP addresses and identifiers (server IDs (node_id)) of the DHCP servers 2 (among the DHCP servers 2 connected to the network system 1 (FIG. 1), the aggregate of those having the same ring ID as that of the DHCP server 2) belonging to the logical ring 16.

The list of sets of the IP addresses and the identifiers (server IDs) of the DHCP servers 2 belonging to the logical ring 16 is stored in the ring management section 220 in the form of table.

Hereinafter, the table is referred to as a ring member table.

The ring management section 220 and the ring test section 222 use the following timers.

A timer association_timer: a timer for measuring the time limit of a reply from the DHCP servers 2 belonging to the logical ring 16 (FIG. 11 and the like);

A timer ring_update_timer: a timer for measuring time after the last reception of the ring update for maintaining the logical ring 16; and A timer periodic_timer: a timer for measuring an interval of the ring update.

FIG. 27 is a diagram showing a ring message transmitted between the DHCP servers 2 for the process of the ring management section 220 and the ring test section 222 shown in FIG. 26.

As shown in FIG. 27, the ring message processed by the ring management section 220 and the ring test section 222 contains:

a ring ID of the logical ring 16 (FIG. 3 and the like) to which the DHCP server 2 transmitting the message belongs;

an IP address of the DHCP server 2 transmitting the message; and a flag group containing the following flags:

a flag C/U: when it is true, the ring is formed or reconfigured, and when it is false, the ring is updated;

a flag A: when it is 1, the ring management section 220 is in an ASSOCIATED state D1; and a flag D: when it is 1, server ID (node_id) duplication occurs.

The ring management section 220 and the ring test section 222 use the following variables;

a variable IARM: it is true when the DHCP server 2 is the master DHCP server 2;

a variable ASSOC: it has a true value while the ring is already formed;

a variable RBRK: it has a true value when the ring is required to be reconfigured; and a variable NNODE: the maximum number of the DHCP servers 2 that can be included in the redundant configuration (the number of the DHCP server 2 included in the network system 1).

[State Transition of the Ring Management Section 220]

Figure 28:
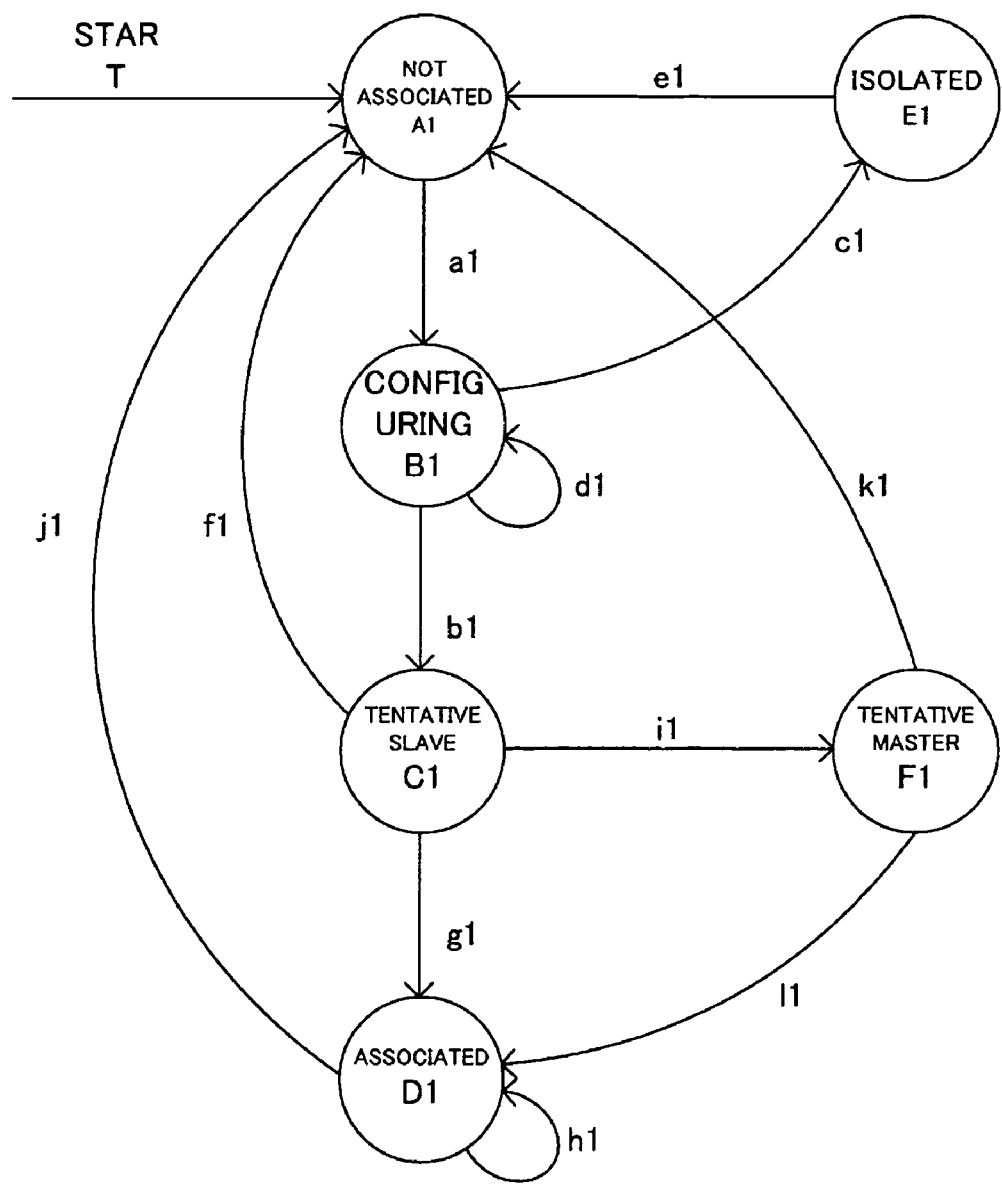
FIG. 28 A state transition diagram of the ring management section shown in FIG. 26.

FIG. 28 is a state transition diagram of the ring management section 220 shown in FIG. 26.

As shown in FIG. 28, in each of the DHCP servers 2, the ring management section 220 can be in any of: a NOT ASSOCIATED state A1, an ASSOCIATING state B1, a TENTATIVE SLAVE state C1, an ASSOCIATED state D1, an ISOLATED state E1, and a TENTATIVE MASTER state F1.

In the NOT ASSOCIATED state A1, the DHCP server 2 does not belong to the logical ring 16.

In the ASSOCIATING state B1, the DHCP server 2 exchanges a ring message for the formation and the reconfiguration of the logical ring 16 so as to form and reconfigure the logical ring 16.

In the TENTATIVE SLAVE state C1, the DHCP server 2 is connected to the next DHCP server 2 as the slave DHCP server 2.

In the ASSOCIATED state D1, the logical ring 16 is formed.

In the ISOLATED state E1, the DHCP server 2 independently operates. The DHCP server 2 in the ISOLATED state E1 cannot belong to the logical ring 16.

In the TENTATIVE MASTER state F1, the DHCP server 2 tentatively promotes to the master DHCP server 2.

When the processing is initiated, the ring management section 220 goes into the NOT ASSOCIATED state A1.

In the NOT ASSOCIATED state A1, the ring management section 220 sets the variables ASSOC, IARM, and RBRK to be false, respectively.

If the DHCP server 2 previously configures the logical ring 16, the ring management section 220 disconnects the next DHCP server 2 on the ring to break the logical ring 16.

Moreover, the ring configuration message (the ring message shown in FIG. 27 with the C/U flag of 1) is sent.

In the NOT ASSOCIATED state A1, the ring management section 220 unconditionally transits to the ASSOCIATING state B1 (a1).

After the transition to the ASSOCIATING state B1, the ring management section 220 makes the timer association_timer start counting and waits for the reception of a ring configuration message having the same ring ID from another node (corresponding to the processing S200-1 to S200-4 shown in FIG. 11).

When the ring management section 220 receives the ring configuration message containing the same ring ID from another DHCP server 2 which is not in the ring member table, it registers the node on the ring member table while resetting the counting of the timer association_timer to restart counting (d1).

If the ring management section 220 receives the ring configuration message containing the same ring ID and IP address as its own ones, which is not issued by itself, the ring management section 220 transits to the ISOLATED state E1 (c1).

If the ring configuration message having the same ring ID is not received from another node that is not in the ring member table before the timer association_timer expires, the ring management section 220 transits to the TENTATIVE SLAVE state C1 (b1).

After the transition to the TENTATIVE SLAVE state C1, the ring management section 220 looks up the ring member table created in the ASSOCIATING state B1 so as to be connected to the DHCP server 2 having the second highest order of priority (however, the DHCP server 2 for which the lowest order of priority is set is the DHCP server 2 for which the highest order of priority is set) by a TCP (Transmission Control Protocol).

In the TENTATIVE SLAVE state C1, the ring management section 220: transits to the NOT ASSOCIATED state A1 upon reception of the ring configuration message containing the same ring ID from another DHCP server 2 which is not in the ring member table (f1);

transits to the ASSOCIATED state D1 under the condition that the variable ASSOC becomes true (g1); and transits to the TENTATIVE MASTER state F1 under the condition that the ring member table is looked up so that the order of priority of its own DHCP server 2 becomes the highest (ii).

After the transition to the ASSOCIATED state D1, the ring management section 220 makes the timer ring_update_timer start counting so as to wait for the reception of a ring update message (the ring message shown in FIG. 27 with the C/U flag of 0).

If the ring update message is received before the counting of the timer ring_update_time is completed, the ring management section 220 remains in the ASSOCIATED state D1 (h1). If the counting of the timer ring_update_time is completed or the variable RBRK becomes true, the ring management section 220 transits to the NOT ASSOCIATED state A1 (j1).

If the ring management section 220 is reset (the ring management section 220 is restarted) in the ISOLATED state E1, it transits to the NOT ASSOCIATED state A1 (e1).

The ring management section 220 sets the variable IARM to be true in the TENTATIVE MASTER state F1 so as to transit to the NOT ASSOCIATED state A1 under the condition that the ring configuration message having the same ring ID is received from another node that is not in the ring member table (k1); and to transit to the ASSOCIATED state D1 under the condition that the variable ASSOC becomes true (l1).

[State Transition of the Ring Test Section 222]

Figure 29:
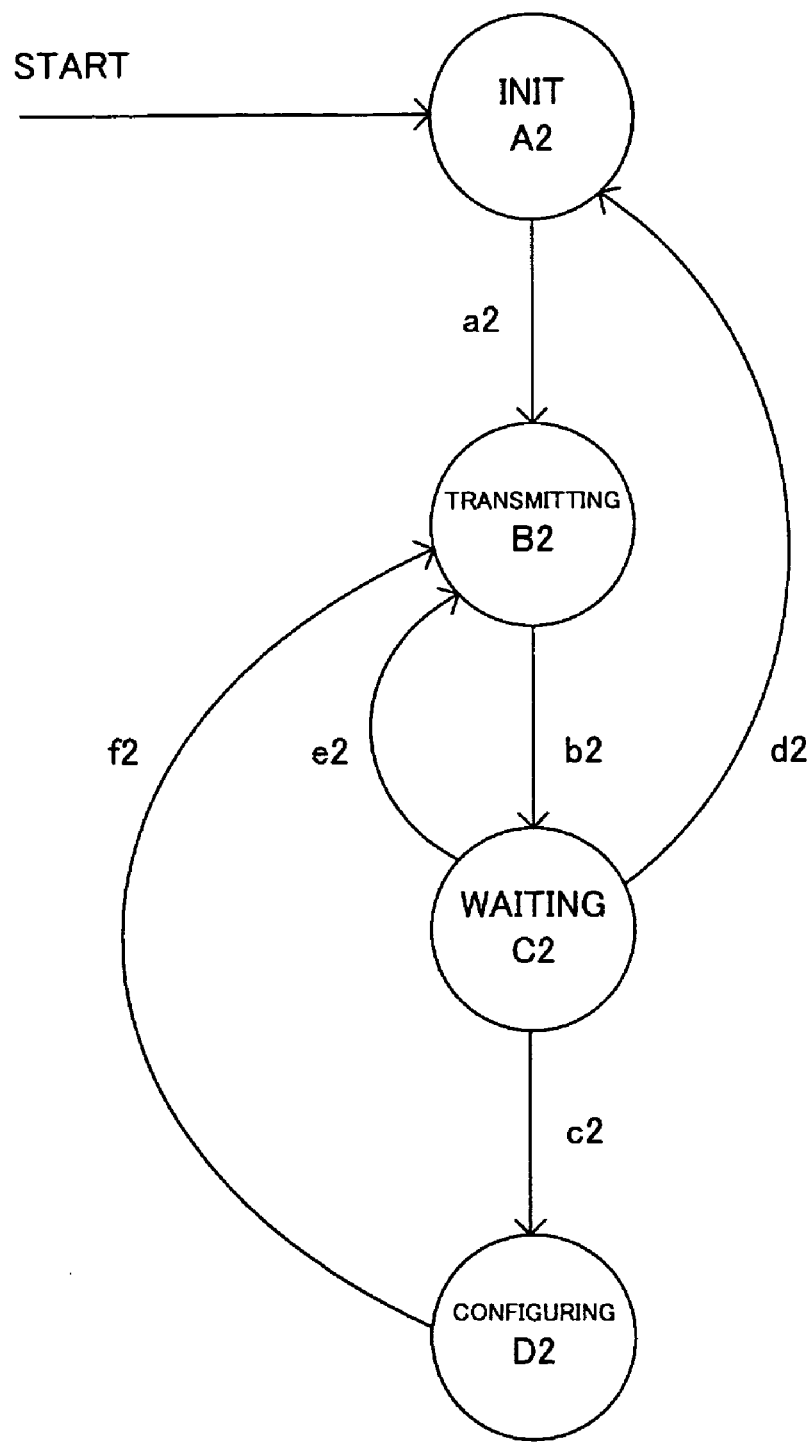
FIG. 29 A state transition diagram of a ring test section shown in FIG. 26.

FIG. 29 is a state transition diagram of the ring test section 222 shown in FIG. 26.

The ring test section 222 periodically performs the ring update shown in FIG. 6 and the like.

The ring test section 222 creates a ring update message for the following ring update so as to place it in a ring transmission queue in the transmission section 232.

When the processing is started, the ring test section 222 goes into an INIT state A2.

In the INIT state A2, the ring test section 222 stops the periodic_timer.

In the INIT state A2, the ring test section 222 transits to a TRANSMITTING state B2 under the condition that the variable IARM becomes true, which indicates that the ring management section 220 transits to the TENTATIVE MASTER state F1 (a2).

In the TRANSMITTING state B2, the ring test section 222 creates the ring update message so as to place it in the ring transmission queue in the transmission section 232. Then, the ring test section 222 transits to a WAITING state C2 under the condition that the variable IARM becomes true (b2).

In the WAITING state C2, the ring test section 222 makes the timer periodic_timer start counting.

In the WAITING state C2, the ring test section 222: transits to the ASSOCIATING state D2 under the condition that the ring update message containing the same IP address as its own IP address is received (c2);

transits to the INIT state A2 under the condition that the variable IARM becomes false (d2); and transits to the TRANSMITTING state C2 when the timer periodic_timer expires (e2).

In the ASSOCIATING state D2, the ring test section 222 sets the variable ASSOC to be true.

The ring test section 222 in the ASSOCIATING state D2 unconditionally transits to the TRANSMITTING state B2 (f2).

[Ring Message Receiving Section 224]

Figure 30:
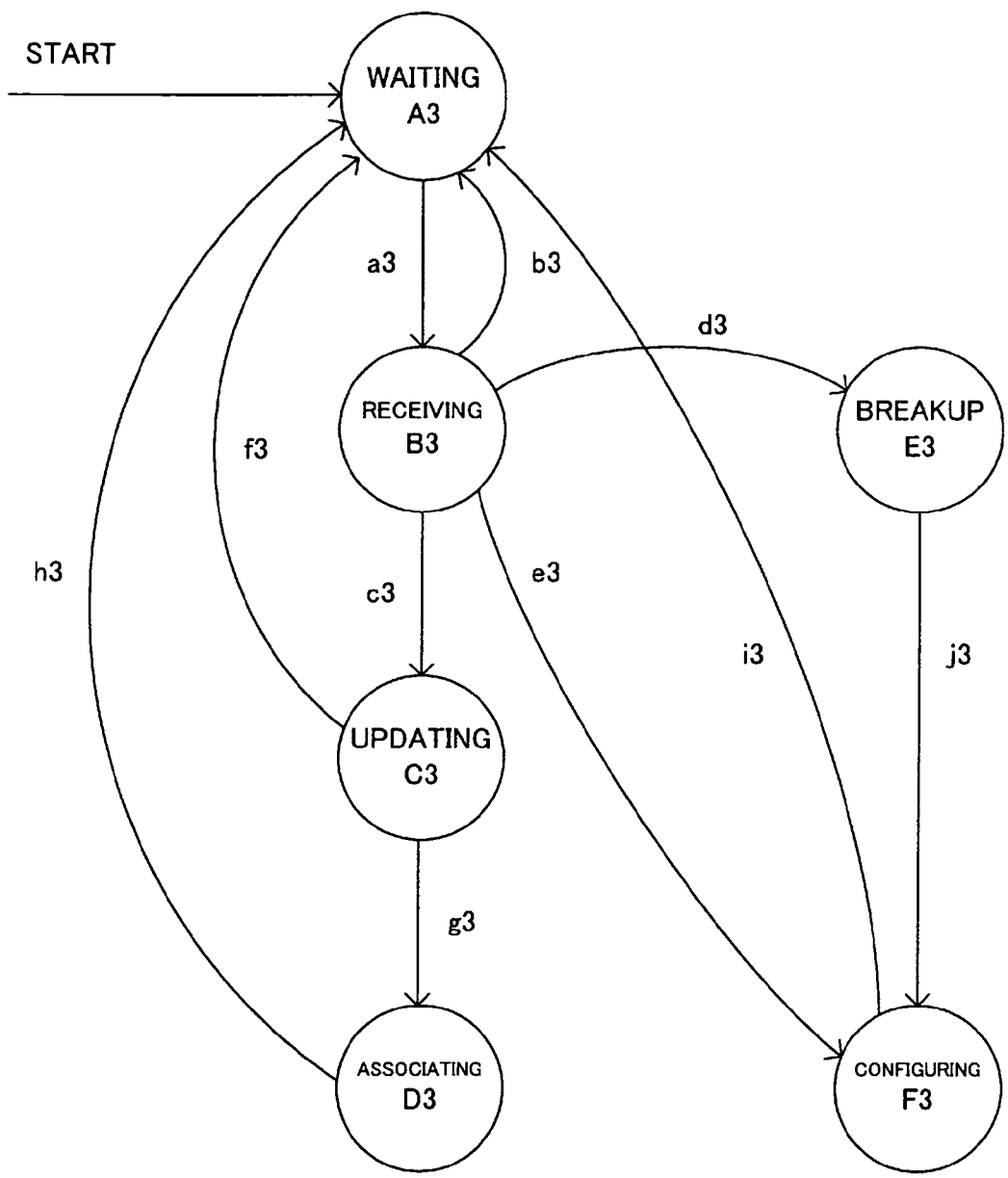
FIG. 30 A state transition diagram of a ring message receiving section shown in FIG. 26.

FIG. 30 is a state transition diagram of the ring message receiving section 224 shown in FIG. 26.

The ring message receiving section 224 receives a ring message to perform the processing.

When the processing is started, the ring message receiving section 224 goes into the WAITING state A3.

When the ring message receiving section 224 receives the ring message in the WAITING state A3, it transits to a RECEIVING state B3 (a3).

In the RECEIVING state B3, the ring message receiving section 224: transits to an UPDATING state C3 when it receives the ring update message (c3);

transits to a BREAKUP state E3 under the condition that the variable ASSOC becomes true when it receives the ring configuration message containing the same ring ID as that of the DHCP server 2 and the IP address of the DHCP server 2 that is not in the ring member table (d3);

transits to a CONFIGURING state F3 under the condition that the variable ASSOC becomes false when it receives the ring configuration message containing the same ring ID as that of the DHCP server 2 and the IP address of the DHCP server 2 that is not in the ring member table (e3); and transits to the WAITING state A3 under the conditions other than those described above (b3).

In the UPDATING state C3, the ring message receiving section 224 places the received ring update message in the ring transmission queue in the ring transmission section 232.

In the UPDATING state C3, the ring message receiving section 224: transits to the ASSOCIATING state D3 when it receives the ring update message having the value 1 of flag A (g3); and otherwise, transits to the WAITING state A3 (f3).

In the ASSOCIATING state D3, the ring message receiving section 224 sets a value of the variable ASSOC to be true.

In the ASSOCIATING state D3, the ring message receiving section 224 unconditionally transits to the WAITING state A3 (h3).

In the BREAKUP state E3, the ring message receiving section 224 sets a value of the variable RBRK to be true.

In the BREAKUP state E3, the ring message receiving section 224 unconditionally transits to the CONFIGURING state F3 (j3).

In the CONFIGURING state F3, the ring message receiving section 224 sets a value of the variable RCRCV to be true so as to register the IP address contained in the received ring configuration message on the ring member table.

In the CONFIGURING state F3, the ring message receiving section 224 unconditionally transits to the WAITING state A3 (i3).

The ring message receiving section 224 forms and reconfigures the logical ring 16 in accordance with the following rules.

(1) A ring ID is assigned to each of the logical rings 16. The DHCP servers 2 having the same ring ID form the logical ring 16.

(2) The DHCP server 2 cannot commit information before the signal transmitted by itself returns.

(3) If the DHCP server 2 receives the identical information transmitted from another DHCP server 2 before the information transmitted by itself returns, a) the DHCP server 2 does not relay the information to the other DHCP servers 2 when its own order of priority is higher than those of the other DHCP servers 2, b) the DHCP server 2 forwards the information of the other DHCP servers 2 and cannot commit the information issued by itself when its own order of priority is lower than those of the other DHCP servers 2.

(4) If the information transmitted by the DHCP server 2 itself does not return within a time limit, the DHCP server 2 cannot commit the information.

(5) When the timer ring_update_timer expires (time runs out), the DHCP server 2 broadcasts the ring configuration signal so as to reconfigure the logical ring 16.

(6) The master DHCP server 2 in the logical ring 16 (the DHCP server 2 with the smallest server ID in the logical ring 16) sends the ring update signal to the logical ring 16 before the timer ring_update_timer runs out of time, thereby maintaining the logical ring 16.

[Address Assignment Section 226]

The address assignment section 226 operates in cooperation with the ring management section 220 and the DHCP processing section 202.

The scope is shared in the logical ring 16 as a virtual scope.

The virtual scope is divided into VSSs so as not to cause any duplication between the DHCP servers 2 in the logical ring 16. The VSSs are respectively associated with the DHCP servers 2.

The entries in the table of the scope and VSSs include the following items:

an IP address of the DHCP server 2 to which the IP address is assigned;

flags:

S: 1 for synchronized entries, and

P: 1 for entries being synchronized for assignment (lease);

an IP address;

a MAC address; and an assignment (lease) time limit.

Figure 31:
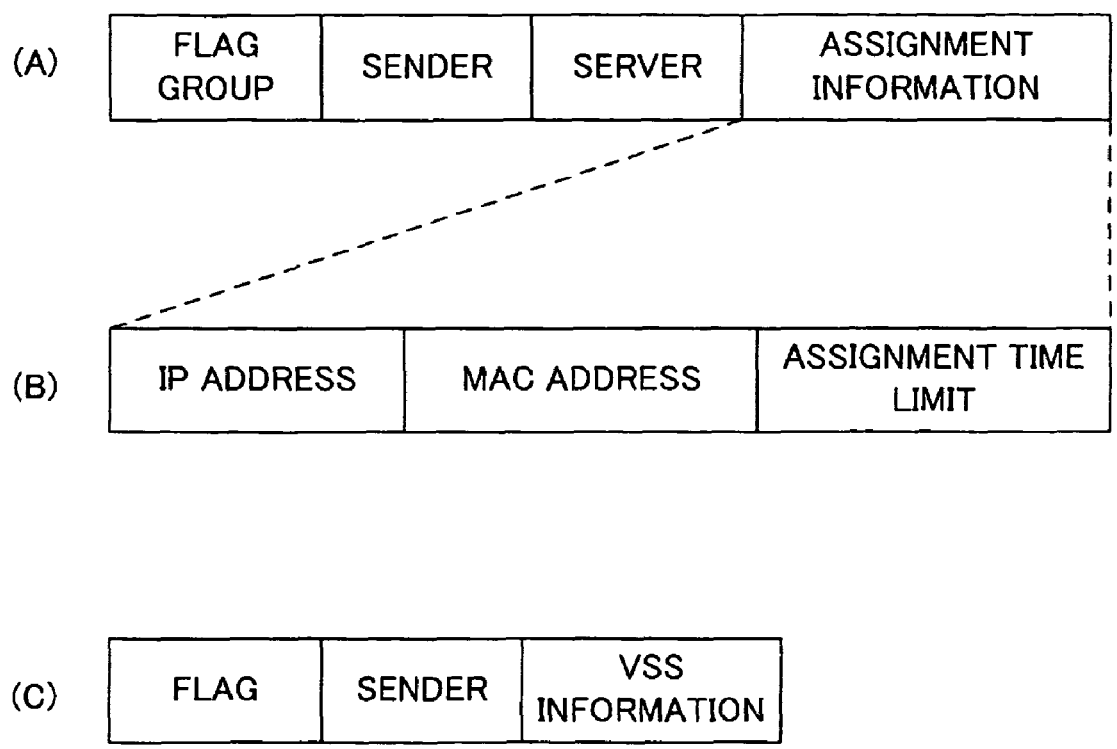
FIG. 31 A diagram showing an assignment message (lease message) used by an address assignment section for the processing, where part (A) shows the entire assignment message, part (B) shows assignment information illustrated in (A), and part (C) shows a VSS message.

FIG. 31 is a diagram showing an assignment message (lease message) used by the address assignment section 226 for the processing, where FIG. 31(A) shows the entire assignment message, FIG. 31(B) shows assignment information illustrated in (A), and FIG. 31(C) shows a VSS message.

As shown in FIG. 31(A), the assignment message contains a flag group, a sender, a server, and assignment information.

A flag group of the assignment message contains a flag D and a flag Q/R. When the flag D is true, it indicates nonuse illustrated in FIG. 14. When the flag Q/R is true, it indicates a query (FIGS. 13 and 14). When it is false, it indicates a reply.

The sender indicates the IP address of the DHCP server 2 sending the message. The server indicates the IP address of the DHCP server 2 assigning the IP address of the client 10 to be synchronized by the message.

As shown in FIG. 31(B), the assignment information contains the IP address, the MAC address, and the assignment time limit (lease time limit).

Moreover, as shown in FIG. 31(C), the VSS message contains a flag DUP, the sender, and the VSS information.

In the VSS message, a value of the flag DUP becomes 1 when VSS duplication occurs.

The sender indicates the IP address of the DHCP server 2 sending the VSS message.

The VSS information indicates VSSs obtained by dividing the VS (the virtual scope) shared in the logical ring 16 as illustrated in FIG. 18, and is obtained by, for example, associating the order of division 1 of the VSS expressed in Formula 1 and factors $A_1$ and $B_1 i_1$ with each other.

The VSS information is repeated for 0 time or more.

The address assignment section 226 uses the following variables.

A variable NDESYNC: the number of entries with the value 0 of flag S in the scope or in the VS table shown in FIG. 12(B).

A variable DHREQRCV: its value becomes true when the DHCP server program 202 gives a reply to the assignment request from the client computer 10.

A variable VSIMP: its value becomes true when the VSS is imported for combination.

A variable RSTVSS: its value becomes true when the VSS is reset.

The ring message receiving section 224 and the DHCP processing section 202 are connected to each other by, for example, a bidirectional FIFO (not shown).

In the direction from the DHCP processing section 202 to the ring message receiving section 224, assignment information for initiating the assignment in response to the IP address assignment request (the DHCP request) from the client computer 10, and notification that the IP address assignment is terminated in response to the notification of the IP address assignment (DHCP assignment (lease)) are output through the bidirectional FIFO.

In the direction from the ring message receiving section 224 to the DHCP processing section 202, transmission permission of a reply (ACK) or a negative reply (NACK) to the IP address assignment request is output through the bidirectional FIFO.

The DHCP processing section 202 has to synchronize the IP addresses with another DHCP server 2 by the address assignment section 226 when it receives the IP address assignment request.

The DHCP processing section 202 replies to the IP address assignment request (the DHCP request) in accordance with the result returned from the address assignment section 226.

The DHCP processing section 202 has to provide the IP address from the range of the scope calculated by the address assignment section 226.

The DHCP processing section 202 of the master DHCP server 2 is out of the logical ring 16. However, when it receives the IP address assignment request (the DHCP request) to the DHCP server 2 that has to be basically contained in the logical ring 16, the DHCP processing section 202 returns the ACK instead of that DHCP server 2.

As shown in FIGS. 12(A) and 12(B), the VS is shared by the DHCP servers 2 included in the logical ring 16.

As shown in FIG. 12(B), the DHCP server 2 is associated with the VSS possessed when it is isolated from the logical ring 16 so as to be able to provide the IP address from the VS in the ring containing the VSS.

The DHCP servers 2 remaining in the logical ring 16 cannot provide the IP address from the range of the VSS associated with the DHCP server 2 that departs from the logical ring 16.

The VSS is kept unless it is explicitly reset by an administrator of the logical ring 16 or the like.

If the VSS is explicitly reset, the IP address assignment by the DHCP server 2 associated with the reset VSS is cancelled.

[State Transition of the Address Assignment Section 226]

Figure 32:
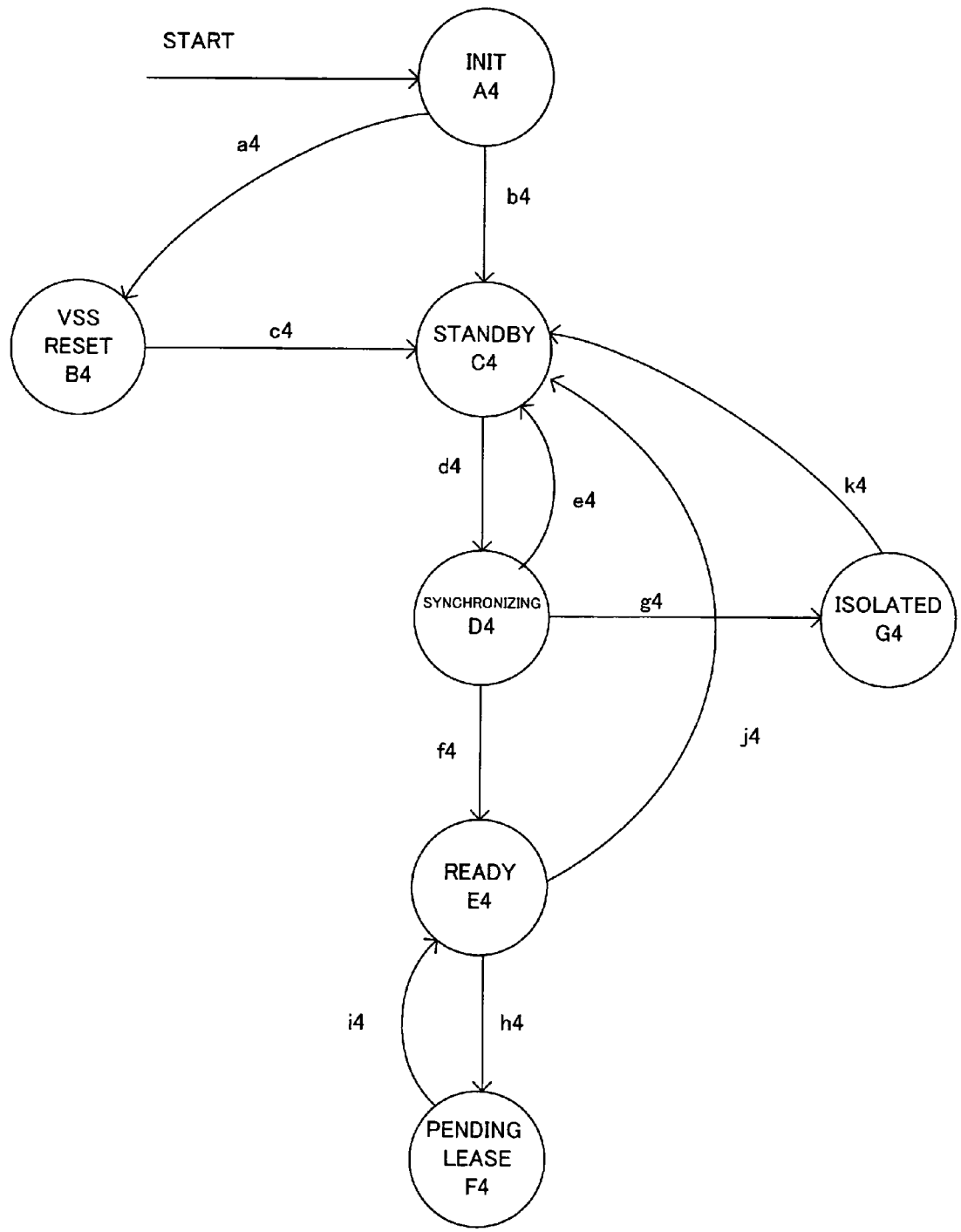
FIG. 32 A state transition diagram of the address assignment section shown in FIG. 26.

FIG. 32 is a state transition diagram of the address assignment section 226 shown in FIG. 26.

As illustrated in FIG. 32, the address assignment section 226 can have seven states.

Among the seven states, in a STANDBY state C6, the formation of the logical ring 16 is waited for.

In a SYNCHRONIZING state D4, the VSS and the assignment information are synchronized with another DHCP server 2. In this state, the DHCP server program 202 is not permitted to assign the IP address.

In an ISOLATED state G4, VSS duplication is detected so that the IP address assignment is not permitted.

In a READY state E4, the synchronization with another DHCP server 2 is established so that the IP address assignment is possible.

In a PENDING_LEASE state F4, when the IP address is assigned in response to a request, the synchronization with another DHCP server 2 is being obtained.

When the processing is initiated, the address assignment section 226 goes into the INIT state A4.

In the INIT state A4, the address assignment section 226 transits to a VSS reset state B4 under the condition that a value of the variable RSTVSS becomes 1 (a4). Otherwise, the address assignment section 226 transits to the STANDBY state C4 (b4).

The address assignment section 226 unconditionally transits from the VSS reset state B4 to the STANDBY state C4 (c4).

In the STANDBY state C4, the address assignment section 226 transits to the SYNCHRONIZING state D4 when a value of the variable VSSDUP is true (d4).

In the SYNCHRONIZING state D4, the address assignment section 226 sets a value of the variable VSSDUP false and a value of the variable VSIMP false so as to send its own VSS to the logical ring 16 by means of the VSS message illustrated in FIG. 31(C).

Then, after the VSIMP becomes true, the address assignment section 226 sends a message with a false synchronized flag in the VS table illustrated in FIG. 12(B) to the logical ring 16 by means of the message illustrated in FIG. 31(A).

In the SYNCHRONIZING state D4, the address assignment section 226:

transits to the ISOLATED state G4 under the condition that a value of the variable VSSDUP becomes true (g4);

transits to the STANDBY state C4 under the condition that a value of the variable ASSOC becomes false (e4); and transits to the READY state E4 under the condition that a value of the variable NDESYNC is 0 and a value of the variable VSIMP becomes true (f4).

In the ISOLATED state G4, the address assignment section 226 transits to the STANDBY state C4 under the condition that a value of the variable ASSOC becomes false (k4).

In the READY state E4, the address assignment section 226:

transits to the PENDING_LEASE state F4 under the condition that a value of the variable DHREQRCV becomes 1 (h4); and transits to the STANDBY state C4 under the condition that a value of the variable ASSOC becomes false (j4).

In the PENDING_LEASE state F4, the address assignment section 226 registers the IP address to be assigned on the VS table illustrated in the FIG. 12(B) with the flag being assigned to be true. At the same time, an assignment message, which contains additional assignment information for the IP address (the MAC address and the assignment time limit illustrated in FIG. 31(B)), the flag D being false, and the sender and the server being indicated by its own IP address, is created so as to be transmitted to the logical ring 16.

In the PENDING_LEASE state F4, the address assignment section 226 unconditionally transits to the READY state E4 (i4).

[Assignment Message Receiving Section 228]

The assignment message receiving section 228 operates in cooperation with the address assignment section 226.

The assignment message receiving section 228 uses the following variables:

a flag group in the assignment message;

a flag D indicating an object to be deleted; and a flag Q/R being true when it indicates a query and false when it indicates a reply.

[State Transition of the Assignment Message Receiving Section 228]

Figure 33:
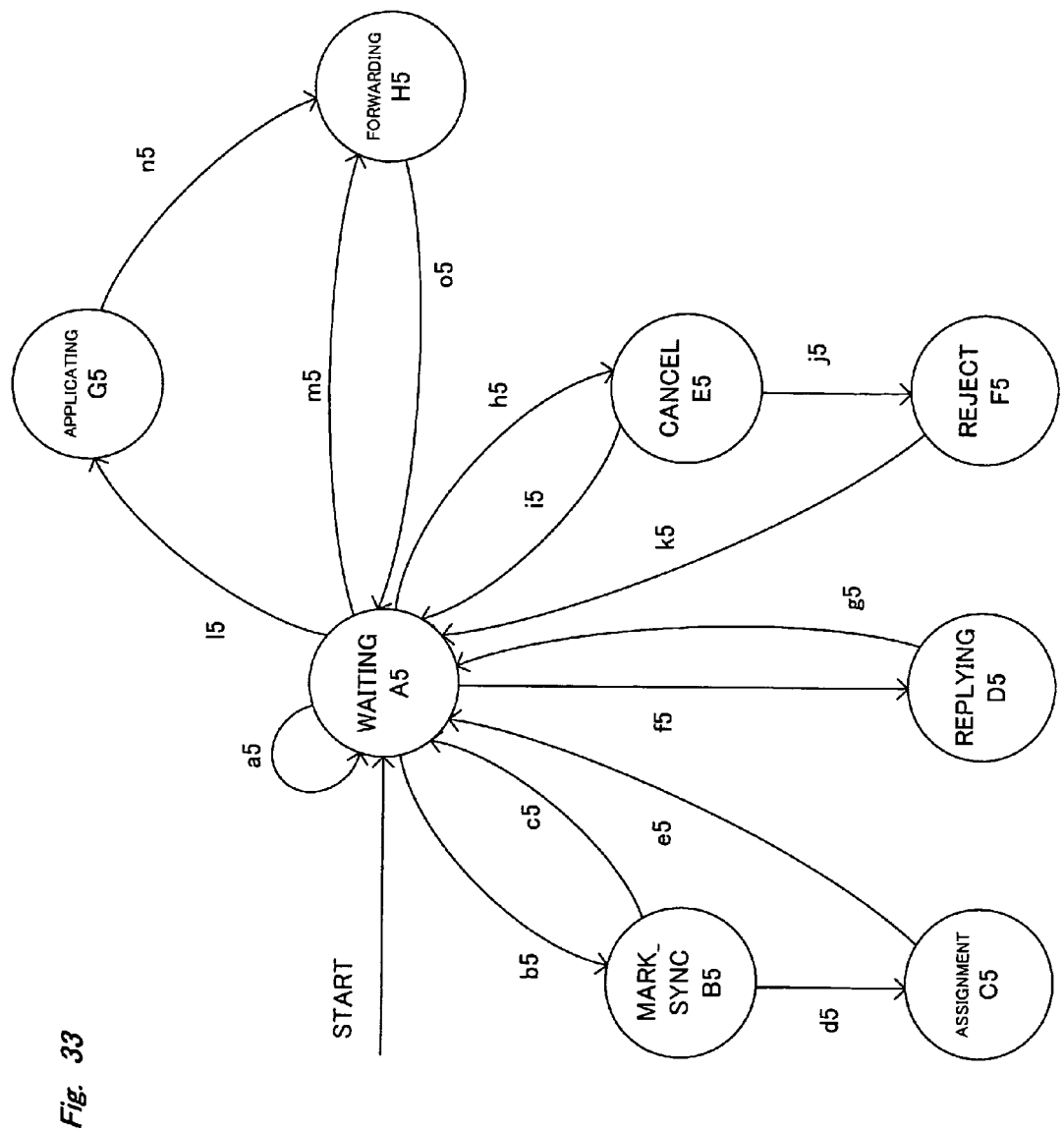
FIG. 33 A state transition diagram of an assignment message receiving section shown in FIG. 26.

FIG. 33 is a state transition diagram of the assignment message receiving section 228 shown in FIG. 26.

As illustrated in FIG. 33, the assignment message receiving section 228 can have eight states.

Among the above eight states, in a waiting state A5, the assignment message receiving section 228 waits for an assignment message.

In a replying state D5, the assignment message receiving section 228 replies because it receives a query to the DHCP server 2.

In a forwarding state H5, an assignment message of another DHCP server 2 is forwarded.

In an applicating state G5, an assignment message of another DHCP server 2 is applied to local VS table.

In a mark_sync state B5, the synchronization with another DHCP server 2 is established.

In a commit state C5, an ACK to the IP address assignment is allowed to be returned.

In a cancel state E5, assignment is cancelled because the IP address is already assigned by another DHCP server 2.

In a reject state F5, a NACK to the IP address assignment is allowed to be returned so as to instruct another DHCP server 2 to delete the IP address.

When the processing is initiated, the assignment message receiving section 228 goes into the waiting state A5.

In the waiting state A5, the assignment message receiving section 228:

transits to the mark_sync state B5 when the assignment message receiving section 228 receives a reply assignment message including the sender that is itself and the flag DUP in the message is false (b5);

transits to the replying state D5 when the assignment message receiving section 228 receives a query assignment message including the sender that is not itself and the server that is itself (f5);

transits to the cancel state E5 when the assignment message receiving section 228 receives a response assignment message including the sender that is not itself, the flag being assigned in the entry of the VS table corresponding to the IP address to be assigned in the reply assignment message is true, and the order of priority of the sender is higher than its own order of priority (h5);

transits to the forwarding state D5 when receiving a query assignment message including the sender that is not itself (m5);

transits to an applicating state G5 when receiving a response assignment message and the server in the message is different from its own IP address (15); and otherwise, remains in the waiting state A5 (a5).

In the mark_sync state B5, the assignment message receiving section 228 sets the flag being assigned to be false and the synchronized flag to be true if there is any entry in the VS table, which corresponds to the IP address to be assigned in the received assignment message. In the mark_sync state B5, the assignment message receiving section 228:

transits to the commit state B5 if the entry of the IP address to be assigned is present in the VS table (d5); and otherwise, transits to the waiting state A5 (c5).

In the commit state B5, after the assignment message receiving section 228 gives an assignment reply permission to the DHCP processing section 202 for the IP address to be assigned, it unconditionally transits to the waiting state A5 (e5).

In the replying state D5, after the assignment message receiving section 228 sets the response assignment message to the received query assignment message to be its own IP address of the sender and the server and fetches the MAC address and the assignment time limit from the entry of the VS table corresponding to the IP address to be assigned in the query message so as to use them as the assignment information to create a reply assignment message to the received query assignment message, it transmits the thus created response assignment message to the ring.

Moreover, if the entry corresponding to the query is not found in the VS table, the assignment message receiving section 228 creates a reply assignment message with the flag D being true for the IP address to be assigned so as to transmit it to the ring.

Thereafter, the assignment message receiving section 228 unconditionally transits to the waiting state A5 (g5).

In the CANCEL state, the assignment message receiving section 228 updates the entry of the VS table corresponding to the IP address to be assigned in the received response assignment message by overwriting it with the assignment information in the received response assignment message.

In the CANCEL state, if the assignment message receiving section 228 successfully updates the entry of the IP address to be assigned to the VS table, it transits to the reject state E5 (j5); and otherwise, transits to the waiting state A5 (i5).

In the reject state E5, after the assignment message receiving section 228 gives an assignment rejection reply permission to the DHCP processing section, it unconditionally transits to the waiting state A5 (k5).

In the applicating state G5, after 1 is subtracted from the variable NDESCYNC and the entry is updated by overwriting it with the assignment information in the received response assignment message if the synchronized flag of the entry of the VS table, which corresponds to the IP address to be assigned in the received response assignment message, is false, the assignment message receiving section 228 unconditionally transits to the waiting state A5 (n5).

In the forwarding state D5, after sending the received assignment message to the ring, the assignment message receiving section 228 unconditionally transits to the forwarding state H5 (o5).

[VSS Message Receiving Section 230]

The VSS message receiving section 230 operates in cooperation with the address assignment section 226.

The VSS message receiving section 230 uses the following variable:

a flag field of the VSS message.

The VSS message contains the VSS information, that is, the order of division n and the repetition of $A_n$ and $B_n i_n$ obtained by generalizing $A_1$ and $B_1 i_1$ in Formula 1.

The VSS information item is not single and repeated for zero or more times. If there is no VSS (immediately after all the logical rings 16 are reset or the like), the number of VSS information becomes zero.

[State Transition of the VSS Message Receiving Section 230]

Figure 34:
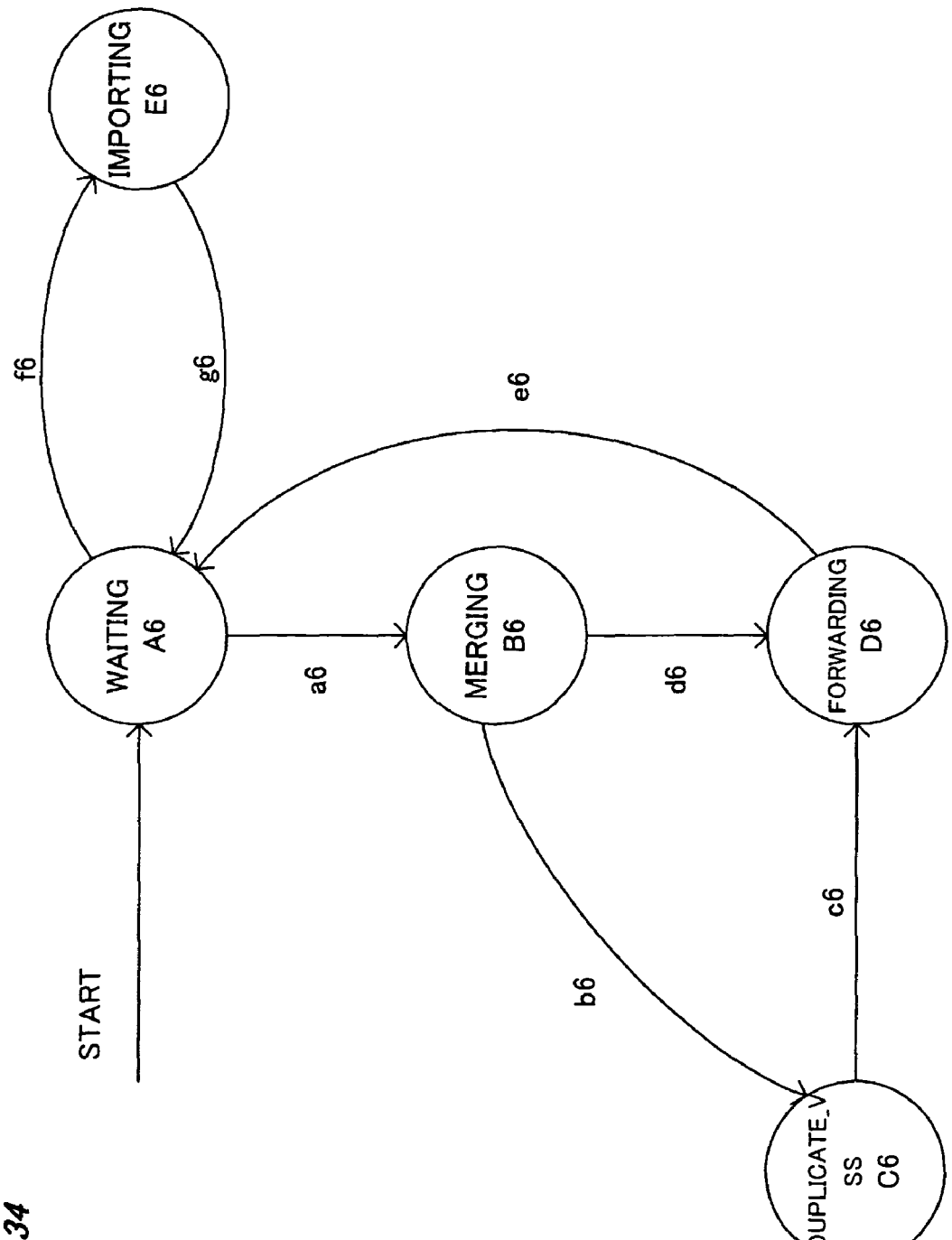
FIG. 34 A state transition diagram of a VSS message receiving section shown in FIG. 26.

FIG. 34 is a state transition diagram of the VSS message receiving section 230 shown in FIG. 26.

As illustrated in FIG. 34, the VSS message receiving section 230 have five states. Among them, in a waiting state A6, the VSS message receiving section 230 waits for a VSS message.

In a merging state B6, the own VSS of the DHCP server 2 is merged with (listed in parallel to) the VSS of another DHCP server 2.

In a duplicate_VSS state C6, VSS duplication is detected with another DHCP server 2.

In a forwarding state D6, the VSS obtained by the merger in the merging state B6 is forwarded.

In an importing state E6, a returned VSS is imported as a VS.

When the processing is initiated, the VSS message receiving section 230 goes into the waiting state A6.

In the WAITING state, the VSS message receiving section 230: transits to the merging state B6 when receiving a VSS message containing the VSS (a6); and transits to the importing state E6 when it receives the VSS message containing the VSS and the sender of the VSS message corresponds to the IP address of the DHCP server 2 sending the message (f6).

In the merging state B6, the VSS message receiving section 230 examines whether the received VSS and the its own VSS are duplicated or not. If VSS duplication is detected, the VSS message receiving section 230 transits to the DUPLICATE_VSS state (b6), and otherwise, transits to the forwarding state D6 after merging the its own VSS with the received VSS message (d6).

In the duplicate_VSS state C6, after setting the variable VSSDUP to be true, the VSS message receiving section 230 unconditionally transits to the forwarding state D6 (c6).

In the forwarding state D6, the VSS message receiving section 230 sends the received VSS message to the ring without any change when the variable VSSDUP is false, while the VSS message receiving section 230 sends the received VSS message to the ring after setting the flag DUP in the VSS message to be true when the variable VSSDUP is true, the VSS message receiving section 230 unconditionally transits to the waiting state A6 (e6).

In the importing state E6, the VSS message receiving section 230 imports a VSS group obtained by the merger as a VS when the flag DUP in the received VSS message is false. If the imported VS is supposed to be n−1-th division, the VS is subjected to n-th division based on Formula 3 so as to obtain and store VSSs.

Then, the variable VSIMP is set to be true. If the flag DUP in the received VSS message is true, the variable VSSDUP is set to be true without performing the importing. After the above processing, the VSS message receiving section 230 unconditionally transits to the waiting state A6 (g6).

[Transmission Section 232]

The transmission section 232 uses the following variable.

A variable NXMITQUE: for keeping the number of messages in the transmission queue in the transmission section 232.

[State Transition of the Transmission Section 232]

Figure 35:
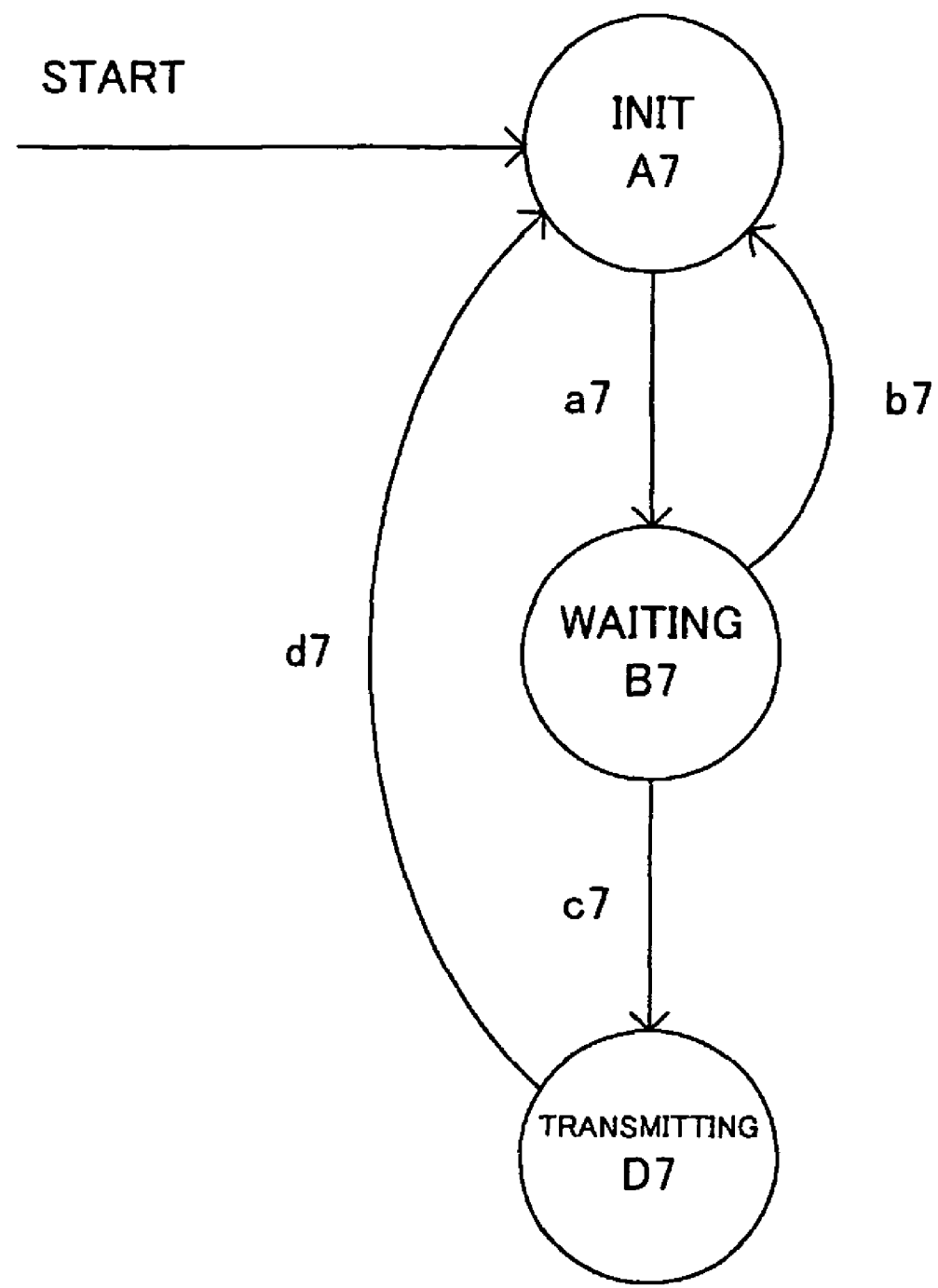
FIG. 35 A state transition diagram of a transmission section shown in FIG. 26.

FIG. 35 is a state transition diagram of the transmission section 232 shown in FIG. 26.

As illustrated in FIG. 35, the transmission section 232 contains a transmission queue (not shown) in the transmission section 232 and has three states.

In an init state A7, the transmission queue in the transmission section 232 is vacated.

In a waiting state B7, the transmission queue in the transmission section 232 is waited for not being vacant.

In a transmitting state D7, a message is in the transmission queue in the transmission section 232 and the message in the transmission queue is transmitted.

When the processing is initiated, the transmission section 232 goes into the init state A7.

In the init state A7, the transmission section 232 vacates the transmission queue in the transmission section 232.

In the init state A7, the transmission section 232 transits to the waiting state B7 under the condition that TCP connection to a next ring member is established when the ring management section 220 is in the TENTATIVE SLAVE state C1 (a7).

In the waiting state B7, the transmission section 232: transits to the init state A7 under the condition that a value of the variable ASSOC becomes false (b7); and transits to the transmitting state D7 under the condition that a value of the variable NXMITQUE is not 0 (c7).

In the transmitting state D7, the transmission section 232 transmits a message in the transmission queue in the transmission section 232 to the logical ring 16 and subtracts 1 from the variable NXMITQUE for each transmission. Then, the transmission section 232 transits to the init state A7 under the condition that the value of the variable NXMITQUE is 0 (d7).

[The VSS Management Section 240 and the Like]

The VSS management section 240 creates the VS table (FIG. 12(B)) so as to store it in the VSS-DB 246. The VSS management section 240 uses the stored VS table for the processing in the other components of the ring control program 22, the DHCP processing section 202 and the proxy ARP processing section 204.

Furthermore, the VSS management section 240 modifies and manages the contents of the stored VS table in accordance with the processing of the other components of the ring control program 22.

The VSS division and combination section 242 provides a function necessary for the VSS reconfiguration for the other components of the ring control program 22.

As the function of the VSS division and combination section 242, the function required for the processing in the state E6 of the VSS message receiving section 230 (FIG. 34), the function for storing and managing the recursive formulae (Formulae 1 to 3), and the like can be given as examples.

The VSS duplication determining section 244 provides a function necessary for the determination of VSS duplication (Formulae 4 to 18) for the other components of the ring control program 22.

As the processing using the function of the VSS duplication determining section 244, the processing in the state B6 of the VSS message receiving section 230, and the like can be given as examples.

The belonging VSS determining section 248 provides a function (Formulae 19 and 20) necessary for the determination of the VSS to which a certain IP address belongs, for the other components of the ring control program 22.

The APR request processing section 250 controls the proxy ARP processing section 204 so as to perform the processing for sending a gratuitous ARP request, which is required when the DHCP server 2 reassigns the IP address instead of another DHCP server 2.

INDUSTRIAL APPLICABILITY

The present invention can be used for a server device having redundant configuration and the like.

The invention claimed is:

1. A server system including a plurality of hardware server devices, the plurality of hardware server devices performing processing using a plurality of processing data without duplication, each of the plurality of hardware server devices relaying at least one of an initial signal initially transmitted by at least one of the hardware server devices and a corresponding signal corresponding to the initially transmitted signal to at least one other hardware server device so that at least one of the initial signal and the corresponding signal passes through all the hardware server devices to be finally received by the hardware server device that initially transmitted at least one of the initial signal and the corresponding signal, wherein each of the plurality of hardware server devices includes:

transmission means for transmitting a first signal indicating that any of the processing data is in use to the at least one of the other hardware server devices when the processing data is to be used;

relay means for receiving the first signal from the at least one of the other hardware server devices and relaying the first signal thus received to at least another hardware server device; and use permit means for permitting use of the processing data to be used when the first signal is transmitted from the transmission means to be relayed from the at least one of the other hardware server devices.

2. The server system according to claim 1 further comprising processing means for performing predetermined processing by using the processing data permitted for use.

3. The server system according to claim 2, wherein:

each of the hardware server devices further comprises processing data aggregate creating means corresponding to any of the hardware server devices, the processing data aggregate creating means being for creating a processing data aggregate containing at least one piece of processing data without duplication;

at least one of the processing data aggregate creating means of the plurality of hardware server devices creates the processing data aggregate;

each of the processing means of the hardware server devices uses the processing data contained in the processing data aggregate associated with the hardware server device to perform processing;

each of the transmission means of the hardware server devices transmits the first signal indicating the use of the processing data to be used by the processing means for processing to any of the other hardware server devices; and each of the use permit means of the server devices permits the processing means to use the processing data to be used when the use permit means receives the first signal that is transmitted from the transmission means and relayed from the other server devices.

4. The server system according to claim 3, wherein:

each of the hardware server devices further comprises server group creating means for creating a server group containing all the hardware server devices capable of transmitting data to at least one of the other hardware server devices;

in at least one of the hardware server devices contained in the server group, the processing data aggregate creating means corresponds to at least one of the hardware server devices contained in the server group and creates the processing data aggregate containing at least one processing data without duplication; and in each of the hardware server devices, the processing means uses the processing data contained in the processing data aggregate associated with the hardware server device to perform processing;

the transmission means transmits the first signal indicating the processing data to be used by the processing means for processing is in use to at least one of the other hardware server devices; and the use permit means permits the processing means to use the processing data to be used when the use permit means receives the first signal that is transmitted from the transmission means and relayed from the other hardware server devices.

5. The server system according to claim 4, wherein each of the hardware server devices further comprises:

use status management means for managing a status of use indicating whether each of the processing data contained in the corresponding processing data aggregate is in use or not; and synchronizing means for synchronizing the status of use managed by the use status management means of at least one of the hardware server devices and a status of use managed by the use status management means of each of the hardware server devices contained in the created server group, in at least one of the hardware server devices when the server group is created.

6. The server system according to claim 5, wherein:

the synchronizing means of at least one of the hardware server devices transmits a second signal for inquiring a status of use of each of the processing data and determines the processing data corresponding to the second signal is in use when the second signal is relayed to be returned, and otherwise determines that the processing data corresponding to the second signal is not in use, to synchronize the statuses of use; and the relay means of each of the hardware server devices relays the second signal to the other hardware server devices only when the relay means receives the second signal from another hardware server device and the processing data corresponding to the received second signal is in use.

7. The server system according to claim 6, wherein:

the predetermined processing is for dynamically assigning an IP address to a communication node in accordance with a DHCP (Dynamic Host Configuration Protocol); and each of the plurality of processing data indicates the IP address that is configured to be assigned to the communication node.

8. The server system according to claim 4, wherein an identifier indicating an order of priority of the hardware server devices is uniquely assigned to each of the hardware server devices; and the server group creating means of the hardware server device having the identifier indicating the highest order of priority in the server group creates the processing data aggregate.

9. The server system according to claim 8, wherein the server group creating means of the hardware server device creates the processing data aggregate by aggregating the processing data corresponding to all the hardware server devices contained in the group and distributing the aggregated processing data to all the hardware server devices contained in the group.

10. The server system according to claim 3, wherein a first identifier indicating at least a relay order of the first signal is uniquely assigned to each of the hardware server devices; and the relay means relays the first signal thus received to the hardware server device that is to receive the first signal next in accordance with the assigned first identifier.

11. A hardware server device configured to be used in plural with a plurality of hardware server devices, the plurality of the hardware server devices performing processing using a plurality of processing data without duplication between the plurality of hardware server devices when used in plural, each of the plurality of hardware server devices relaying at least one of an initial signal initially transmitted from at least one of the hardware server devices and a corresponding signal corresponding to the initially transmitted signal to at least one other hardware server device so that at least one of the initial signal and the corresponding signal passes through all the hardware server devices to be finally received by the hardware server device initially transmitting the at least one of the initial signal and the corresponding signal, wherein the hardware server device includes:

transmission means for transmitting a first signal indicating that any of the processing data is in use to at least one of the other hardware server devices when the processing data is to be used;

relay means for receiving the first signal from the at least one other hardware server device and relaying the first signal thus received to at least another hardware server device; and use permit means for permitting use of the processing data to be used upon reception of the first signal that is transmitted from the transmission means and relayed from the at least one of the other hardware server devices.

12. The hardware server device according to claim 11 further comprising processing means for performing predetermined processing by using the processing data permitted for use.

13. The hardware server device according to claim 12, further comprising:

processing data aggregate creating means corresponding to at least one of the hardware server devices, the processing data aggregate creating means being for creating a processing data aggregate containing at least one piece of processing data without duplication;

the processing data aggregate creating means being configured to create the processing data aggregate;

the processing means being configured to use the processing data contained in the processing data aggregate associated with the hardware server device to perform processing;

the transmission means being configured to transmit the first signal indicating the use of the processing data to be used by the processing means for processing to at least one of the other hardware server devices; and the use permit means is configured to permit the processing means to use the processing data to be used when the use permit means receives the first signal that is transmitted from the transmission means and relayed from the other hardware server devices.

14. The hardware server device according to claim 13, further comprising:

server group creating means for creating a server group containing all the hardware server devices capable of transmitting data to the hardware server device;

wherein the processing data aggregate creating means corresponds to at least one of the hardware server devices contained in the server group and creates the processing data aggregate containing at least one processing data without duplication; and wherein the processing means uses the processing data contained in the processing data aggregate associated with the hardware server device to perform processing;

wherein the transmission means transmits the first signal indicating the processing data to be used by the processing means for processing is in use to at least one of the other hardware server devices; and wherein the use permit means permits the processing means to use the processing data to be used when the use permit means receives the first signal that is transmitted from the transmission means and relayed from the other hardware server devices.

15. The hardware server device according to claim 14, further comprising:

use status management means for managing a status of use indicating whether each of the processing data contained in the corresponding processing data aggregate is in use or not; and synchronizing means for synchronizing the status of use managed by the use status management means of at least one of the hardware server devices and a status of use managed by the use status management means of each of the hardware server devices contained in the created server group.

16. The hardware server device according to claim 15, wherein:

the synchronizing means transmits a second signal for inquiring a status of use of each of the processing data and determines the processing data corresponding to the second signal is in use when the second signal is relayed to be returned, and otherwise determines that the processing data corresponding to the second signal is not in use, to synchronize the statuses of use; and the relay means relays the second signal to the other hardware server devices only when the relay means receives the second signal from another hardware server device and the processing data corresponding to the received second signal is in use.

17. The hardware server device according to claim 16, wherein:

the predetermined processing is for dynamically assigning an IP address to a communication node in accordance with a DHCP (Dynamic Host Configuration Protocol); and each of the plurality of processing data indicates the IP address that is configured to be assigned to the communication node.

18. The hardware server device according to claim 13, wherein a first identifier indicating at least a relay order of the first signal is uniquely assigned to each of the plurality of hardware server devices; and the relay means relays the first signal thus received to the hardware server device that is to receive the first signal next in accordance with the assigned first identifier.

19. A data processing method implemented by a processor of a hardware server device configured to be used in plural with a plurality of hardware server devices, wherein a plurality of processing data are used without duplication between the plurality of the hardware server devices when the hardware server device is used in plural, the method comprising steps performed by the processor of:

relaying at least one of an initial signal initially transmitted from one of the plurality of hardware server devices and a corresponding signal corresponding to the initially transmitted signal to at least one other hardware server device so that at least one of the initial signal and the corresponding signal passes through all the hardware server devices and is finally received by the hardware server device initially transmitting one of the initial signal and the corresponding signal;

transmitting a first signal indicating use of processing data to the at least one of the other hardware server devices when any of the processing data is to be used;

receiving the first signal from the at least one of the other hardware server devices and relaying the received first signal to at least another hardware server device; and permitting use of the processing data to be used upon reception of the first signal relayed from the at least one of the other hardware server devices that is transmitted by the transmission means.

20. A tangible computer readable storage medium on which is embedded one or more computer programs for a server device, configured to be used in plural with a plurality of server devices, the server devices performing processing using a plurality of processing data without duplication between the plurality of server devices when used in plural, each of the server devices relaying at least one of an initial signal initially transmitted from one of the server devices and a corresponding signal corresponding to the initially transmitted signal to at least one other server device so that at least one of the initial signal and the corresponding signal passes through all the server devices to be finally received by the server device initially transmitting the at least one of the initial signal and the corresponding signal, the one or more computer programs containing a set of instructions for causing the server device to execute the steps of:

transmitting a first signal indicating use of processing data to the at least one other server device when any of the processing data is to be used;

receiving the first signal from the at least one other server device and relaying the received first signal to at least another server device; and permitting use of the processing data to be used upon reception of the first signal relayed from the at least one other server device.

* * * * *